United States Patent
Kimura et al.

(10) Patent No.: US 11,700,106 B2
(45) Date of Patent: Jul. 11, 2023

(54) COMMUNICATION APPARATUS AND COMMUNICATION METHOD

(71) Applicant: SONY CORPORATION, Tokyo (JP)

(72) Inventors: Ryota Kimura, Tokyo (JP); Ryo Sawai, Tokyo (JP); Kazuyuki Shimezawa, Kanagawa (JP); Naoki Kusashima, Kanagawa (JP); Hiroshi Harada, Kyoto (JP); Keiichi Mizutani, Kyoto (JP); Takeshi Matsumura, Kyoto (JP); Hiroto Kuriki, Kyoto (JP)

(73) Assignee: SONY CORPORATION, Tokyo (JP)

( * ) Notice: Subject to any disclaimer, the term of this patent is extended or adjusted under 35 U.S.C. 154(b) by 194 days.

(21) Appl. No.: 16/960,193

(22) PCT Filed: Dec. 4, 2018

(86) PCT No.: PCT/JP2018/044491
§ 371 (c)(1),
(2) Date: Jul. 6, 2020

(87) PCT Pub. No.: WO2019/142524
PCT Pub. Date: Jul. 25, 2019

(65) Prior Publication Data
US 2021/0058219 A1    Feb. 25, 2021

(30) Foreign Application Priority Data
Jan. 16, 2018 (JP) .................................. 2018-005229

(51) Int. Cl.
*H04L 5/14* (2006.01)
*H04W 28/02* (2009.01)
(Continued)

(52) U.S. Cl.
CPC ............... *H04L 5/14* (2013.01); *H04W 28/02* (2013.01); *H04W 28/16* (2013.01); *H04W 72/04* (2013.01)

(58) Field of Classification Search
None
See application file for complete search history.

(56) References Cited

U.S. PATENT DOCUMENTS 5,898,666 A * 4/1999 Fukuda ................. H04L 5/1492
370/294
6,795,409 B1 * 9/2004 Youssefmir ........... H04W 16/28
370/347

(Continued)

FOREIGN PATENT DOCUMENTS

CN      105340195 A     2/2016
CN      106465399 A     2/2017

(Continued)

OTHER PUBLICATIONS

Goyal, et al., "Analyzing a Full-Duplex Cellular System", IEEE 47th Annual Conference on Information Sciences and Systems (CISS), 2013, pp. 1-6.

(Continued)

*Primary Examiner* — Robert C Scheibel
*Assistant Examiner* — Gautam Sharma
(74) *Attorney, Agent, or Firm* — Chip Law Group

(57) ABSTRACT

Provided is a communication apparatus that flexibly switches execution/non-execution of FD. The communication apparatus includes the followings: a resource allocation unit that allocates, to another communication apparatus, reception radio resources in a predetermined frequency channel and allocates transmission radio resources at least partially overlapping the reception radio resources on a time axis; and a notification unit that notifies the other communication apparatus of information regarding the reception (Continued)

radio resources and the transmission radio resources. The resource allocation unit further allocates transmission radio resources at least partially overlapping the reception radio resources on a frequency axis.

6 Claims, 27 Drawing Sheets

(51) Int. Cl.
*H04W 28/16* (2009.01)
*H04W 72/04* (2023.01)

(56) References Cited

U.S. PATENT DOCUMENTS

| | | | | |
|---|---|---|---|---|
| 2004/0057407 | A1* | 3/2004 | Balachandran | H04W 72/0446 370/336 |
| 2010/0008332 | A1* | 1/2010 | Balachandran | H04L 5/0091 370/336 |
| 2010/0091725 | A1* | 4/2010 | Ishii | H04L 5/003 370/329 |
| 2012/0280840 | A1* | 11/2012 | Kyeong | H04B 1/0092 341/101 |
| 2013/0194984 | A1* | 8/2013 | Cheng | H04W 72/082 370/294 |
| 2013/0223294 | A1* | 8/2013 | Karjalainen | H04L 5/14 370/277 |
| 2013/0301486 | A1* | 11/2013 | Kishiyama | H04L 5/14 370/277 |
| 2013/0343241 | A1* | 12/2013 | Niu | H04W 52/0251 370/280 |
| 2014/0112254 | A1* | 4/2014 | Lindoff | H04W 74/002 370/328 |
| 2014/0169234 | A1* | 6/2014 | Zhu | H04L 1/0026 370/277 |
| 2014/0269338 | A1* | 9/2014 | Jung | H04L 5/0055 370/329 |
| 2014/0342738 | A1* | 11/2014 | Ishii | H04W 28/08 455/436 |
| 2015/0063245 | A1* | 3/2015 | Gao | H04W 52/248 370/329 |
| 2015/0223173 | A1 | 8/2015 | Khojastepour et al. | |
| 2015/0381248 | A1 | 12/2015 | Khojastepour et al. | |
| 2015/0381334 | A1 | 12/2015 | Khojastepour et al. | |
| 2015/0381335 | A1 | 12/2015 | Khojastepour et al. | |
| 2015/0382375 | A1* | 12/2015 | Bhushan | H04W 52/243 370/252 |
| 2016/0087715 | A1 | 3/2016 | Kim et al. | |
| 2016/0308660 | A1* | 10/2016 | Cui | H04L 5/143 |
| 2018/0035458 | A1* | 2/2018 | Islam | H04L 5/0096 |
| 2018/0035459 | A1* | 2/2018 | Islam | H04L 5/0053 |
| 2018/0097606 | A1* | 4/2018 | Toledano | H04L 1/1861 |
| 2018/0191483 | A1* | 7/2018 | Yamazaki | H04W 74/0833 |
| 2018/0213532 | A1* | 7/2018 | Hosseini | H04L 5/001 |
| 2018/0242059 | A1* | 8/2018 | Berner | H04W 74/06 |
| 2018/0343105 | A1* | 11/2018 | Wang | H04W 72/1289 |
| 2019/0238305 | A1* | 8/2019 | Lee | H04W 72/10 |
| 2020/0107202 | A1* | 4/2020 | Teng | H04L 5/0062 |
| 2022/0014345 | A1* | 1/2022 | Abdelghaffar | H04L 5/14 |

FOREIGN PATENT DOCUMENTS

| | | |
|---|---|---|
| CN | 107431991 A | 12/2017 |
| EP | 3001581 A1 | 3/2016 |
| EP | 3162144 A1 | 5/2017 |
| EP | 3273731 A1 | 1/2018 |
| JP | 2016-524856 A | 8/2016 |
| JP | 2017-523687 A | 8/2017 |
| KR | 10-2016-0010437 A | 1/2016 |
| KR | 10-2017-0020813 A | 2/2017 |
| WO | 2014/189301 A1 | 11/2014 |
| WO | 2015/098228 A1 | 7/2015 |
| WO | 2015/199942 A1 | 12/2015 |
| WO | 2016/152676 A1 | 9/2016 |

OTHER PUBLICATIONS

International Search Report and Written Opinion of PCT Application No. PCT/JP2018/044491, dated Jan. 8, 2019, 11 pages of ISRWO.

Goyal, et al., "Analyzing a Full-Duplex Cellular System", 47th Annual Conference on Information Sciences and Systems (CISS), Jul. 8, 2013, 6 pages.

* cited by examiner

COMMUNICATION APPARATUS AND COMMUNICATION METHOD

CROSS REFERENCE TO RELATED APPLICATIONS

This application is a U.S. National Phase of International Patent Application No. PCT/JP2018/044491 filed on Dec. 4, 2018, which claims priority benefit of Japanese Patent Application No. JP 2018-005229 filed in the Japan Patent Office on Jan. 16, 2018. Each of the above-referenced applications is hereby incorporated herein by reference in its entirety.

TECHNICAL FIELD

The technique disclosed in the present specification relates to a communication apparatus and a communication method operated in a wireless communication environment in which a full duplex communication scheme is applied.

BACKGROUND ART

Implementation of a full duplex (Full Duplex: FD) mode is examined to more efficiently use radio resources. For example, NPL 1 proposes application of the FD to an uplink and a downlink of a cellular system and also discloses a theoretical analysis result of communication capability (capacity). According to NPL 1, the FD can approximately double the communication capability of the cellular system at most.

In addition, a technique for FD of an access link (relay station and terminal) and a backhaul link (base station and relay station) in a communication apparatus (mainly relay station) is disclosed (for example, see PTL 1). The technique is applied to a communication system not including both of execution and non-execution of the FD (FD is always carried out) or to a communication system in which the FD is not switched for a rather long period. Therefore, there is a problem of flexibility and granularity in switching the FD. Furthermore, in a case where the granularity of switch is coarse or in a case where the switch is only at fixed timing, the situation that allows to carry out appropriate FD is limited, and the frequency use efficiency and the performance of low latency communication (delay reduction effect) of the entire communication system may not be improved.

CITATION LIST

Patent Literature

[PTL 1]
WO 2015/098228

Non Patent Literature

[NPL 1]
S. Goyal, et al., "Analyzing a Full-Duplex Cellular System," The 47th Annual Conference on Information Sciences and Systems 2013.

SUMMARY

Technical Problem

An object of the technique disclosed in the present specification is to provide a communication apparatus and a communication method that can flexibly switch execution/non-execution of FD.

Solution to Problem

The technique disclosed in the present specification has been made in view of the problem, and a first aspect of the technique provides
a communication apparatus including:
a resource allocation unit that allocates, to another communication apparatus, reception radio resources in a predetermined frequency channel and allocates transmission radio resources at least partially overlapping the reception radio resources on a time axis; and
a notification unit that notifies the other communication apparatus of information regarding the reception radio resources and the transmission radio resources.
The resource allocation unit further allocates transmission radio resources at least partially overlapping the reception radio resources on a frequency axis.
The resource allocation unit allocates the reception radio resources used for transmitting data from the communication apparatus to the other communication apparatus and allocates the transmission radio resources used for transmitting a response to the data from the other communication apparatus to the communication apparatus.
Alternatively, the resource allocation unit allocates the reception radio resources and the transmission radio resources in a plurality of units of time divided from a predetermined unit of time for allocating the radio resources. Furthermore, the resource allocation unit allocates, in a first half of the divided units of time, the transmission radio resources for transmitting the data to the communication apparatus such that the transmission radio resources overlap, on the time axis, the reception radio resources for transmitting the data from the communication apparatus and allocates, in a second half of the divided units of time, at least one of the reception radio resources or the transmission radio resources for transmitting the response to the data.
In addition, the resource allocation unit allocates the reception radio resources to a first communication apparatus and allocates the transmission radio resources to a second communication apparatus in a case where the resource allocation unit receives a signal from the second communication apparatus and in a case where link communication quality or a data rate is not affected much even if the resource allocation unit receives the signal, when the resource allocation unit transmits a signal to the first communication apparatus.
In addition, a second aspect of the technique disclosed in the present specification provides
a communication method including:
a resource allocation step of allocating, to another communication apparatus, reception radio resources in a predetermined frequency channel and allocating transmission radio resources at least partially overlapping the reception radio resources on a time axis; and
a notification step of notifying the other communication apparatus of information regarding the reception radio resources and the transmission radio resources.

In addition, a third aspect of the technique disclosed in the present specification provides a communication apparatus including:

a reception unit that receives, from another communication apparatus, a notification of information regarding reception radio resources allocated in a predetermined frequency channel and transmission radio resources allocated to at least partially overlap the reception radio resources on a time axis; and a communication unit that executes a reception process of a radio signal in the reception radio resources and that executes a transmission process of a radio signal in the transmission radio resources.

The communication unit executes a reception process of data transmitted from the other communication apparatus in the reception radio resources and executes a transmission process of a response to the data by using the transmission radio resources.

Alternatively, the communication unit executes the reception process of the data transmitted from the other communication apparatus in the reception radio resources and executes the transmission process of the response to the data to the other communication apparatus in the transmission radio resources allocated once or a plurality of times during the allocation of the reception radio resources.

In addition, a fourth aspect of the technique disclosed in the present specification provides a communication method including:

a reception step of receiving, from another communication apparatus, a notification of information regarding reception radio resources allocated in a predetermined frequency channel and transmission radio resources allocated to at least partially overlap the reception radio resources on a time axis; and a communication step of executing a reception process of a radio signal in the reception radio resources and executing a transmission process of a radio signal in the transmission radio resources.

Advantageous Effect of Invention

According to the technique disclosed in the present specification, the communication apparatus and the communication method that can flexibly switch the execution/non-execution of the FD can be provided.

Note that the advantageous effect described in the present specification is illustrative only, and the advantageous effect of the present invention is not limited to this. In addition, the present invention may further attain additional advantageous effects other than the advantageous effect described above.

Other objects, features, and advantages of the technique disclosed in the present specification will become apparent from more detailed description based on the embodiment and the attached drawings described later.

DESCRIPTION OF EMBODIMENT

Hereinafter, an embodiment of the technique disclosed in the present specification will be described in detail with reference to the drawings.

A. Assumed System

Figure 1:
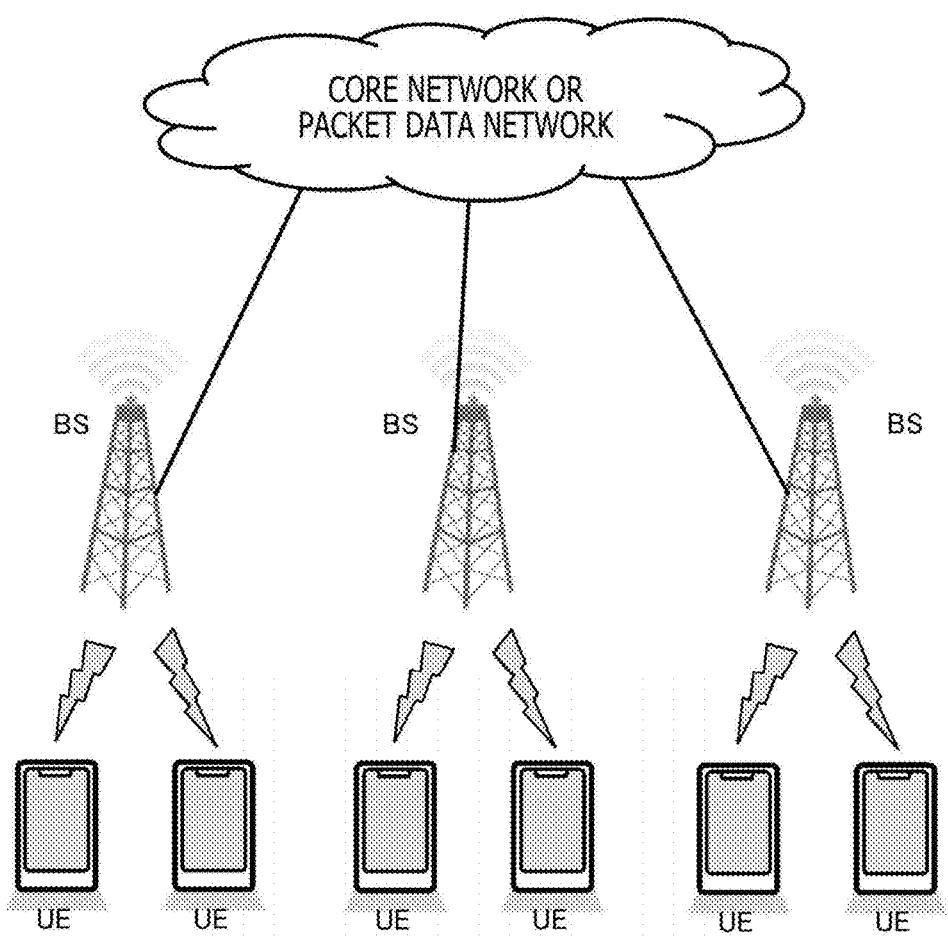
FIG. 1 is a diagram illustrating a configuration example of a communication system.

FIG. 1 schematically illustrates a configuration example of a communication system in which the technique disclosed in the present specification is applied. The communication system includes one or more terminals and one or more base stations. The terminals here include UE (User Equipment) as well as a User Terminal, a Mobile Terminal, a User Station, a Mobile Station, a vehicle (Vehicle), a drone (Drone), a satellite earth station (Earth Station), and the like. In addition, the base stations include a BS (Base Station) as well as an eNB (evolved NodeB: base station of LTE), a gNB (base station corresponding to 5G), an Access Point, a satellite space station (Satellite Station or Space Backborne Platform), and the like.

Furthermore, in the present embodiment, it is assumed that the same or partially overlapping time resources (for example: subframes, slots, symbols, and the like) can be simultaneously allocated to the downlink and the uplink, that is, in-band full duplex communication (In-Band Full Duplex), in a frequency channel (component carrier (Component Carrier: CC) or the like) in the communication system illustrated in FIG. 1. It is assumed in the case that the frequency channel (CC) is an Unpaired Spectrum (Unpaired Frequency Channel) such as a TDD, that is, separate channels are not prepared for the uplink and the downlink.

At the time of the execution of the FD, a base station or a terminal performs transmission and reception at the same time in a time resource (such as a radio frame (Radio Frame), a subframe (Subframe), a slot (Slot), a mini slot (Mini Slot), and a symbol (Symbol)) in a frequency channel (CC). Note that the slot includes seven symbols in LTE and fourteen symbols in NR. In addition, the mini slot is defined by a time resource shorter than the slot. Specifically, the number of symbols included in the mini slot is smaller than fourteen symbols.

Figure 2:
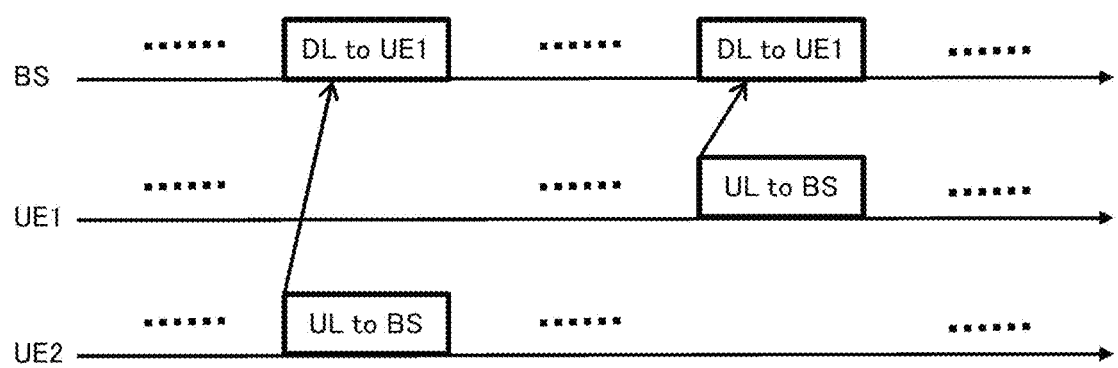
FIG. 2 is a diagram illustrating a communication sequence example in which FD communication is carried out in both a base station and a terminal (UE).

It is also assumed that the FD is carried out in both the base station and the terminal. FIG. 2 illustrates a communication sequence example in which the FD communication is carried out in both the base station and the terminal (UE). In FIG. 2, a horizontal axis represents a time axis, and a rectangle drawn on each time axis represents a signal (packet, frame, slot, or subframe) transmitted at that time from the communication apparatus corresponding to the time axis. An arrow extending from the rectangle indicates the direction in which the signal is transmitted. It is also assumed that two terminals UE1 and UE2 are connected to the base station.

In a first half of the communication sequence illustrated in FIG. 2, the BS transmits a downlink (Downlink: DL) signal to the UE1, and at the same time, the UE2 transmits an uplink (Uplink: UL) signal to the BS. Here, it is assumed that the downlink signal and the uplink signal use the same or overlapping frequency resources and the same or overlapping time resources. Therefore, the BS carries out the FD to transmit the downlink signal to the UE1 and receive the uplink signal from the UE2 at the same time.

Furthermore, in a second half of the communication sequence illustrated in FIG. 2, the BS transmits a downlink (Downlink: DL) signal to the UE1, and at the same time, the UE1 transmits an uplink (Uplink: UL) signal to the BS. Here, it is assumed that the downlink signal and the uplink signal use the same or overlapping frequency resources and the same or overlapping time resources. Therefore, the BS carries out the FD to transmit the downlink signal to the UE1 and receives the uplink signal from the UE1 at the same time. In addition, the UE1 also carries out the FD to receive the downlink signal from the BS and transmits the uplink signal to the BS at the same time.

It is preferable that the communication apparatus (base station or terminal) that carries out the FD include a self-interference canceller for removing or reducing self-interference (Self-Interference) that occurs at the time of the execution of the FD. Note that in a case where only the base station carries out the FD as in the first half part of the communication sequence illustrated in FIG. 2, the terminal may not include the self-interference canceller.

In addition, at the time of the non-execution of the FD, the base station and the terminal execute the transmission and the reception through frequency and time resources that are not overlapping (for example, by using a conventional FDD (frequency division duplex) or TDD (time division duplex) scheme).

The communication system as illustrated in FIG. 1 can include both a communication apparatus carrying out the FD and a communication apparatus not carrying out the FD. In addition, whether to carry out the FD can be changed with time in each communication apparatus.

Figure 3:
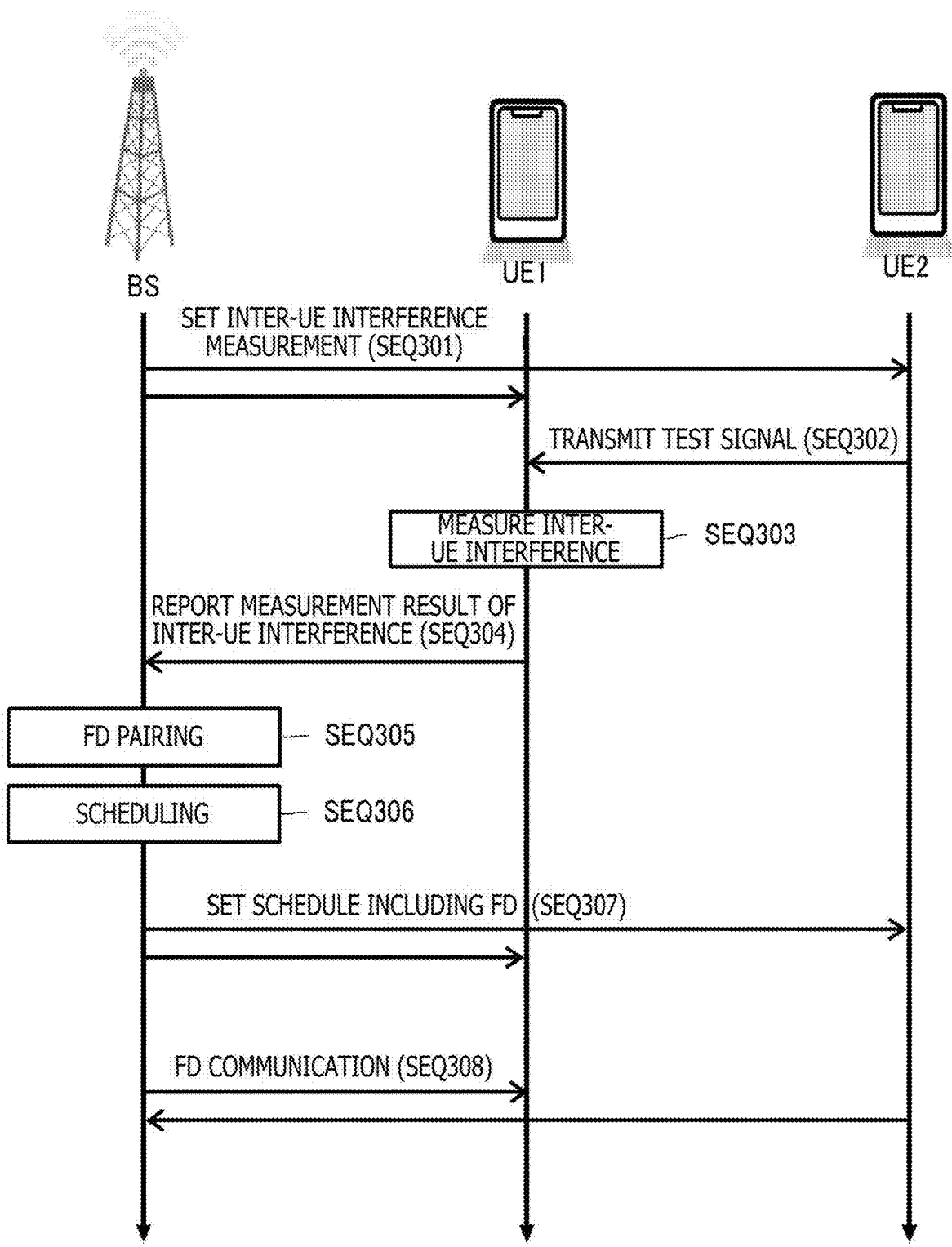
FIG. 3 is a diagram illustrating a communication sequence example in which the FD communication is carried out.

The allocation of the frequency and time radio resources to the terminal and whether or not to carry out the FD are set from the base station. FIG. 3 illustrates a communication sequence example in which the FD communication is carried out. Here, FIG. 3 illustrates a communication sequence example in which the base station performs FD pairing of different terminals.

The base station notifies each of the terminals UE1 and UE2 connected to the base station of the link communication quality expected in the terminal or the settings and the instruction for the measurement of the link communication channel quality and the interference condition (SEQ301). The link communication quality here is expressed by Channel State Information (CSI), Channel Quality Indicator (CQI), Precoding Matrix Indicator (PMI), Rank Indicator (RI), Reference Signal Received Power (RSRP), Reference Signal Received Quality (RSRQ), Received Signal Strength Indicator (RSSI), Delay Spread, Angle Spread, or the like. In addition, the interference condition may be divided into inter-cell interference (Inter-Cell Interference), intra-cell interference (Intra-Cell Interference), and cross-link interference (Cross-Link Interference) and further into inter-cell cross-link interference and intra-cell cross-link interference.

The inter-cell interference is interference that occurs from a cell other than the cell to which the terminal is connected. Downlink signals interfere with each other, uplink signals interfere with each other, or sidelink signals interfere with each other. In addition, the intra-cell interference is interference that occurs in the cell to which the terminal is connected. Downlink signals interfere with each other, uplink signals interfere with each other, or sidelink signals interfere with each other. In addition, the cross-link interference is interference caused by signals in different transmission and reception directions, such as an uplink signal and a downlink signal, an uplink signal and a sidelink signal, and a downlink signal and a sidelink signal.

Each of the terminals UE1 and UE2 carries out communication quality measurement and inter-UE interference measurement according to an instruction from the base station. At the time of the inter-UE interference measurement, a test signal is transmitted from one of the terminals to the other terminal (SEQ302). In the illustrated example, the test signal is transmitted from the UE2 to the UE1. Furthermore, the terminal UE1 measures interference with the terminal UE2 based on the received test signal (SEQ303) and reports the measurement result to the base station (SEQ304). Note that although not illustrated, a test signal is also transmitted from the UE1 to the UE2, and the terminal UE2 similarly reports, to the base station, the measurement result of the interference based on the received test signal.

The base station also takes into account the report of the measurement result from each of the terminals UE1 and UE2 to check whether or not to carry out the FD with each of the terminals UE1 and UE2 and decides the terminal pair that carries out the FD (SEQ305). The base station also makes a schedule including frequency resources, time resources, a modulation scheme, an error correction coding rate, and MIMO (Multiple Input Multiple Output) parameters to be used in the FD (SEQ306). In the example illustrated in FIG. 3, the base station sets the downlink of one terminal UE1 and the uplink of the other terminal UE2 as a pair for the FD and makes a schedule including the transmission timing of the downlink signal to the terminal UE1 and the transmission timing of the uplink signal from the other terminal UE2. Furthermore, the base station uses information (Control Information) for controlling physical layer signal processing to report the scheduling information in each allocation of radio resource or uses system information (System Information) or RRC signaling to Semi-statically (semi-statically) report the scheduling information (SEQ307).

Subsequently, the base station and each of the terminals UE1 and UE2 carry out the FD communication or Non-FD communication based on the transmitted (or received) scheduling information. Specifically, the base station sets the downlink to one terminal UE1 and the uplink from the other terminal UE2 as a pair for the FD, and only the base station carries out the FD (SEQ308).

Figure 4:
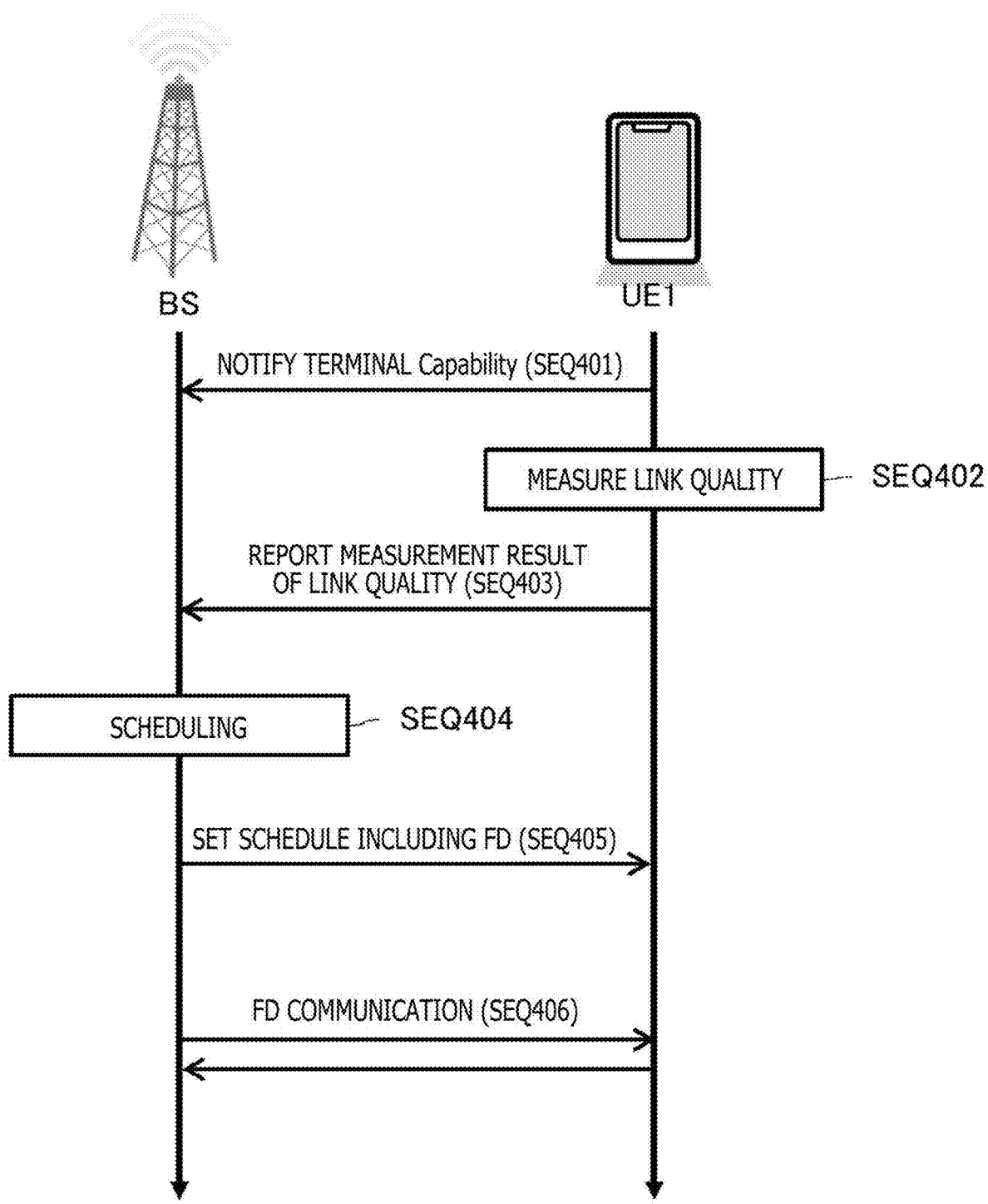
FIG. 4 is a diagram illustrating another communication sequence example in which the FD communication is carried out.

In addition, FIG. 4 illustrates another communication sequence example in which the FD communication is carried out. Here, FIG. 4 illustrates an example in which the base station carries out the FD with the same terminal. The communication system may include both a terminal corresponding to the FD and a terminal not corresponding to the FD. In that case, it is desirable to notify the base station of Capability of the terminal in advance as illustrated in FIG. 4. The notification allows the base station to exclude the terminal not corresponding to the FD in the pairing scheduling of the FD from the beginning, thereby reducing the complexity of scheduling. Here, examples of "not corresponding to the FD" include a case in which the terminal does not have a measurement function of the cross-link interference and a case in which the terminal does not include a self-interference canceller.

First, the terminal UE1 notifies the base station of the Capability of the terminal UE1 (SEQ401). The base station figures out that the terminal UE1 corresponds to the FD based on the received Capability.

Next, the terminal UE1 measures the link quality of the downlink and the uplink to and from the base station (SEQ402) and notifies the base station of the measurement result (SEQ403). The base station also takes into account the notified link quality to make a schedule including the frequency resources, the time resources, the modulation scheme, the error correction coding rate, and the MIMO parameters to be used in the FD in the case where the downlink to the terminal UE1 and the uplink from the terminal UE1 are set as the pair for the FD (SEQ404). Furthermore, the base station notifies the terminal UE1 of the scheduling information (SEQ405). The base station can use the control information of each allocation of radio resource or use the system information or the RRC signaling to notify the terminal UE1 of the scheduling information.

Subsequently, the base station and the terminal UE1 carry out the FD communication or Non-FD communication based on the transmitted (or received) scheduling information. Specifically, the downlink to the terminal UE1 and the uplink from the terminal UE1 are set as a pair for the FD, and both the base station and the terminal UE1 carry out the FD (SEQ406).

Figure 5:
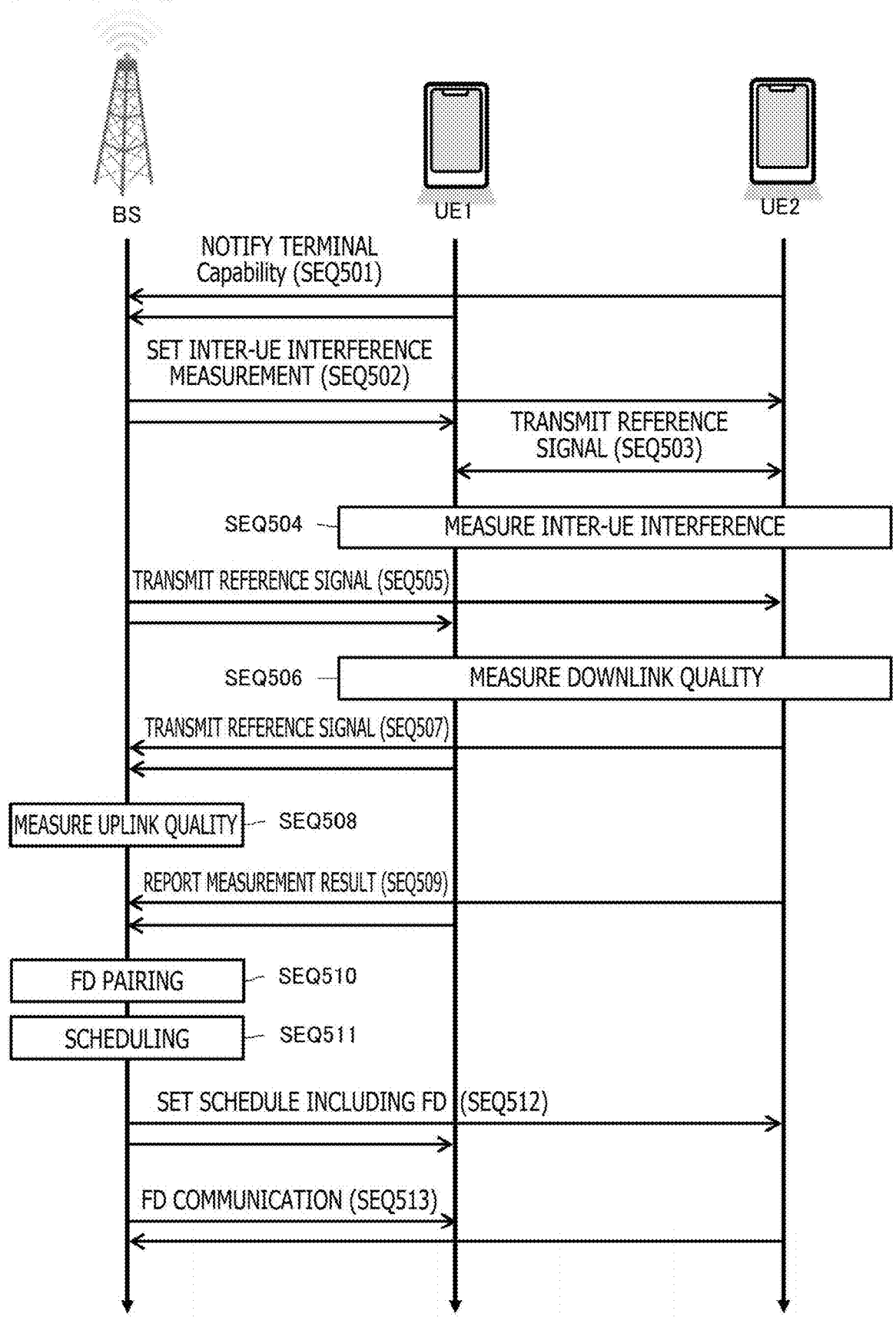
FIG. 5 is a diagram illustrating yet another communication example in which the FD communication is carried out.

In addition, FIG. 5 illustrates yet another communication sequence example in which the FD communication is carried out. Here, FIG. 5 illustrates an example in which the base station performs FD pairing with different terminals as in FIG. 3.

First, each of the terminals UE1 and UE2 notifies the base station of the Capability of the terminal (SEQ501). The base station figures out whether each of the terminals UE1 and UE2 corresponds to the FD based on the received Capability.

Next, the base station notifies each of the terminals UE1 and UE2 connected to the base statin of the link communication quality expected in the terminal or the settings and the instruction for the measurement of the link communication channel quality and the interference condition (SEQ502).

Each of the terminals UE1 and UE2 carries out the communication quality measurement and the inter-UE interference measurement according to the instruction from the base station. Specifically, the terminals UE1 and UE2 transmit reference signals with each other (SEQ503) and measure the inter-UE interference based on the received reference signals (SEQ504). In addition, the base station transmits a reference signal to each of the terminals UE1 and UE2 (SEQ505), and each of the terminals UE1 and UE2 measures the communication quality of the downlink based on the received reference signal (SEQ506). Furthermore, each of the terminals UE1 and UE2 reports the measurement result of the interference condition and the downlink communication quality to the base station (SEQ509).

In addition, each of the terminals UE1 and UE2 transmits a reference signal to the base station (SEQ507). Furthermore, the base station measures the uplink communication quality of each of the terminals UE1 and UE2 based on the received reference signal (SEQ508).

The base station checks whether or not to carry out the FD based on the feedback from each of the terminals UE1 and UE2 and the measurement result of the base station to determine the terminal pair that carriers out the FD (SEQ510). The base station also makes a schedule including the frequency resources, the time resources, the modulation scheme, the error correction coding rate, and the MIMO parameters to be used in the FD (SEQ511). In the example illustrated in FIG. 5, the base station sets the downlink of one terminal UE1 and the uplink of the other terminal UE2 as a pair for the FD and makes a schedule including the transmission timing of the downlink signal to the terminal UE1 and the transmission timing of the uplink signal from the other terminal UE2. Furthermore, the base station uses the control information of the physical layer signal processing to notify each of the terminals UE1 and UE2 of the scheduling information in each allocation of radio resource or uses the system information or the RRC signaling to semi-statically notify each of the terminals UE1 and UE2 of the scheduling information (SEQ512).

Subsequently, the base station and each of the terminals UE1 and UE2 carry out the FD communication or the Non-FD communication based on the transmitted (or received) scheduling information. Specifically, the base station sets the downlink to one terminal UE1 and the uplink from the other terminal UE2 as a pair for the FD, and only the base station carries out the FD (SEQ513).

B. Communication Apparatus Configuration

Figure 6:
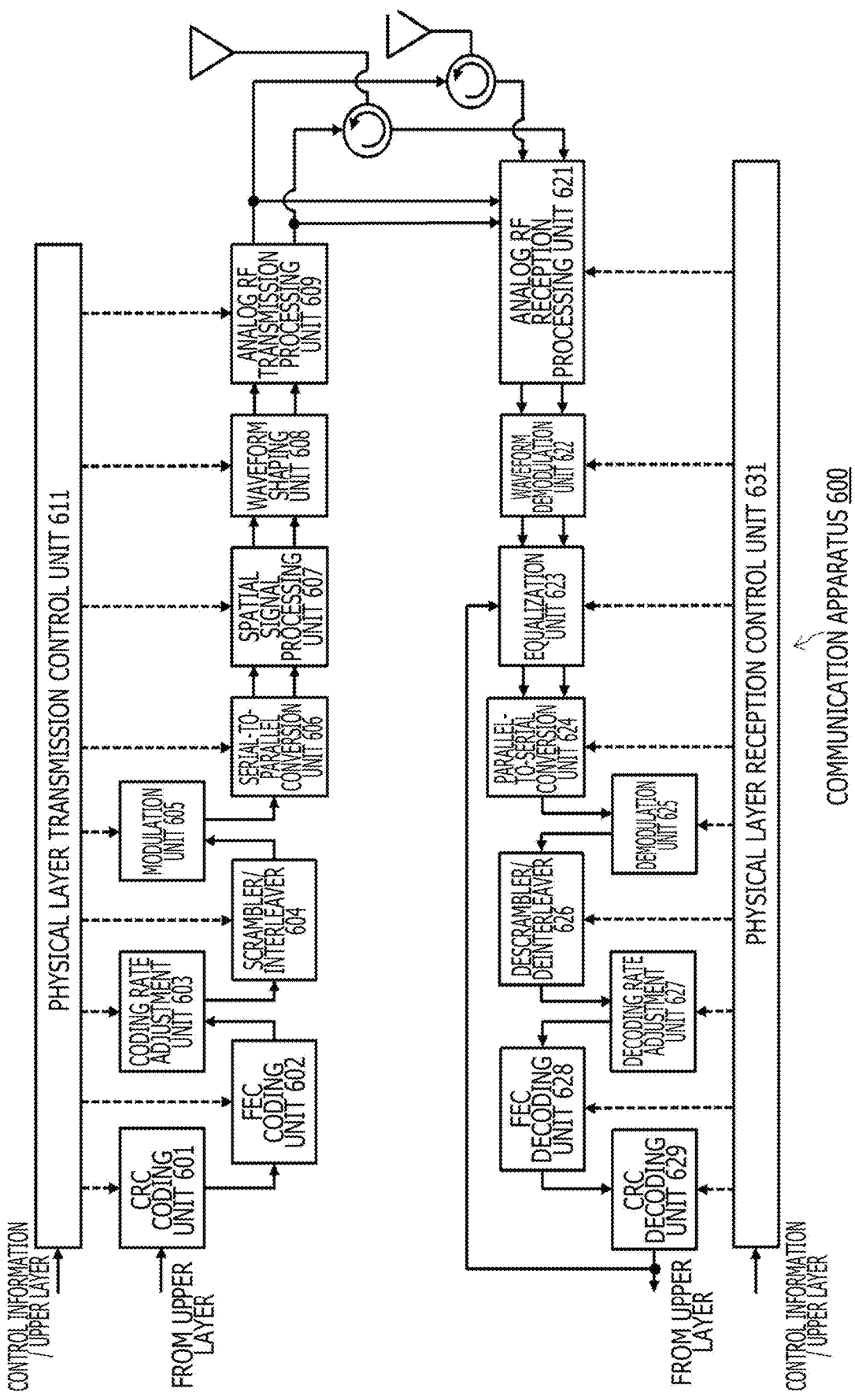
FIG. 6 is a diagram illustrating a configuration example of a communication apparatus corresponding to FD.

FIG. 6 illustrates a configuration example of a communication apparatus 600 corresponding to the FD. It should be understood that in the communication sequences illustrated in FIGS. 3 to 5, the base station and the terminals that carry out the FD have an apparatus configuration illustrated in FIG. 6. An upper half of FIG. 6 corresponds to a physical layer transmission signal processing unit, and a lower half corresponds to a physical layer reception signal processing unit.

The physical layer transmission signal processing unit of the communication apparatus 600 includes a CRC (Cyclic Redundancy Check) coding unit 601, an FEC (Forward Error Correction) coding unit 602, a coding rate adjustment unit 603, a scrambler/interleaver 604, a modulation unit 605, a serial-to-parallel conversion unit 606, a spatial signal processing unit 607, a waveform shaping unit 608, and an analog RF (Radio Frequency) transmission processing unit 609. The physical layer transmission control unit 611 controls the operation of each of the components 601 to 609 according to control information from the physical layer or an upper layer.

In physical layer transmission signal processing, the CRC coding unit 601 first applies CRC coding to user data (data bit sequence) for which the transmission is requested from the upper layer. The FEC coding unit 602 then applies error correction (FEC) coding to the user data, and the coding rate adjustment unit 603 applies coding rate adjustment (Rate Matching) to the user data. The coding rate is adjusted to match the coding rate obtained from the result of scheduling. An example of the result of scheduling includes MCS (Modulation and Coding Scheme). Note that examples of the upper layer that requests for the data transmission include L3 (IP (Internet Protocol)), L2 (SDAP (Service Data Adaptation Protocol), PDCP (Packet Data Convergence Protocol)), RLC (Radio Link Control), and MAC (Media Access Control).

Subsequently, the scrambler/interleaver 604 scrambles or interleaves the transmission bit sequence. Here, it is desirable that the scrambling pattern and the interleaving pattern be patterns specific to the user (for example, determined by the user ID or RNTI (Radio Network Temporary Identifier) of the transmission apparatus or the reception apparatus) and specific to the link type (for example, uplink, downlink, sidelink, access link, backhaul link, or the like). Particularly, the pattern specific to the link type is effective for increasing the advantageous effect of the self-interference canceller in carrying out the FD.

The modulation unit 605 converts the scrambled or interleaved transmission bit sequence into a symbol sequence of real numbers or complex numbers. Specifically, modulation, such as PSK (Phase Shift Keying: phase shift keying) and QAM (Quadrature Amplitude Modulation: quadrature amplitude modulation), is applied. Which modulation level is to be applied is determined from the result (for example, MCS) of scheduling.

The serial-to-parallel conversion unit 606 applies serial-to-parallel conversion (Serial-to-Parallel Conversion) to the modulated symbol sequence for the MIMO, and the spatial signal processing unit 607 applies spatial signal processing, such as, for example, Spatial Precoding and Spatial Power Loading, to the modulated symbol sequence. The parallel number of the serial-to-parallel conversion corresponds to spatial streams (Spatial Stream) and spatial layers (Spatial Layer). The parallel number of the serial-to-parallel conversion and the type of the spatial signal processing are determined from the result (for example, Rank Indicator or Precoding Matrix Indicator) of scheduling.

Subsequently, the waveform shaping unit 608 executes a waveform (Waveform) shaping process of each stream. Examples of the waveform shaping process include OFDMA (Orthogonal Frequency Division Multiple Access), Fourier transform, and inverse Fourier transform. In the waveform shaping process, different types of waveform shaping may be performed according to the link type or according to the result of scheduling. For example, the OFDM may be performed for the downlink, the OFDMA or SC-FDMA (Single Carrier Frequency Division Multiple Access) (or DFT-Spread OFDMA) may be performed for the uplink, and the OFDMA or the SC-FDMA (or DFT-Spread OFDMA) may be performed for the sidelink. After the waveform shaping process, the analog RF transmission processing unit 609 applies analog signal processing and RF signal processing according to the carrier frequency that actually transmits the signal, and the signal is transmitted from an antenna. The number of antennas included in the communication apparatus 600 corresponds to the number of spatial streams.

In addition, the physical layer reception signal processing unit of the communication apparatus 600 includes an analog RF reception processing unit 621, a waveform demodulation unit 622, an equalization unit 623, a parallel-to-serial conversion unit 624, a demodulation unit 625, a descrambler/deinterleaver 626, a decoding rate adjustment unit 627, an FEC decoding unit 628, and a CRC decoding unit 629. The physical layer reception control unit 631 controls the operation of each of the components 621 to 629 according to the control information from the physical layer or the upper layer.

In the case of the FD, a desirable signal from another communication apparatus as a communication partner, an interference signal from the surroundings, and a signal including a self-interference signal from the communication apparatus are received by the antennas on the reception side. The reception signal of each antenna is input to the analog RF reception processing unit 621 through a circulator. In physical layer reception signal processing, the analog RF reception processing unit 621 first removes or reduces the self-interference signal in the analog region in the analog signal processing and the RF signal processing of the reception signal. The self-interference signal removal of the analog RF reception processing unit 621 may be turned off at the time of the non-execution of the FD. It is desirable that ON/OFF of the FD be determined based on the result of scheduling.

Subsequently, the waveform demodulation unit 622 executes a waveform demodulation process on the reception side according to the waveform of the desirable signal. Examples of the waveform demodulation process include the OFDM demodulation, the Fourier transform, and the inverse Fourier transform. Furthermore, the equalization unit 623 carries out equalization (Equalization) for compensating variations in the radio wave propagation in the desirable signal. In the equalization, channel estimation (Channel Estimation) for estimating the amount of variation in the propagation propagation is carried out. In addition, at the time of the FD, the equalization unit 623 executes a process for removing or reducing the self-interference signal in the digital domain. However, the removal or the reduction of the self-interference signal may be turbo equalization (Turbo Equalization) or iterative equalization (Iterative Equalization) after the feedback of the result of digital demodulation or FEC decoding in a later stage. In addition, at the time of the non-execution of the FD, the process for removing or reducing the self-interference signal in the digital region may be turned off at the time of the non-execution of the FD.

After the equalization, the parallel-to-serial conversion unit 624 performs parallel-to-serial conversion (Parallel-to-Serial Conversion) of the spatial streams and the spatial layers, and then the demodulation unit 625 converts the received complex symbol sequence into a soft bit sequence (LLR (Log Likelihood Ratio), Soft Information, or the like). It is desirable that the conversion be determined based on the result (for example, MCS) of scheduling.

Subsequently, the descrambler/deinterleaver 626 carries out descrambling or deinterleaving corresponding to the scrambling pattern or the interleaving pattern used on the transmission side. It is desirable that the patterns be patterns specific to the user (for example, for example, determined by the user ID or the RNTI of the transmission apparatus or the reception apparatus) and specific to the link type (for example, uplink, downlink, sidelink, access link, backhaul link, or the like).

Subsequently, the decoding rate adjustment unit 627 and the FEC decoding unit 628 carry out coding rate conversion (Rate De-matching) and FEC decoding (Decoding) corresponding to the FEC coding method and the FEC coding rate used on the transmission side to decode the soft bit sequence into the bit sequence of the user data. The decoding method, the coding rate, and the like are determined based on the result (for example, MCS) of scheduling. The CRC decoding unit 629 performs the CRC to determine whether or not there is a bit error in the decoded bit sequence. The decoded bit sequence of the user data and the determination result of the CRC are transferred to the upper layer (described above), and the subsequent operation is decided. If the bit error is not detected in the CRC, an ACK is transmitted to the communication partner. On the other hand, in a case where the bit error is detected, a NACK is transmitted to the communication partner. In that case, a process, such as retransmission (for example, HARQ (Hybrid Automatic Repeat Request)), is executed later.

The result of scheduling of the base station is reflected on the control information (Control Information) for controlling the physical layer signal processing on the transmission side and the reception side. The information is exchanged by using, for example, downlink control information (Downlink Control Information: DCI) transmitted through a physical downlink control channel (Physical Downlink Control Channel: PDCCH) or RRC (Radio Resource Control) signaling transmitted through a physical broadcast channel (Physical Broadcast Channel: PBCH) or a physical downlink shared channel (Physical Downlink Shared Channel: PDSCH).

C. Switching Means of FD

In the present embodiment, the base station generally determines, as part of scheduling, whether or not to carry out the FD. In this regard, the base station needs to evaluate which link of a terminal can perform the FD with which link of another terminal.

For example, when the link communication quality or the data rate (or the frequency use efficiency) is not adversely affected (or is not affected much) even if the base station receives an uplink signal from another terminal while transmitting a downlink signal to a terminal (in other words, even if the transmission of an uplink signal from another terminal is started), the terminals can be paired as terminals that perform the FD.

Figure 7:
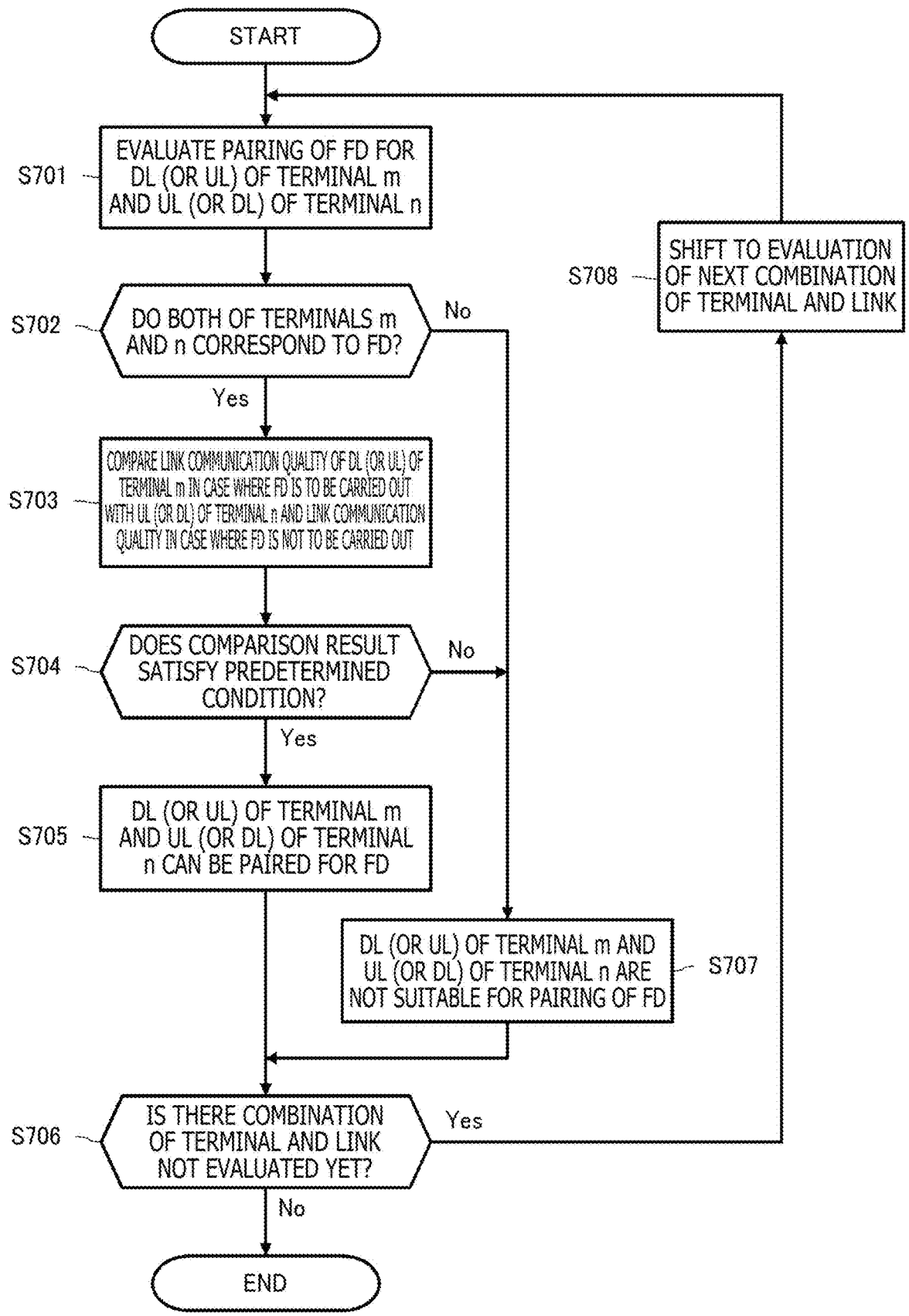
FIG. 7 is a flow chart illustrating a procedure for evaluating pairing capable of FD.

FIG. 7 illustrates, in a format of a flow chart, a procedure executed by the base station to evaluate pairing capable of FD (or suitable for FD). It is desirable that the pairing evaluation be evaluated for all of the combinations of the terminals connected to the base station (or the cells controlled by the base station) and the link types.

In the evaluation of pairing, it is first assumed that the link types are different in two terminals (terminal m and terminal n in FIG. 7). In FIG. 7, the base station makes an evaluation for a case of performing the FD of the downlink (DL) of the terminal m and the uplink (UL) of the terminal n (the link types may be the uplink of the terminal m and the downlink of the terminal n) (step S701). Furthermore, the base station determines whether both the terminal m and the terminal n correspond to the FD (step S702). The information of whether the terminals correspond to the FD can be figured out in, for example, the protocol or the communication sequence between the base station and the terminals as illustrated in FIG. 5.

Here, in a case where both the terminal m and the terminal n do not correspond to the FD (No in step S702), the base station determines that the combination is not suitable for the FD (step S707).

Furthermore, in a case where both the terminal m and the terminal n correspond to the FD (Yes in step S702), the base station then compares the link communication quality of the downlink (or the uplink) of the terminal m in a case where the FD is not to be carried out with the uplink (or the downlink) of the terminal n and the link communication quality of the downlink (or the uplink) of the terminal m in a case where the FD is to be carried out with the uplink (or the downlink) of the terminal n (step S703). For example, the base station can compare the link communication quality in the case where the FD is to be carried out and the link communication quality in the case where the FD is not to be carried out based on the level of the MCS or the CQI that can be attained (described later).

Furthermore, in a case where the comparison result of the link quality in the case where the FD is to be carried out and the link quality in the case where the FD is not to be carried out satisfies a predetermined condition (Yes in step S704), the base station determines that the downlink (or the uplink) of the terminal m and the uplink (or the downlink) of the terminal n can be paired for the FD (step S705). On the other hand, in a case where the comparison result of the link quality in the case where the FD is to be carried out and the link quality in the case where the FD is not to be carried out does not satisfy the predetermined condition (No in step S704), the base station determines that the combination is not suitable for the FD (step S707).

In a case where there are still combinations of terminals and combinations of link types not evaluated yet in the determination flow (Yes in step S706), the base station continuously evaluates the remaining combinations (step S708). The base station evaluates the suitability for the pairing of the FD, for all of the pairs (for all combinations including the link directions) of the terminals connected to the base station (or the terminals connected to the cell controlled by the base station). In addition, once the evaluation of all of the combinations is finished (No in step S706), the present process ends.

In the determination step S704, examples of the "predetermined condition" in comparing the link communication quality of the downlink (or the uplink) of the terminal m in the case where the FD is not to be carried out with the uplink (or the downlink) of the terminal n and the link communication quality of the downlink (or the uplink) of the terminal m in the case where the FD is to be carried out with the uplink (or the downlink) of the terminal n include the following (a) and (b).

(a) The result of the link quality measurement value measured at the time of non-FD (at the time of HD (Half Duplex)) (or at the time not corresponding to FD) and the result of the link quality measurement value measured at the time of FD are almost the same.

(b) The data rate (or the frequency use efficiency) that can be attained at the time of non-FD (at the time of HD) (or at the time not corresponding to FD) and the data rate (or the frequency use efficiency) that can be attained at the time of FD are almost the same.

In the description above, "almost the same" denotes that the link quality measurement value, the data rate, and the frequency use efficiency are worse in the case where the FD is carried out than in the case where the FD is not carried out in terms of analog values, but in the case where the link quality measurement value, the data rate, and the frequency use efficiency are discretized, the link quality measurement value, the data rate, and the frequency use efficiency in the case where the FD is carried out fall within the same range as the case where the FD is not carried out or are just degraded by an amount equivalent to a predetermined discrete value (for example, equivalent to 1 level) at most. Examples of the discretized data rate and frequency use efficiency include MCS and CQI. In a case where the MCS level and the CQI level in the case where the FD is carried out are the same as the case where the FD is not carried out or are just degraded by less than a predetermined level, it can be assumed that the link communication quality is "almost the same." Table 1 and Table 2 illustrate examples of the MCS, and Table 3 and Table 4 illustrate examples of the CQI.

TABLE 1

| MCS Index $I_{MC}$ | Modulation Order $Q_m$ | Modulation Order $Q_m$ | TBS Index $I_{TBS}$ |
|---|---|---|---|
| 0 | 2 | 2 | 0 |
| 1 | 2 | 2 | 1 |
| 2 | 2 | 2 | 2 |
| 3 | 2 | 2 | 3 |
| 4 | 2 | 2 | 4 |
| 5 | 2 | 4 | 5 |
| 6 | 2 | 4 | 6 |
| 7 | 2 | 4 | 7 |
| 8 | 2 | 4 | 8 |
| 9 | 2 | 4 | 9 |
| 10 | 4 | 6 | 9 |
| 11 | 4 | 6 | 10 |
| 12 | 4 | 6 | 11 |
| 13 | 4 | 6 | 12 |
| 14 | 4 | 6 | 13 |
| 15 | 4 | 6 | 14 |
| 16 | 4 | 6 | 15 |
| 17 | 6 | 6 | 15 |
| 18 | 6 | 6 | 16 |
| 19 | 6 | 6 | 17 |
| 20 | 6 | 6 | 18 |
| 21 | 6 | 6 | 19 |
| 22 | 6 | 6 | 20 |
| 23 | 6 | 6 | 21 |
| 24 | 6 | 6 | 22 |
| 25 | 6 | 6 | 23 |
| 26 | 6 | 6 | 24 |
| 27 | 6 | 6 | 25 |
| 28 | 6 | 6 | 26/26A |
| 29 | 2 | 2 | reserved |
| 30 | 4 | 4 | |
| 31 | 6 | 6 | |

TABLE 2

| MCS Index $I_{MC}$ | Modulation Order $Q_m$ | Modulation Order $Q_m$ | TBS Index $I_{TBS}$ |
|---|---|---|---|
| 0 | 2 | 2 | 0 |
| 1 | 2 | 2 | 2 |
| 2 | 2 | 2 | 4 |
| 3 | 2 | 4 | 6 |
| 4 | 2 | 4 | 8 |
| 5 | 4 | 6 | 10 |
| 6 | 4 | 6 | 11 |
| 7 | 4 | 6 | 12 |
| 8 | 4 | 6 | 13 |
| 9 | 4 | 6 | 14 |
| 10 | 4 | 8 | 15 |
| 11 | 6 | 8 | 16 |
| 12 | 6 | 8 | 17 |
| 13 | 6 | 8 | 18 |
| 14 | 6 | 8 | 19 |
| 15 | 6 | 8 | 20 |
| 16 | 6 | 8 | 21 |
| 17 | 6 | 8 | 22 |
| 18 | 6 | 8 | 23 |
| 19 | 6 | 8 | 24 |
| 20 | 8 | 8 | 25 |
| 21 | 8 | 8 | 27 |
| 22 | 8 | 8 | 28 |
| 23 | 8 | 8 | 29 |
| 24 | 8 | 8 | 30 |
| 25 | 8 | 8 | 31 |
| 26 | 8 | 8 | 32 |
| 27 | 8 | 8 | 33/33A/33B |
| 28 | 2 | 2 | reserved |
| 29 | 4 | 4 | |
| 30 | 6 | 6 | |
| 31 | 8 | 8 | |

TABLE 3

| CQI index | modulation | code rate × 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.377 |
| 4 | QPSK | 308 | 0.6016 |
| 5 | QPSK | 449 | 0.877 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 4

| CQI index | modulation | code rate × 1024 | efficiency |
|---|---|---|---|
| 0 | | out of range | |
| 1 | QPSK | 78 | 0.1523 |
| 2 | QPSK | 193 | 0.377 |
| 3 | QPSK | 449 | 0.877 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

Table 1 and Table 2 described above are examples of the discretized MCS. The "MCS Index" in Table 1 and Table 2 denotes a discretized value of the link communication quality. The value of the MCS Index determines the modulation level of the PSK or the QAM and the FEC coding rate. The tables cover QPSK/16 QAM/64 QAM. Note that Table 1 and Table 2 are also described in 3GPP specifications TS 36.213 (V14.4.0), Section 7.1.7.

In addition, Table 3 and Table 4 described above are examples of the discretized CQI. The "CQI Index" in Table 3 and Table 4 denotes a discretized value of the link communication quality. The value of the CQI Index determines the modulation level of the PSK or the QAM and the FEC coding rate. The tables cover QPSK/16 QAM/64 QAM/256 QAM. Note that Table 3 and Table 4 are also described in 3GPP specifications TS 36.213 (V14.4.0), Section 7.2.3.

The pairing of the FD can be set such that the measurement value of the link quality or the discrete value of the communication quality value is "almost the same," and in this way, the same communication quality can be maintained before and after the switch of the FD even in a case where the FD is switched. In addition, the control information (Control Information), such as MCS and CQI, does not have to be changed before and after the switch of the FD, and this can reduce the amount of Control Information between the base station and the terminal that needs to be exchanged for the switch. In the best case, the Control Information does not have to be exchanged at the time of the FD switch. For example, five bits are used to notify the MCS, and four bits are used to notify the CQI. The MCS or the CQI is not changed before and after the switch of the FD, and this can reduce the amount of data equivalent to the number of bits of the MCS or the CQI from the Control Information.

It is desirable that the content as in Tables 1 to 4 described above be figured out in advance between the base station and the terminal. For example, the content may be implemented in advance in apparatuses of the base station and each terminal in a form of a lookup table.

Furthermore, in the determination step S704 of the flow chart illustrated in FIG. 7, the "predetermined condition" in comparing the link communication quality of the downlink (or the uplink) of the terminal m in the case where the FD is not to be carried out with the uplink (or the downlink) of the terminal n and the link communication quality of the downlink (or the uplink) of the terminal m in the case where the FD is to be carried out with the uplink (or the downlink) of the terminal n may also be taken into account as follows.

Figure 20:
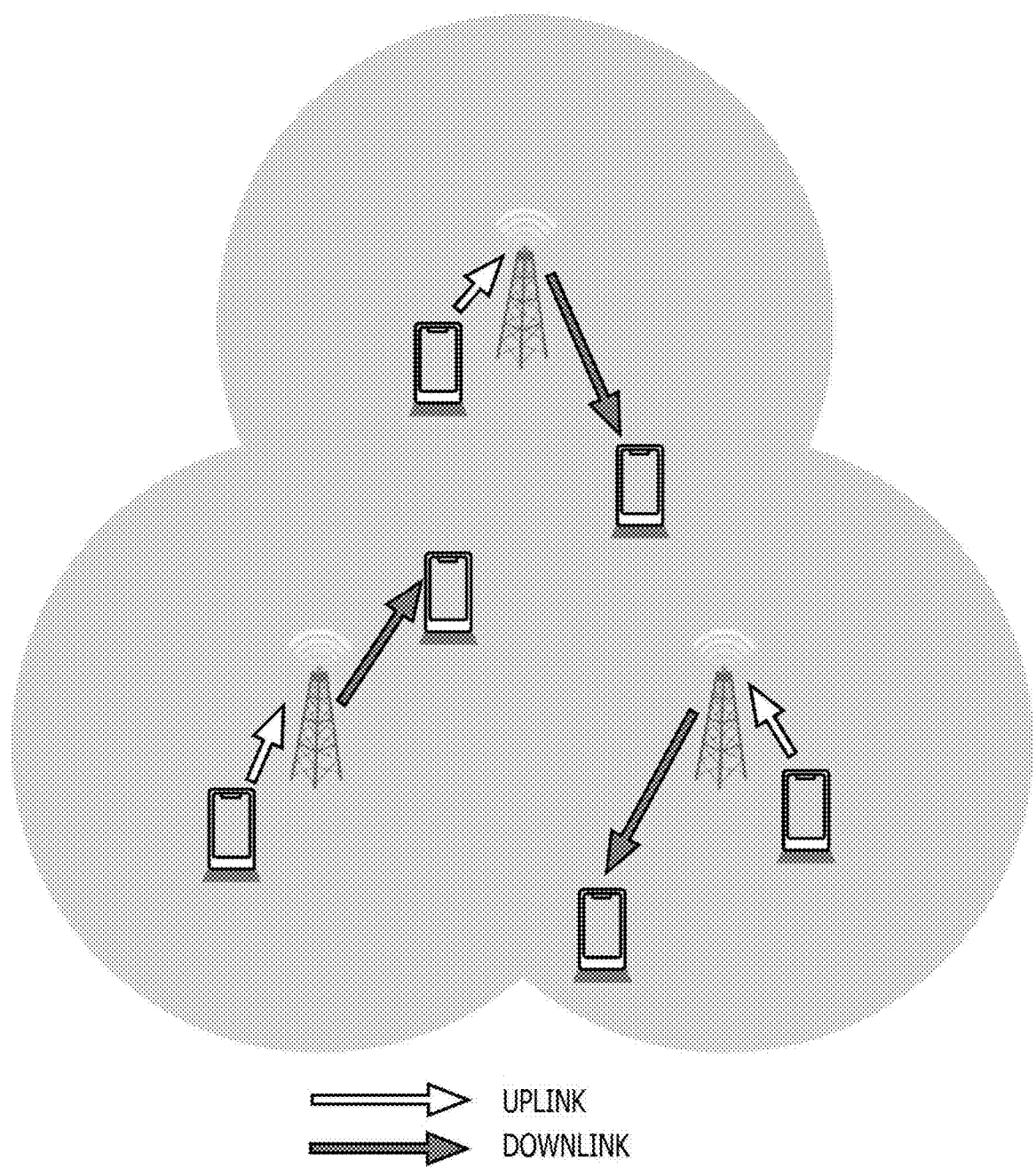
FIG. 20 is a diagram illustrating a relative relationship between a terminal of an uplink and a terminal of a downlink paired in the FD.

The relative relationship between the terminal of the uplink and the terminal of the downlink to be paired for the FD may be taken into account (see FIG. 20).

For example, in the pairing of the FD, the distance between the terminal of the uplink to be paired and the base station and the distance between the base station and the terminal of the downlink may be directly taken into account. The distance here is a two-dimensional distance or a three-dimensional distance. Specifically, it is desirable that the terminal of the uplink to be paired be close to the connected base station (closer to the center of the cell) compared to the terminal of the downlink to be paired. For example, the transmission power of the terminal of the uplink can be suppressed to suppress the interference in the downlink signal transmitted from the base station to the terminal of the downlink, and the communication quality of the uplink signal and the downlink signal can be maintained.

Furthermore, in the pairing of the FD, the path loss between the terminal of the uplink to be paired and the base station and the path loss between the terminal of the downlink and the base station may be taken into account. In this case, it is desirable that the path loss of the uplink terminal to be paired be smaller than the path loss of the downlink terminal to be paired.

Furthermore, the RSRP, the RSRQ, or the RSSI of the terminal of the uplink and the RSRP, the RSRQ, or the RSSI of the terminal of the downlink may be taken into account in the pairing of the FD. In this case, it is desirable that the RSRP, the RSRQ, or the RSSI of the uplink terminal to be paired be greater than the RSRP, the RSRQ, or the RSSI of the downlink terminal to be paired.

Furthermore, in the pairing of the FD, the CQI or the MCS of the uplink terminal and the CQI or the MCS of the downlink terminal may be taken into account. In this case, it is desirable that the CQI or the MCS of the uplink terminal to be paired be greater than the CQI or the MCS of the downlink terminal to be paired.

Although the suitability for pairing is determined by a relative index (such as distance, path loss, RSRP, RSRQ, RSSI, CQI, and MCS) of the uplink terminal and the downlink terminal to be paired in the description above, the suitability for pairing in the terminal of the uplink and the aptitude for pairing in the terminal of the downlink may be separately (independently) determined for each terminal.

For example, a predetermined threshold can be set for an index, such as distance, path loss, RSRP, RSRQ, RSSI, CQI, and MCS, in the uplink, and the base station can determine that the terminal has an aptitude to be paired as a terminal of the uplink in a case where the index of the terminal is higher than the threshold of the uplink (lower than the threshold depending on the index). Similarly, a predetermined threshold can be set for an index, such as distance, path loss, RSRP, RSRQ, RSSI, CQI, and MCS, in the downlink, and the base station can determine that the terminal has an aptitude to be paired as a terminal of the downlink in a case where the index of the terminal is lower than the threshold of the downlink (higher than the threshold depending on the index).

Note that the threshold of each index in the uplink and the threshold of each threshold in the downlink may be separate values for the uplink and the downlink or may be the same (common) values. The uplink threshold and the downlink threshold may be common for some indices, and the uplink threshold and the downlink threshold may be separate values for other indices.

Figure 21:
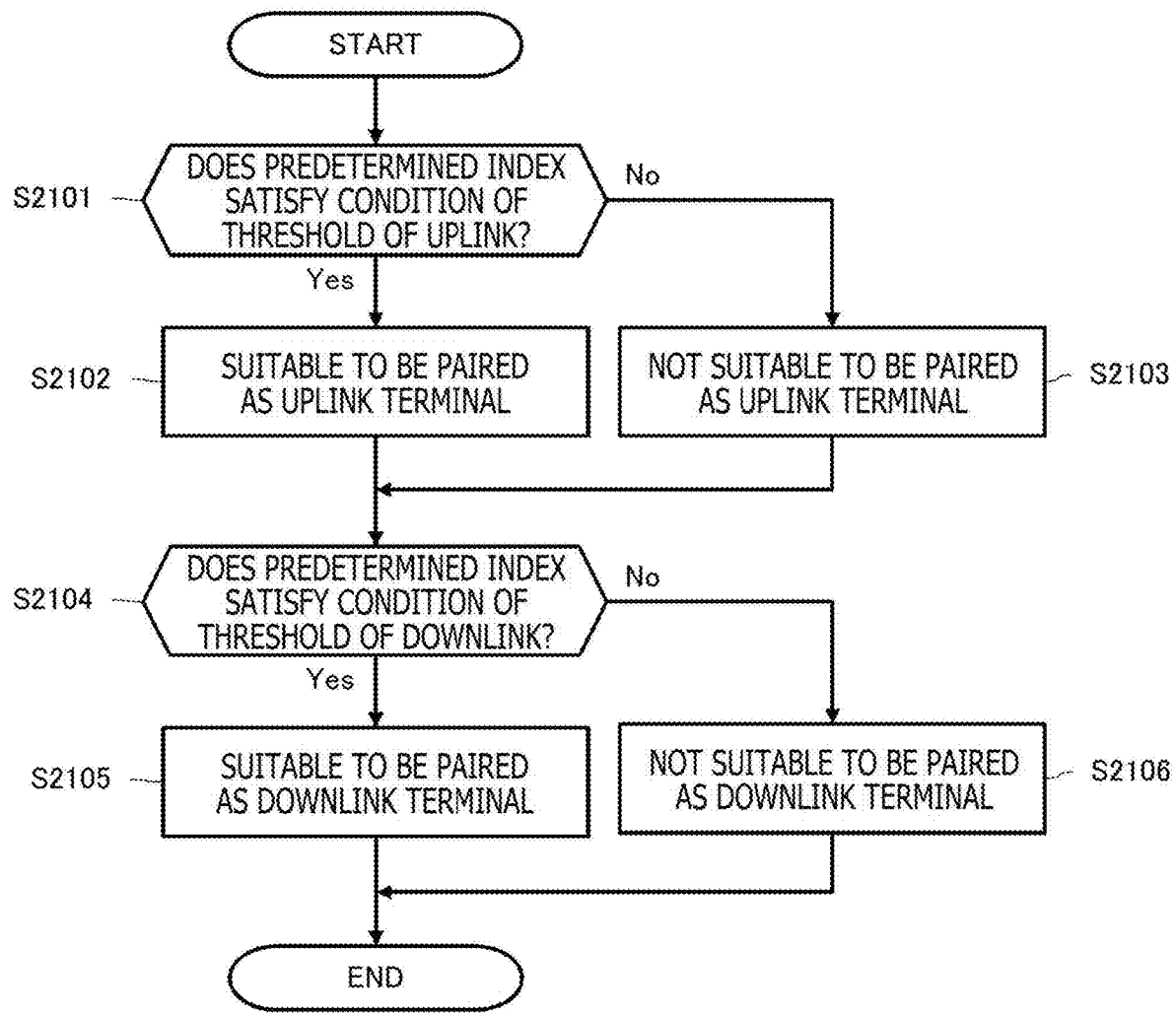
FIG. 21 is a flow chart illustrating a procedure for separately determining an aptitude for FD pairing in each terminal.

FIG. 21 illustrates, in a format of a flow chart, a procedure in which the suitability for pairing as a terminal of the uplink and the aptitude for pairing as a terminal of the downlink are separately (independently) determined for each terminal. Although, for example, the base station separately applies the illustrated procedure to each terminal under the control of the base station, each terminal may execute the illustrated procedure and notify the connected base station of the determination result.

First, the base station checks whether a predetermined index of the terminal to be processed satisfies the condition of the threshold of the uplink (step S2101).

Furthermore, in a case where the predetermined index satisfies the condition of the threshold of the uplink (Yes in step S2101), the base station determines that the terminal has an aptitude to be paired as a terminal of the uplink (step S2102). Furthermore, in a case where the same index does not satisfy the condition of the threshold of the uplink (No in step S2101), the base station determines that the terminal does not have an aptitude to be paired as a terminal of the uplink (step S2103).

Subsequently, the base station checks whether a predetermined index of the terminal to be processed satisfies the condition of the threshold of the downlink (step S2104).

Furthermore, in a case where the predetermined index satisfies the condition of the threshold of the downlink (Yes in step S2104), the base station determines that the terminal has an aptitude to be paired as a terminal of the downlink (step S2105). Furthermore, in a case where the same index does not satisfy the condition of the threshold of the downlink (No in step S2104), the base station determines that the terminal does not have an aptitude to be paired as a terminal of the uplink (step S2106).

In such a way, the base station can separately (independently) determine whether or not each terminal has an aptitude to be paired as a terminal of the uplink and an aptitude to be paired as a terminal of the downlink and can perform FD pairing of the terminals having aptitudes. Note that depending on the terminal, there may be a case in which the terminal satisfies both the condition of the index as a terminal of the uplink and the condition of the index as a terminal of the downlink.

The "switch of FD" in the present specification denotes a change in the situation (change from FD to HD or change from HD to FD) of whether or not to perform the FD (or FD and HD (TDD or FDD)) as viewed from a communication apparatus (terminal or base station). In addition, a change in the pair of communication apparatuses executing the FD (pair or combination of communication apparatuses in the link in which the FD is performed) also corresponds to the "switch of FD."

D. Example 1

Here, an example of switching the FD in a unit of resource allocation will be described. In Example 1, the base station mainly carries out the FD, and the terminal does not carry out the FD. Specifically, the base station simultaneously performs the downlink transmission to a terminal and the uplink reception from another terminal in the example.

The base station allocates, to each terminal, the radio resources (frequency resources (such as resource blocks) and time resources (such as subframes, slots, and mini slots)) to be used by the terminal in the communication (such as downlink reception, uplink transmission, and sidelink transmission) based on the result of scheduling. In the conventional FD, the link type (from downlink to uplink or from uplink to downlink) is not switched in the time unit (for example, subframe, slot, or the like) of allocating the radio resources. On the other hand, the FD is switched in the unit of time resource allocated to the user in the present embodiment.

It is desirable that the allocated "radio resources" here be specifically radio resources for carrying information related to the user data (for example, physical downlink shared channel (PDSCH), physical uplink shared channel (Physical Uplink Shared Channel: PUSCH), sidelink shared channel (Physical Sidelink Shared Channel: PSSCH), and the like).

Figure 8:
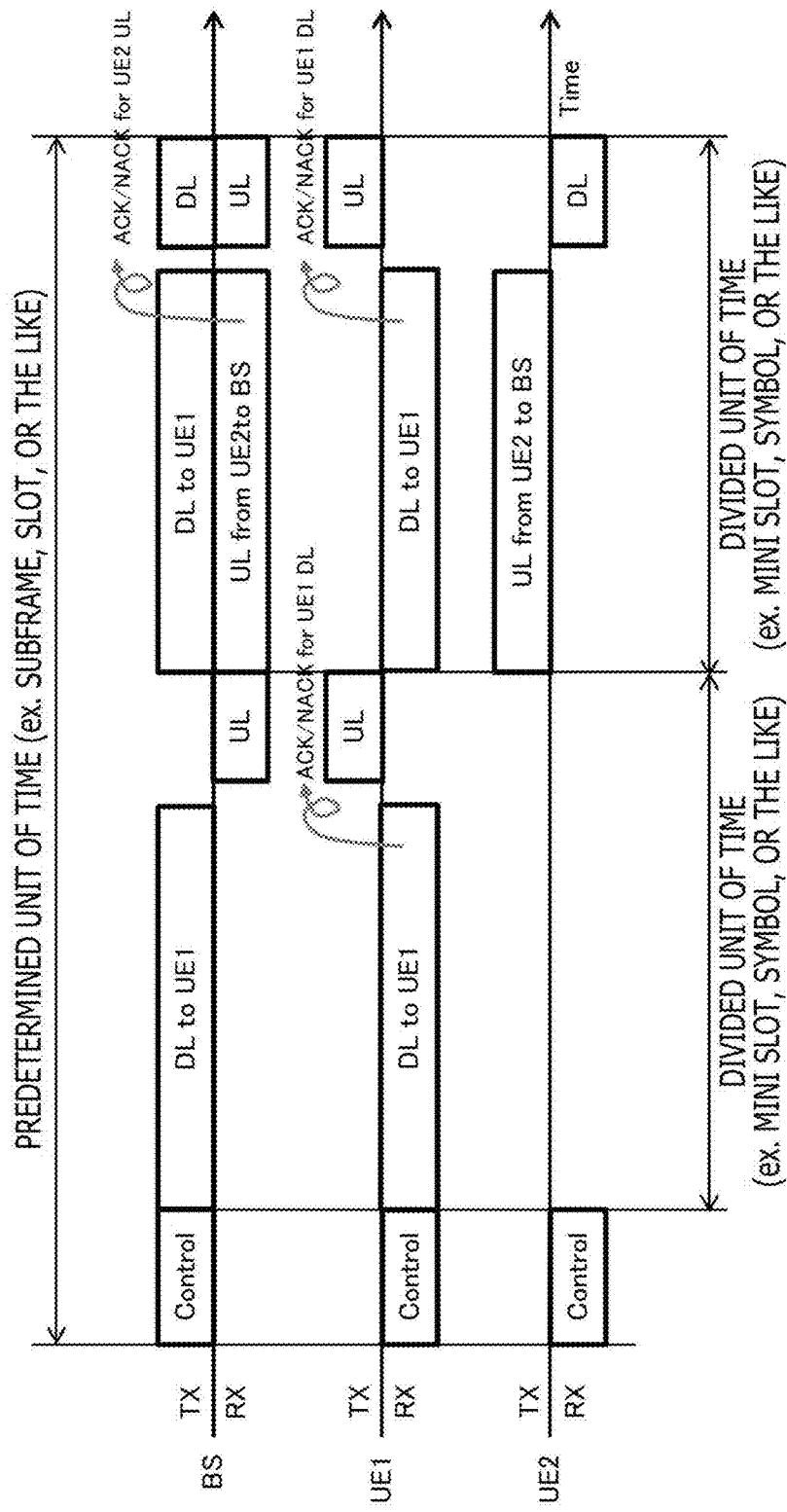
FIG. 8 is a diagram illustrating a communication sequence example including a switch of the FD in a unit of resource allocation.

FIG. 8 illustrates a communication sequence example including the switch of the FD in the unit of resource allocation in the communication system including one base station (BS) and two terminals UE1 and UE2 connected to the base station. In FIG. 8, the horizontal axis is a time axis. In addition, it should be understood that the upper side of the time axis of each communication apparatus denotes a transmission process, and the lower side denotes a reception process. In addition, FIG. 8 illustrates a communication sequence example in which a predetermined unit of time (for example, subframe or slot) is divided into two divided units of time (for example, mini slots or symbols), and the FD is switched in the divided units of time.

"Control" at the top of the radio resource denotes a control channel. The BS uses the control channel to notify each of the terminals UE1 and UE2 of the control information (Control Information) and the like including the scheduling information of each radio resource and the like.

In a first mini slot, the FD is not carried out (that is, only the HD is carried out). The BS transmits the downlink (DL) signal to the UE1. In addition, the UE1 transmits the ACK/NACK for a target downlink signal at the end of the mini slot.

In a second mini slot, the BS carries out the FD, and the terminal pair that carries out the FD in the mini slot is switched just once. In the first half of the mini slot, the BS transmits the downlink signal to the UE1 and receives the uplink signal from the UE2 at the same time. Furthermore, at the end of the second mini slot, the BS switches the terminal pair that carries out the FD to receive the ACK/NACK for the downlink signal from the UE1 and transmit the ACK/NACK for the uplink signal to the UE2 at the same time. It is assumed that the downlink signal and the uplink signal use the same or overlapping frequency resources and the same or overlapping time resources.

It is desirable that the downlink and uplink signals in the first half be signals that carry the user data in the case of the second mini slot in FIG. 8. In addition, it is desirable that at least one of the downlink and uplink signals after the FD switch in the second half of the mini slot be a signal regarding the ACK/NACK. In addition, it is desirable that the temporal lengths (for example, the numbers of symbols, the products of the symbol lengths and the numbers of symbols, and the like) of the signals that carry the user data in the first half of the mini slot be the same. In other words, it is desirable that the number of resources allocated for the downlink signal and the number of resources allocated for the uplink signal be the same. This is because the self-interference canceller can be easily controlled if the temporal length of the user data of the downlink from the BS to the UE1 and the temporal length of the user data of the uplink from the UE2 to the BS are the same (in other words, if the end positions of both of the data frames match). For a similar reason, it is preferable that the reception timing of the ACK/NACK from the UE1 and the timing that the BS starts to transmit the ACK/NACK to the UE2 match.

Furthermore, in the case of performing the FD switch of the user data and the ACK/NACK in one unit of time (mini slot) as illustrated in FIG. 8, it is desirable to set a predetermined number of times (for example, once) as the upper limit of the number of FD switches in the allocated time resource. It is desirable to use the Control Information to transmit the predetermined number of times and the timing of the switch (for example, described by the number of symbols) from the base station to the terminal.

Figure 9:
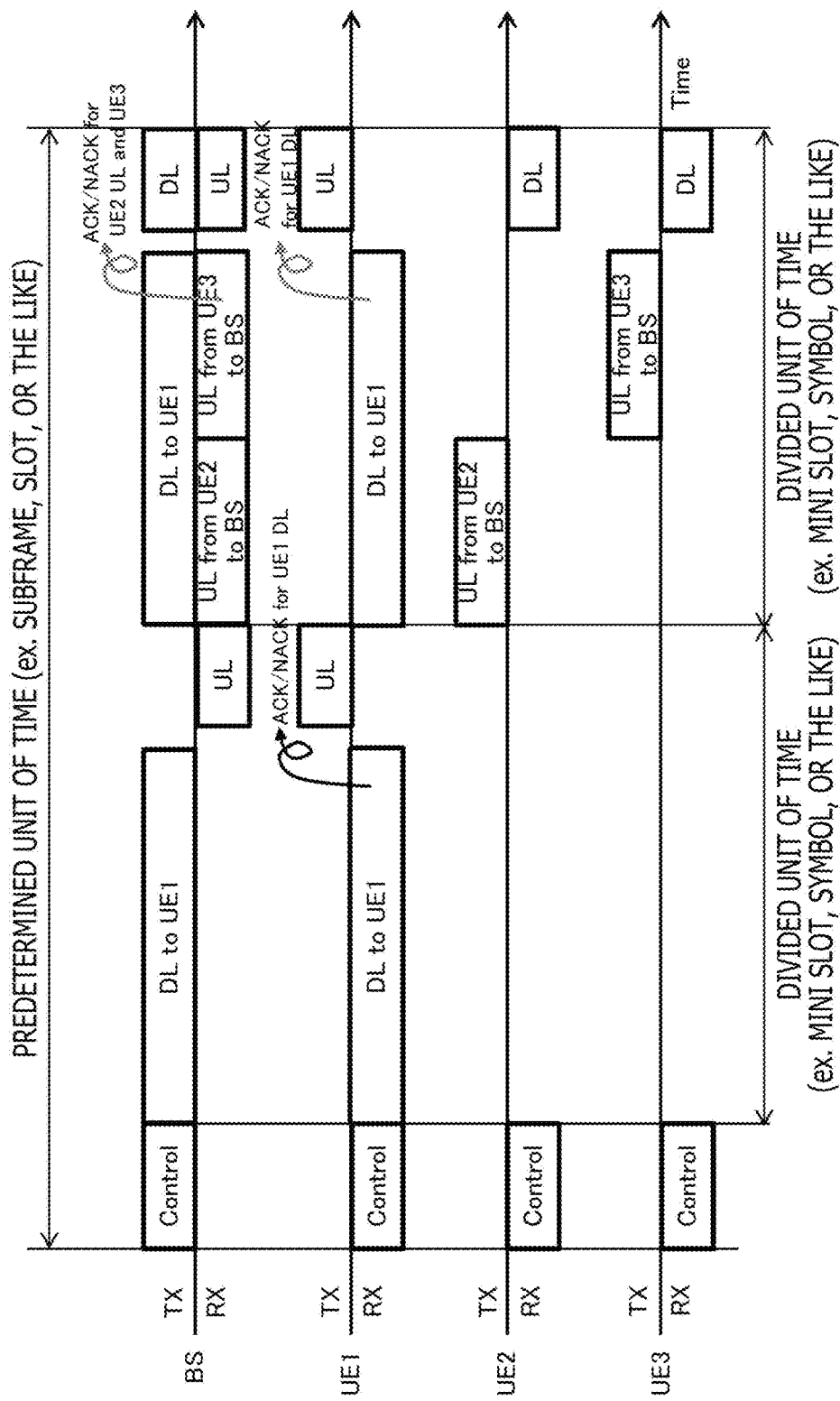
FIG. 9 is a diagram illustrating a communication sequence example including the switch of the FD in the unit of resource allocation (example in which the FD is switched twice in a divided unit of time).

FIG. 9 illustrates a communication sequence example in a case where the FD is switched twice in the mini slot. It is assumed in FIG. 9 that the communication system includes one base station (BS) and three terminals UE1, UE2, and UE3 connected to the base station. In addition, the horizontal axis in FIG. 9 is a time axis. The upper side of the time axis of each communication apparatus denotes a transmission process, and the lower side denotes a reception process. Furthermore, a predetermined unit of time (for example, subframe or slot) is divided into two divided units of time (for example, mini slots or symbols).

The BS uses the control channel (Control) at the top of the radio resource to notify each of the terminals UE1, UE2, and UE3 of the control information (Control Information) and the like including the scheduling information of each radio resource and the like.

In the first mini slot, the FD is not carried out (that is, only the HD is carried out). The BS transmits the downlink (DL) signal to the UE1. In addition, the UE1 transmits the ACK/NACK for the target downlink signal at the end of the mini slot.

In the second mini slot, the BS carries out the FD, and the terminal pair that carries out the FD in the mini slot is switched twice. In the first half of the mini slot, the BS transmits the downlink signal to the UE1 and receives the uplink at the same time. It is assumed that the downlink signal and the uplink signal use the same or overlapping frequency resources and the same or overlapping time resources.

The first switch of the FD is at the time that the transmission apparatus of the uplink is switched from the UE2 to the UE3. At this point, in the case where the condition for the pairing of the FD described above is adopted, the communication quality of the downlink of the UE1 is almost the same including the HD and the FD, and the UE1 can receive the downlink signal even if the same transmission parameters (such as Control information and MCS) are continuously used for the transmission. That is, the transmission parameters, such as MCS, of the downlink signal do not have to be changed between the period in which the UE2 transmits the signal and the period in which the UE3 transmits the signal.

The second switch of the FD in the second mini slot is at time of the switch from the transmission of the user data signal to the transmission of the ACK/NACK signal as in the example illustrated in FIG. 8. That is, at the end of the second mini slot, the BS switches the terminal pair that carries out the FD to receive the ACK/NACK for the downlink signal from the UE1 and transmit the ACK/NACK for the uplink signals to the UE2 and the UE3 at the same time.

As illustrated in FIG. 9, it is desirable to use the transmission parameters, such as MCS, without changing the transmission parameters regardless of the switch of the FD, in terms of simplifying the signaling and in terms of controlling the self-interference canceller. However, the transmission parameters, such as MCS, may be switched according to the switch of the FD.

Note that it is desirable that the temporal length (for example, the number of symbols, the product of the symbol length and the number of symbols, and the like) of the user data of the downlink from the BS to the UE1 and the total temporal length of the user data of the uplink from the UE2 to the BS and the user data of the uplink from the UE3 to the BS be the same (in other words, the end positions of both of the data frames match). This is because the control of the self-interference canceller is facilitated. In other words, it is desirable that the number of resources allocated for the downlink signal and the number of resources allocated for the uplink signal be the same. In addition, for a similar reason, it is preferable that the reception timing of the ACK/NACK from the UE1 and the timing that the BS starts to transmit the ACK/NACK to the UE2 and the UE3 match.

In the communication sequence example illustrated in FIG. 9, it is assumed that the transmission parameters, such as MCS, are not changed when the transmission apparatus of the user data of the uplink is switched from the UE2 to the UE3 while the user data of the downlink is transmitted from the BS to the UE1 in the mini slot, in terms of simplifying the signaling and the like. Obviously, the transmission parameters, such as MCS, may also be switched when the transmission apparatus of the user data of the uplink is switched.

Figure 10:
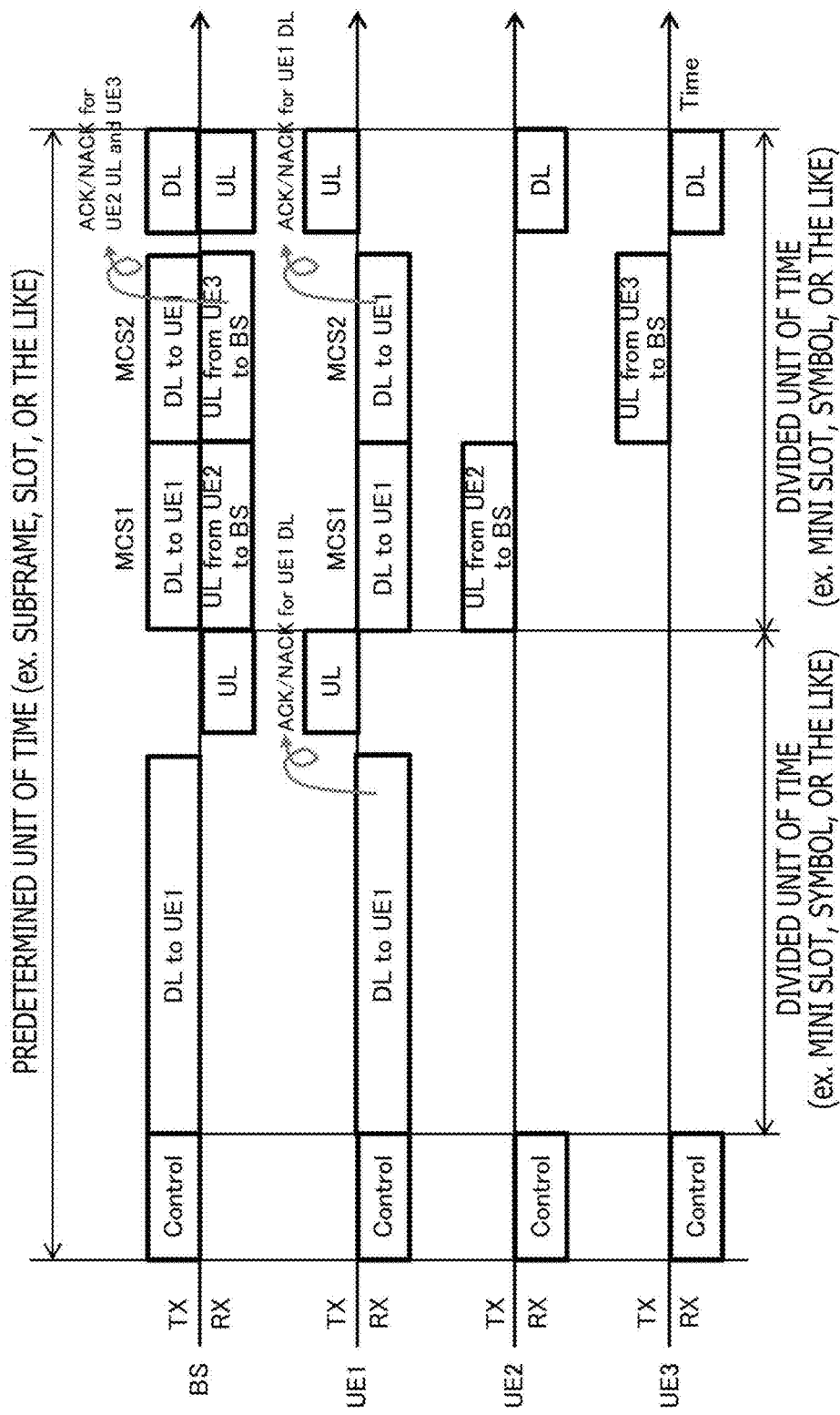
FIG. 10 is a diagram illustrating a communication sequence example including the switch of the FD in the unit of resource allocation (example in which transmission parameters are switched according to the switch of the FD).

FIG. 10 illustrates a communication sequence example in a case where the FD is switched in the mini slot, and the transmission parameters, such as MCS, are switched according to the switch of the FD. It is assumed in FIG. 10 that the communication system includes one base station (BS) and three terminals UE1, UE2, and UE3 connected to the base station as in FIG. 9. In addition, the horizontal axis in FIG. 10 is a time axis. The upper side of the time axis of each communication apparatus denotes a transmission process, and the lower side denotes a reception process. Furthermore, a predetermined unit of time (for example, subframe or slot) is divided into two divided units of time (for example, mini slots or symbols).

The BS uses the control channel (Control) at the top of the radio resource to notify each of the terminals UE1, UE2, and UE3 of the control information (Control Information) and the like including the scheduling information of each radio resource and the like.

In the first mini slot, the FD is not carried out (that is, only the HD is carried out). The BS transmits the downlink (DL) signal to the UE1. In addition, the UE1 transmits the ACK/NACK for the target downlink signal at the end of the mini slot.

In the second mini slot, the BS carries out the FD, and the terminal pair that carries out the FD in the mini slot is switched twice. In the first half of the mini slot, the BS transmits the downlink signal to the UE1 and receives the uplink at the same time. It is assumed that the downlink signal and the uplink signal use the same or overlapping frequency resources and the same or overlapping time resources.

The first switch of the FD is at the time that the transmission apparatus of the uplink is switched from the UE2 to the UE3. In this case, it is desirable that the timing of the switch of the MCS (for example, the number of symbols, the symbol length×the number of symbols, or the like) match the timing of the switch of the FD. That is, it is desirable that the boundary of the switch of the MCS of the downlink signal to the UE1 in FIG. 10 match the boundary between the uplink signal from the UE2 and the uplink signal from the UE3. The MCS at the time that the BS transmits the downlink signal to the UE2 will be referred to as MCS1, and the MCS at the time that the BS transmits the downlink signal to the UE3 will be referred to as MCS2.

Furthermore, in a case where the signal to the same terminal (downlink signal to the UE1 in the case of FIG. 10) is to be divided into two or more pieces, the signal can be divided into transport blocks (Transport Block, including one or more code blocks), or the signal can be divided into code blocks (Code Block or Code Block Group). That is, the signal can be divided such that the boundary between the transport blocks or the code blocks corresponds to the boundary of the switch of the MCS and the FD. In the case where the signal is divided in such a way, the transmission parameters, such as MCS, may vary in each transport block or code block (particularly, it is desirable to change the transmission parameters in the case of the transport block). In the case where the transmission parameters are to be changed, it is desirable that the base station use the Control Information to notify the terminal of the change.

The second switch of the FD in the second mini slot is at the time of the switch from the transmission of the user data signal to the transmission of the ACK/NACK signal as in the example illustrated in FIG. 9. That is, at the end of the second mini slot, the BS switches the terminal pair that carries out the FD to receive the ACK/NACK for the downlink signal from the UE1 and transmit the ACK/NACK to the uplink signals to the UE2 and UE3 at the same time.

E. Example 2

In an example described here, the communication apparatus switches the FD to receive (or transmit) the ACK/NACK while transmitting (or receiving) the user data. This can significantly contribute to the reduction of Round-trip Delay to realize low latency communication.

In addition, while the base station mainly carries out the FD in Example 1, both the base station and the terminal carry out the FD in Example 2. Specifically, the base station simultaneously performs the downlink transmission to a terminal and the uplink reception from the terminal, and the terminal side simultaneously performs the downlink reception from the base station and the uplink transmission to the base station in the example.

Figure 11:
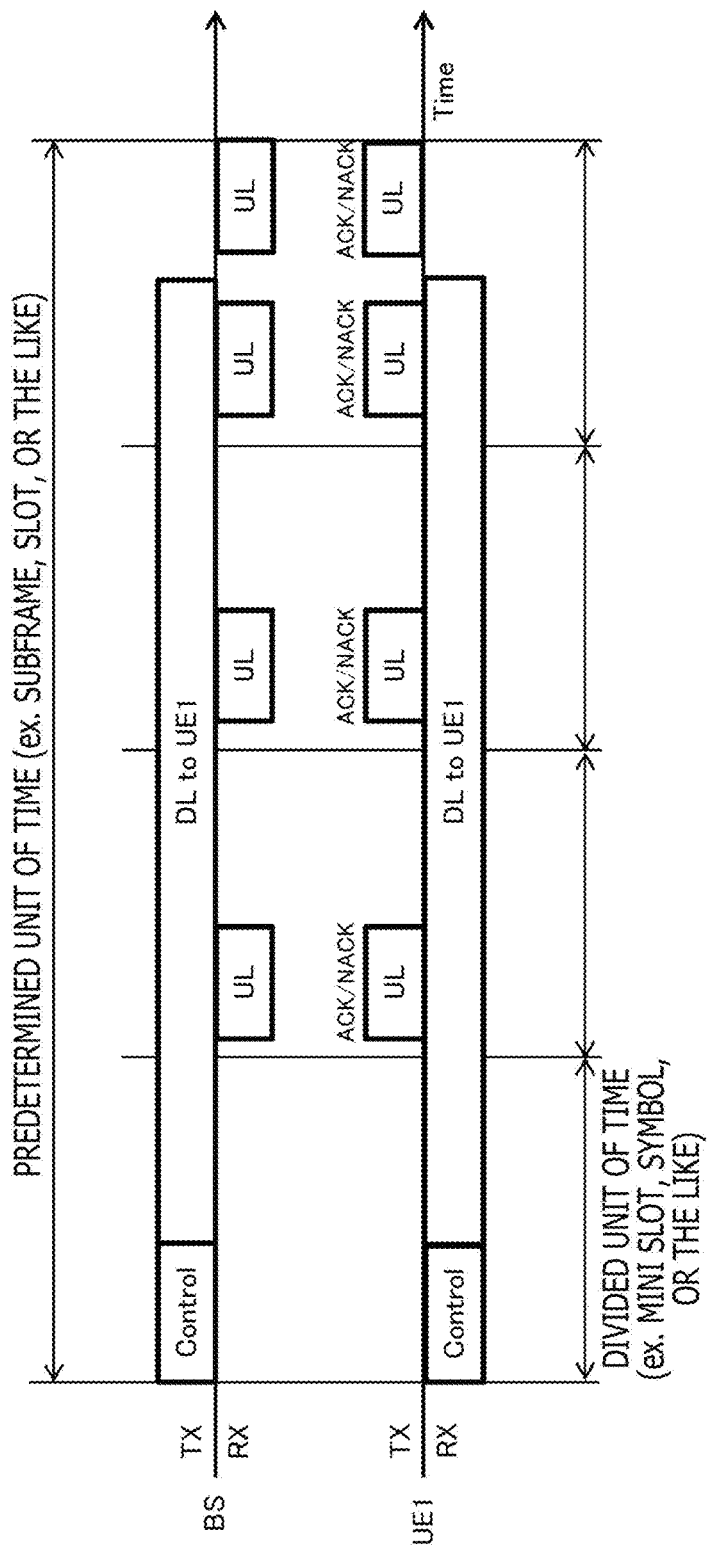
FIG. 11 is a diagram illustrating a communication sequence example of switching the FD to receive (or transmit) ACK/NACK while transmitting (or receiving) user data.

FIG. 11 illustrates a communication sequence example of switching the FD to receive (or transmit) the ACK/NACK while transmitting (or receiving) the user data in the communication system including one base station (BS) and one terminal UE1. The horizontal axis in FIG. 11 is a time axis. The upper side of the time axis of each communication apparatus denotes a transmission process, and the lower side denotes a reception process. Furthermore, an allocated predetermined unit of time (for example, subframe or slot) is divided into a plurality of (four in the illustrated example) divided units of time (for example, mini slots or symbols).

The BS uses the control channel (Control) at the top of the radio resource to notify the terminal UE1 of the control information (Control Information) and the like including the scheduling information of each radio resource and the like.

The BS transmits the downlink (DL) signal to the UE1. On the other hand, while the UE1 continuously receives the downlink signal in the allocated predetermined unit of time (for example, subframe or slot), the UE1 uses the uplink (UL) signal to transmit the ACK/NACK corresponding to the data carried in the received signal. It is assumed that the downlink signal and the uplink signal use the same or overlapping frequency resources and the same or overlapping time resources. Therefore, the BS carries out the FD to transmit the downlink signal to the UE1 and receive the ACK/NACK from the UE1 at the same time. In addition, the UE1 also carries out the FD to receive the downlink signal from the BS and transmit the ACK/NACK signal to the BS at the same time.

Furthermore, in the communication sequence example illustrated in FIG. 11, the UE1 transmits the ACK/NACK corresponding to the downlink signal from the BS for a plurality of times in the allocated predetermined unit of time. For example, the UE1 transmits the ACK/NACK corresponding to the transport block, the code block, or the code block group of the downlink signal.

It is desirable that the timing and the number of times that the UE1 transmits the ACK/NACK in the allocated predetermined unit of time be dynamically designated from the BS to the UE1 for each allocation of radio resource through the downlink control information (Downlink Control Information) or be semi-statically designated through the system information (System Information) or the RRC signaling (The downlink control information (Downlink Control Information)) is transmitted by using the physical downlink control channel (PDCCH). On the other hand, the system information (System Information) or the RRC signaling are transmitted by using the physical broadcast channel (Physical Broadcast Channel) or the physical downlink shared channel (Physical Downlink Shared Channel). Therefore, the notification to the UE1 regarding the allocation of the reception radio resources of the downlink signal from the BS and the notification regarding the allocation of the transmission radio resource of the uplink signal from the UE1 are issued through different channels.

The FD occurs during the transmission and the reception of the ACK/NACK between the BS and the UE1. Therefore, if the switch timing of the FD is notified or designated in advance between the BS and the UE1, the self-interference canceller can be allowed to operate only in the period (or a period including several symbols before and after the period), and this can contribute to reducing the signal processing load and the power consumption at the time of the reception.

In addition, for the last part of the predetermined unit of time (for example, the last mini slot or symbol in the predetermined unit of time) allocated to the UE1 as a reception radio resource of the downlink signal, the UE1 needs to return the ACK/NACK of the received signal, and therefore, the reception of the downlink signal needs to be already finished. Therefore, for only the last ACK/NACK, it is desirable to set the arrangement of the signals (downlink signal and ACK/NACK) so that the reception of the signal is finished before the last ACK/NACK. In other words, in a case where there are two or more reception radio resources, the transmission radio resource temporally paired with the last reception radio resource (last mini slot or symbol) does not temporally overlap.

Figure 12:
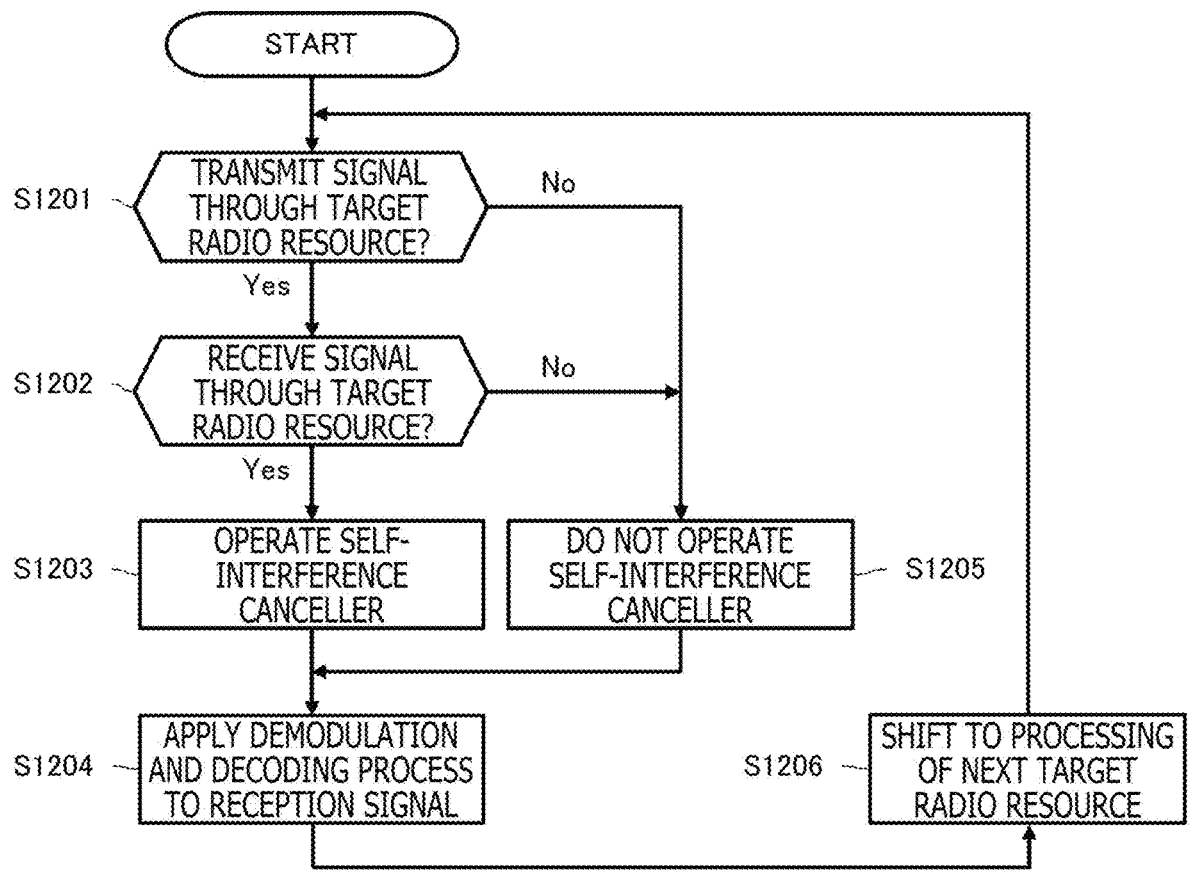
FIG. 12 is a flow chart illustrating a procedure executed by the communication apparatus (base station or terminal) to control operation of a self-interference canceller associated with the switch of the FD.

FIG. 12 illustrates, in a format of a flow chart, a procedure executed by the communication apparatus (base station or terminal) to control the operation of the self-interference canceller associated with the switch of the FD.

In a case where the communication apparatus transmits a signal in a target radio resource (Yes in step S1201) and receives a signal in the target radio resource (Yes in step S1202), the communication apparatus causes the self-interference canceller to operate (step S1203).

On the other hand, in a case where the communication apparatus does not transmit a signal in the target radio resource (No in step S1201) or in a case where the communication apparatus transmits a signal in the target radio resource (Yes in step S1201) but does not receive a signal (No in step S1202), in other words, in a case where the communication apparatus does not carry out the FD, the communication apparatus does not cause the self-interference canceller to operate (step S1205).

Furthermore, the communication apparatus applies a demodulation and decoding process to the reception signal (step S1204) while causing the self-interference canceller to operate, or without causing the self-interference canceller to operate, and then shifts to the process of the next target radio resource (step S1206).

Figure 13:
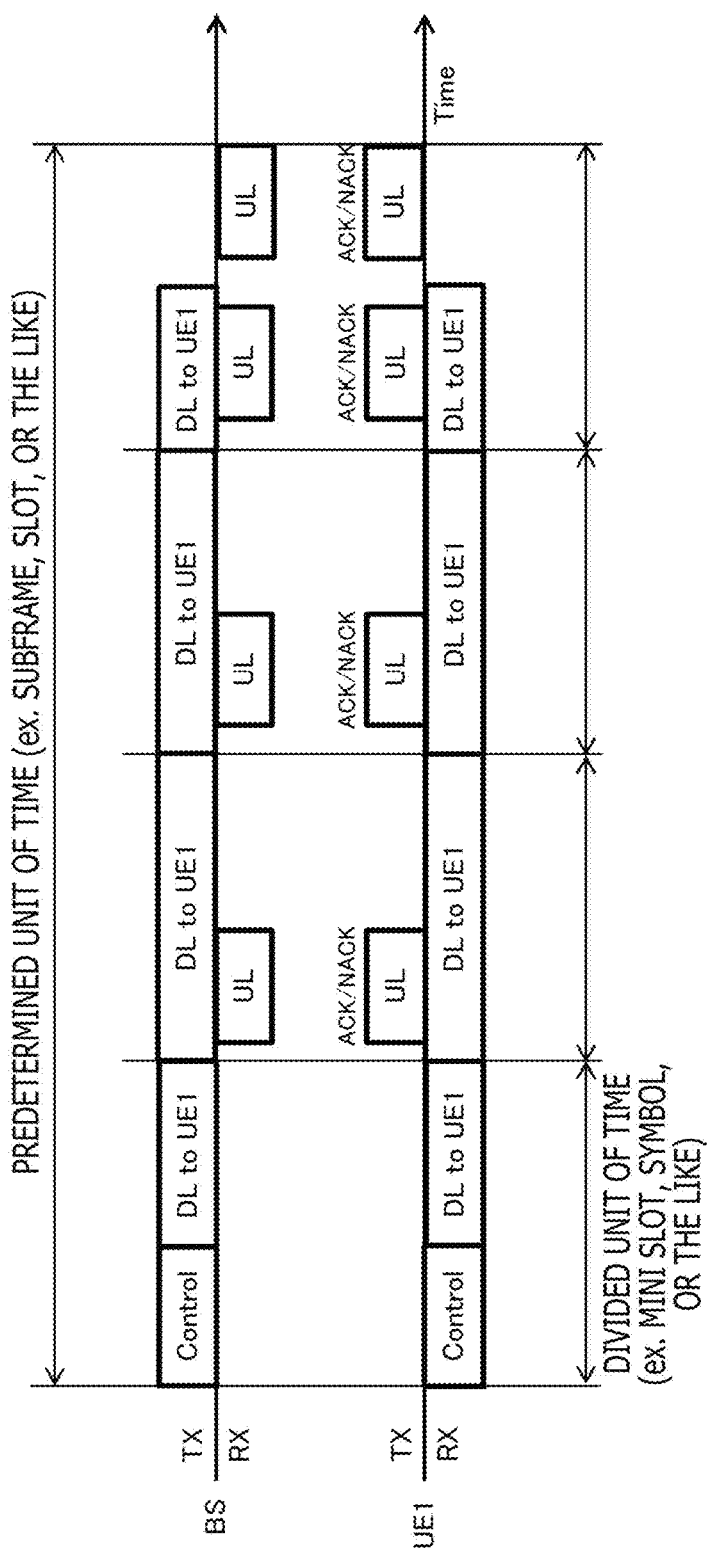
FIG. 13 is a diagram illustrating another communication sequence example of switching the FD to receive (or transmit) the ACK/NACK while transmitting (or receiving) the user data.

FIG. 13 illustrates another communication sequence example of switching the FD to transmit (or receive) the user data and receive (or transmit) the ACK/NACK at the same time in the communication system including one base station (BS) and one terminal UE1. The horizontal axis in FIG. 13 is a time axis. The upper side of the time axis of each communication apparatus denotes a transmission process, and the lower side denotes a reception process.

The BS uses the control channel (Control) at the top of the radio resource to notify the terminal UE1 of the control information (Control Information) and the like including the scheduling information of each radio resource and the like.

The BS transmits the downlink (DL) signal to the UE1. On the other hand, while the UE1 continuously receives the downlink signal in the allocated predetermined unit of time (for example, subframe or slot), the UE1 uses the uplink (UL) signal to transmit the ACK/NACK corresponding to the data carried by the received signal. It is assumed that the downlink signal and the uplink signal use the same or overlapping frequency resources and the same or overlapping time resources. Therefore, the BS carries out the FD to transmit the downlink signal to the UE1 and receive the ACK/NACK from the UE1 at the same time. In addition, the UE1 also carries out the FD to receive the downlink signal from the BS and transmits the ACK/NACK signal to the BS at the same time.

In the example illustrated in FIG. 13, the allocated predetermined unit of time (for example, subframe or slot) is divided into a plurality of (four in the illustrated example) divided units of time (for example, mini slots and symbols). The division can be associated with the boundaries of the transport block (Transport Block: TB), the code block (Code Block: CB), and the code block group (CB Group: CBG) of the data (user data transmitted in the downlink signal to the UE1) to easily calculate the ACK/NACK.

The divided sections can be mini slots or the like. It is desirable that the timing and the number of times of transmitting the ACK/NACK during the allocation be dynamically designated from the BS to the UE1 for each allocation through the control information or be semi-statically designated through the system information (System Information) or the RRC signaling. An example of the method of designation includes designation for using an (a+b)th mini slot (corresponding to b=1 in FIG. 13) to transmit the ACK/NACK for the data received in an ath mini slot.

Here, in a case where the (a+b)th mini slot is not allocated to the UE1 (specifically, the ath mini slot corresponds to the last mini slot in FIG. 13), the UE1 uses the ath mini slot to transmit the ACK/NACK. In such a case or for the last part of the reception radio resources allocated to the UE1 (the last mini slot in the predetermined unit of time), the ACK/NACK of the received signal needs to be returned, and therefore, the reception of the downlink signal needs to be already finished. Therefore, at the time of the ACK/NACK, it is desirable to set the arrangement of the signals (downlink signal and ACK/NACK) so that the reception of the signal is finished before the ACK/NACK.

As for the transmission parameters (such as MCS) in transmitting the signal including the user data, the same transmission parameters can be used regardless of whether or not the FD is carried out in transmitting the ACK/NACK in the case where the FD pairing is taken into account in the pairing. It is desirable to use the same transmission parameters in terms of simplifying the control information (Control Information), the system information (System Information), and the RRC signaling and in terms of reducing the overhead.

On the other hand, there is no restriction that the transmission parameters need to be the same, and therefore, the transmission parameters may be changed according to whether or not the FD is carried out in transmitting the ACK/NACK. In this case, considering the MCS, it is desirable that the value of the data rate (frequency use efficiency) when the FD is carried out in transmitting the ACK/NACK (and FD in general) be the same as or smaller than the value of the data rate when the FD is not carried out in transmitting the ACK/NACK (and FD in general). For example, as for the MCS index of Table 1, it is desirable that the MCS Index at the time of the FD be equal to or smaller than 20 in a case where the MCS Index at the time of non-FD is 20.

Figure 14:
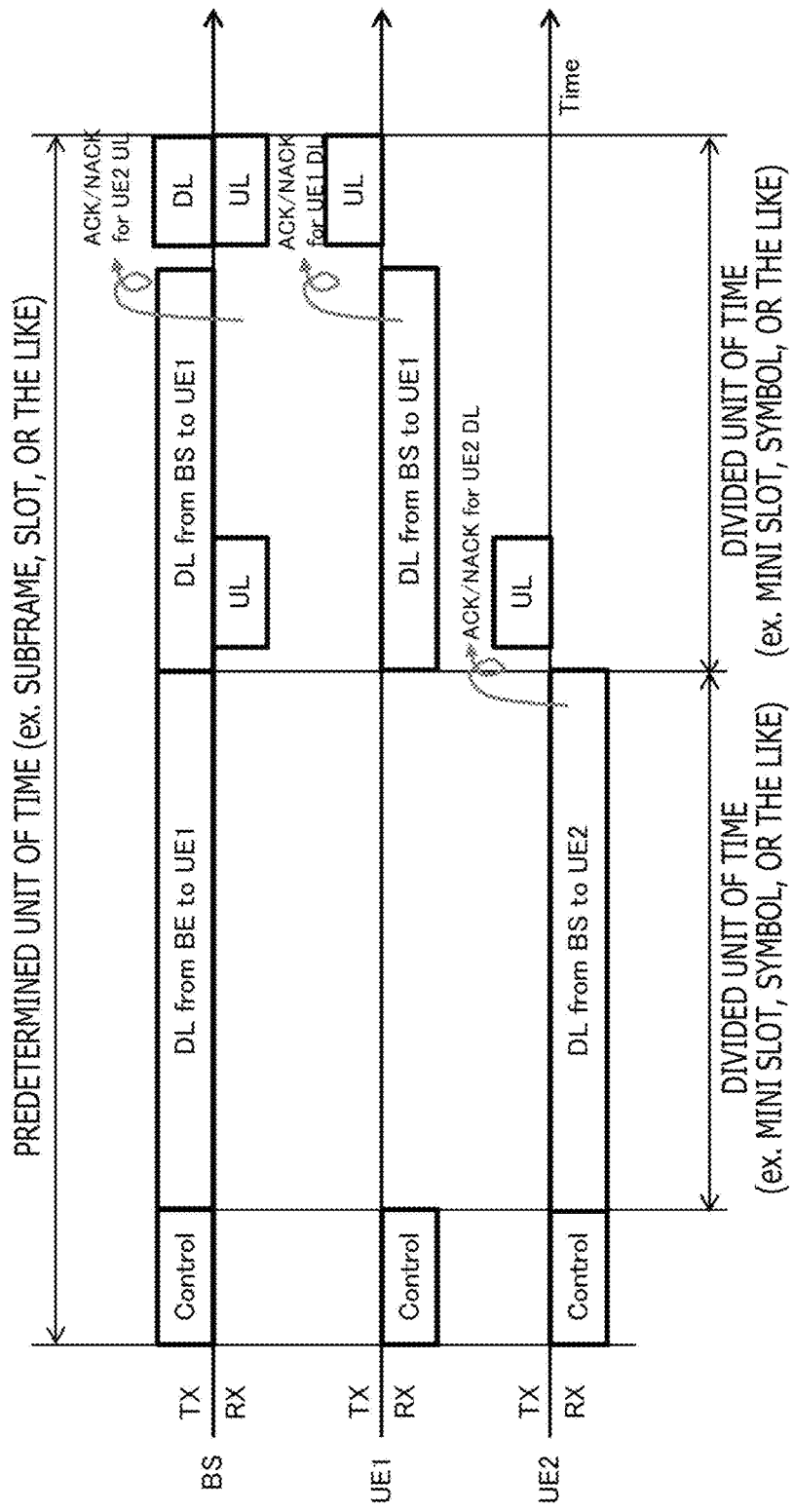
FIG. 14 is a diagram illustrating yet another communication sequence example of switching the FD to transmit (receive) the user data and receive (or transmit) the ACK/NACK at the same time.

FIG. 14 illustrates yet another communication sequence example of switching the FD to transmit (or receive) the user data and receive (or transmit) the ACK/NACK at the same time in the communication system including one base station (BS) and two terminals UE1 and UE2 connected to the base station. The horizontal axis in FIG. 14 is a time axis. The upper side of the time axis of each communication apparatus denotes a transmission process, and the lower side denotes a reception process. Furthermore, the predetermined unit of time (for example, subframe or slot) is divided into two divided units of time (for example, mini slots or symbols).

The BS uses the control channel (Control) at the top of the radio resource to notify each of the terminals UE1 and UE2 of the control information (Control Information) and the like including the scheduling information of each radio resource and the like.

It is assumed that the first mini slot is allocated for the reception of the downlink signal of the UE2, and the second mini slot is allocated for the reception of the downlink signal of the UE1.

In the first mini slot, the FD is not carried out (that is, only the HD is not carried out). That is, the BS transmits the downlink signal (DL) to the UE2 without carrying out the FD (that is, carrying out only the HD). Here, the BS continues to transmit the downlink signal up to the end of the first mini slot, and therefore, the UE2 cannot use the resource (mini slot) allocated for the reception of the UE2 to transmit the ACK/NACK.

In the second mini slot, the BS transmits the downlink signal to the UE1. Here, although the second mini slot is not allocated to the UE2, the transmission of the ACK/NACK is permitted. Therefore, the UE2 can transmit, to the BS, the ACK/NACK for the downlink signal received in the first mini slot. It is assumed that the downlink signal and the uplink signal use the same or overlapping frequency resources and the same or overlapping time resources. Therefore, the BS carries out the FD to transmit the downlink signal to the UE1 and receive the ACK/NACK signal from the UE2 at the same time in the second mini slot. In addition, the UE1 transmits the ACK/NACK for the target downlink signal at the end of the second mini slot.

In short, the transmission of the ACK/NACK for the data of the signal received in the ath mini slot is permitted regardless of the allocation of the (a+b)th mini slot in the communication sequence example illustrated in FIG. 14. Therefore, even if the ACK/NACK cannot be transmitted in the unit of time (such as mini slot and symbol) allocated for the reception of the downlink signal on the terminal side, the unit of time allocated for the reception of the downlink signal of another terminal can be used (that is, after the completion of the reception) to transmit the ACK/NACK without carrying out the FD, for example.

Figure 15:
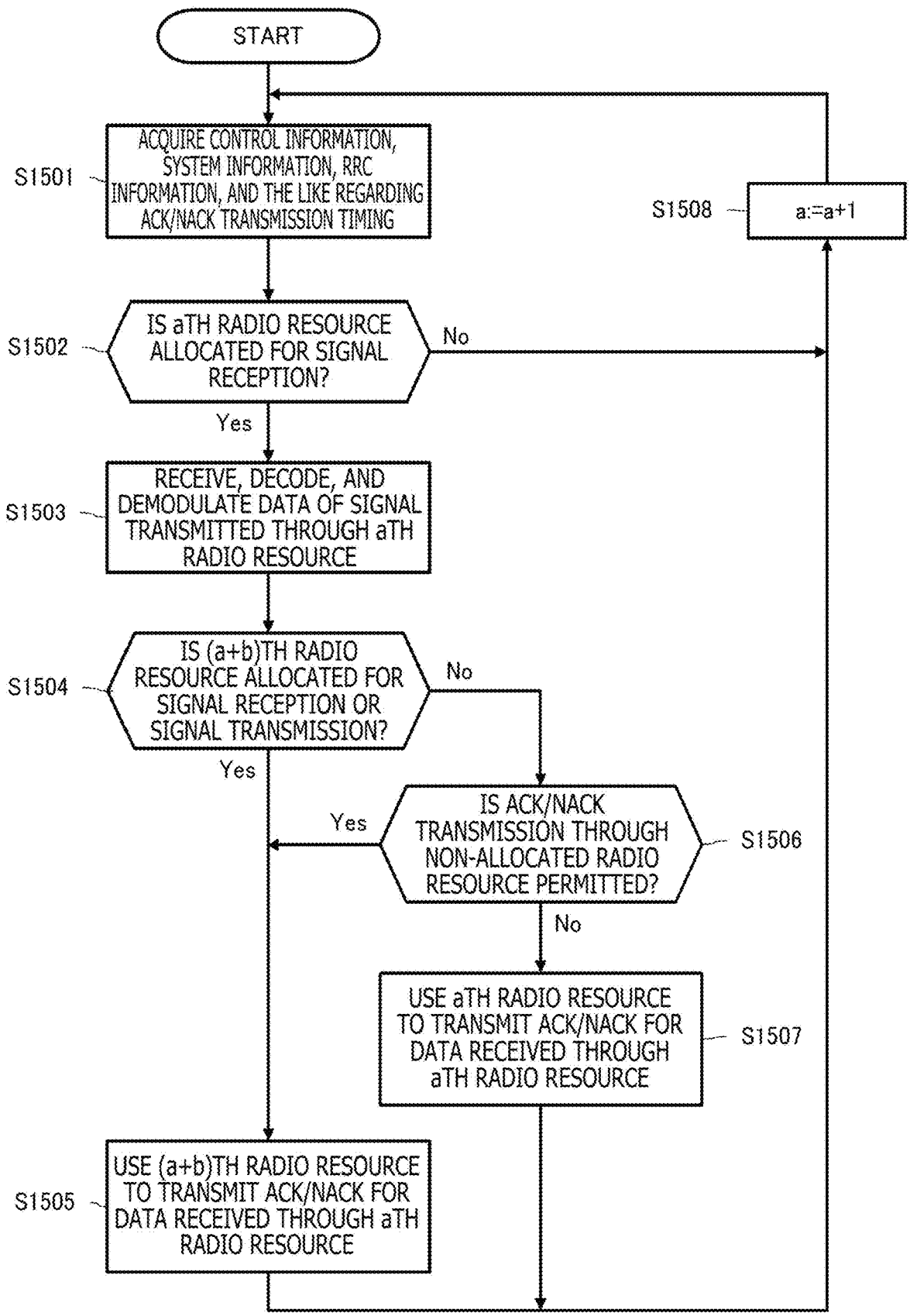
FIG. 15 is a flow chart illustrating a procedure executed by the terminal to control the timing of the reception of the user data and the transmission of the ACK/NACK.

FIG. 15 illustrates, in a format of a flow chart, a procedure in which the communication apparatus that operates as a terminal controls the timing of the reception of the user data and the transmission of the ACK/NACK in the communication sequences illustrated in FIGS. 12 to 14.

First, the terminal receives the control information, the system information, the RRC information, and the like regarding the transmission timing of the ACK/NACK from the base station to be connected (step S1501). The downlink control information (Downlink Control Information) is transmitted by using the physical downlink control channel (PDCCH). On the other hand, the system information (System Information) and the RRC signaling are transmitted by using the physical broadcast channel (Physical Broadcast Channel) and the physical downlink shared channel (Physical Downlink Shared Channel).

Furthermore, the terminal checks whether the ath radio resource is allocated for the signal reception of the terminal (step S1502). Here, the initial value of "a" is 1. In a case where the ath radio resource is not allocated for the signal reception (No in step S1502), the terminal increments "a" by 1 (step S1508) and shifts to processing of the next radio resource.

On the other hand, in a case where the ath radio resource is allocated for the signal reception (No in step S1502), the terminal receives the data of the signal transmitted through the ath radio resource to execute the decoding and demodulation process (step S1503).

Next, the terminal checks whether the (a+b)th radio resource is allocated for the signal reception or the signal transmission (step S1504). Furthermore, in a case where the (a+b)th radio resource is not allocated for the signal reception or the signal transmission (No in step S1504), the terminal further checks whether the ACK/NACK transmission through the radio resource not allocated is permitted (step S1506).

In a case where the (a+b)th radio resource is allocated for the signal reception or the signal transmission (Yes in step S1504) or in a case where the ACK/NACK transmission through the radio resource not allocated is permitted (Yes in step S1506), the terminal uses the (a+b)th radio resource to transmit the ACK/NACK for the data received through the ath radio resource (step S1505).

In addition, in a case where the ACK/NACK transmission through the radio resource not allocated is not permitted (No in step S1506), the terminal uses the ath radio resource to transmit the ACK/NACK for the data received through the ath radio resource (step S1507).

Subsequently, the terminal increments "a" by 1 (step S1508) and shifts to processing of the next radio resource.

F. Example 3

Here, an example of using physical channels of different types or attributes to carry out the FD will be described. It can be stated that Examples 1 and 2 are examples of basically using the same physical channel (for example, shared channel (Shared Channel: SCH)) to carry out the FD. An example of the FD using the physical channels of different types or attributes includes FD of a physical downlink shared channel (Physical Downlink Shared Channel: PDSCH) and a physical random access channel (Physical Random Access Channel: PRACH).

Figure 16:
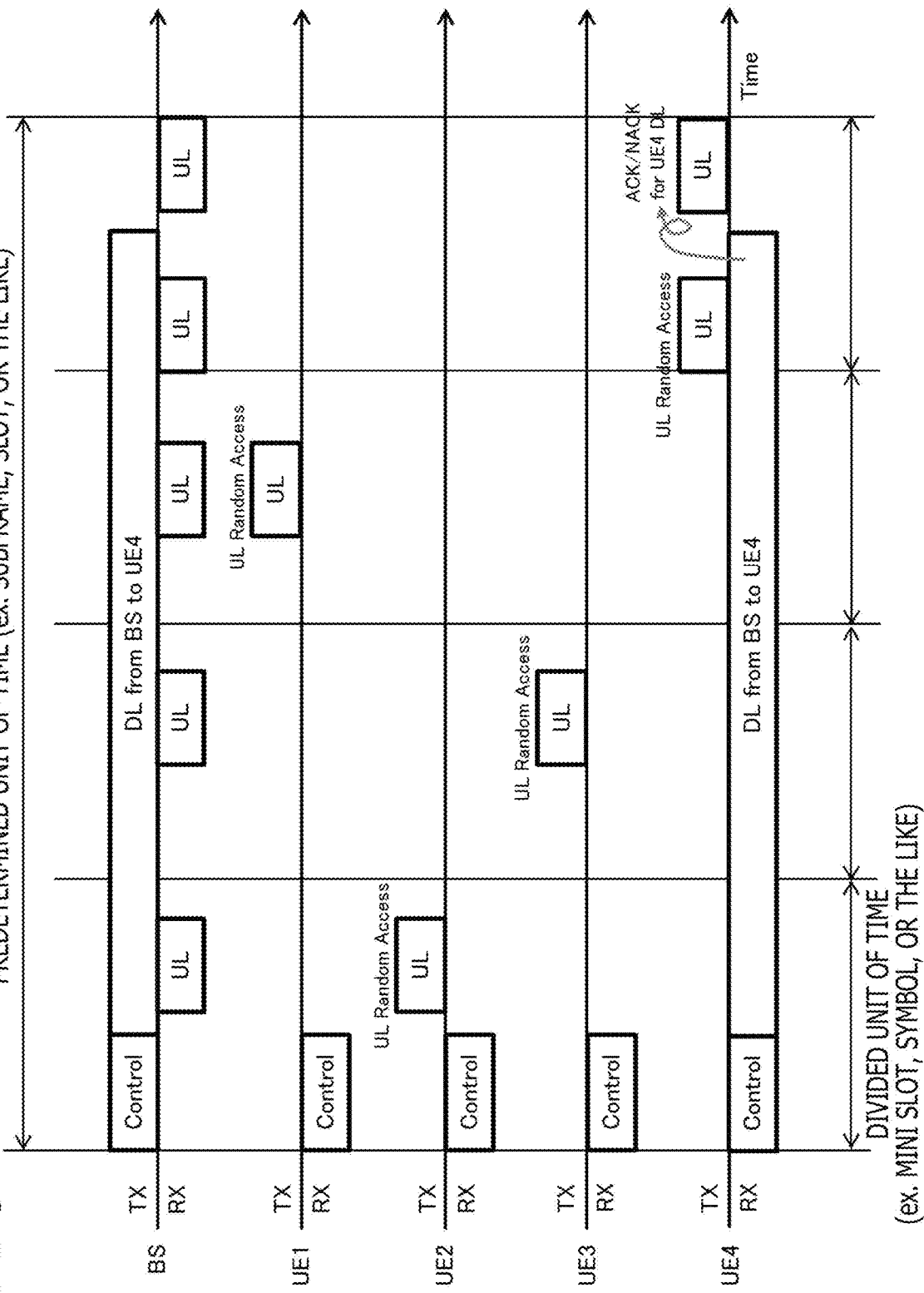
FIG. 16 is a diagram illustrating a communication sequence example in a case of using physical channels of different types or attributes to carry out the FD.

FIG. 16 illustrates a communication sequence example of using the physical channels of different types or attributes to carry out the FD. In FIG. 16, it is assumed that the communication system includes one base station (BS) and four terminals UE1, UE2, UE3, and UE4 connected to the base station. In addition, the horizontal axis in FIG. 16 is a time axis. The upper side of the time axis of each communication apparatus denotes a transmission process, and the lower side denotes a reception process. Furthermore, the predetermined unit of time (for example, subframe or slot) is divided into four divided units of time (for example, mini slots or symbols).

The BS uses the control channel (Control) at the top of the radio resource to notify each of the terminals UE1, UE2, UE3, and UE4 of the control information (Control Information) and the like including the scheduling information of each radio resource and the like. In the illustrated example, the BS notifies each of the terminals UE1, UE2, UE3, and UE4 of the allocation of the radio resource to the physical random access channel PRACH and notifies the terminal UE4 of the allocation of the same radio resource to the physical downlink shared channel PDSCH. Specifically, the PRACH is a physical channel that can be used by the terminal for initial connection and reconnection to the base station.

Furthermore, the downlink signal is transmitted from the BS to the UE4 in the radio resource, and at the same time, each of the terminals UE1, UE2, UE3, and UE4 uses the same radio resource for random access of the uplink.

The BS transmits the downlink signal to the terminal UE4, and at the same time, the BS receives the random access of the uplink signal from each of the terminals UE1, UE2, UE3, and UE4. It is assumed that the downlink signal and the uplink signal use the same or overlapping frequency resources and the same or overlapping time resources. Therefore, the transmission and the reception of the FD occur in the BS. On the other hand, the transmission and the reception may not occur at the same time on the terminal side. Each of the terminals UE1, UE2, and UE3 only performs the random access of the uplink signal and does not carry out the FD. However, the UE4 is permitted to perform the random access while receiving the downlink signal, and therefore, the transmission and the reception of the FD may occur.

Note that for the last part of the predetermined unit of time allocated as the PDSCH (for example, the last mini slot or symbol in the predetermined unit of time), the UE4 needs to return the ACK/NACK of the received signal, and therefore, the reception of the downlink signal needs to be already finished. Therefore, for only the last ACK/NACK, it is desirable to set the arrangement of the signals (downlink signal and ACK/NACK) so that the reception of the signal is finished before the ACK/NACK.

Figure 17:
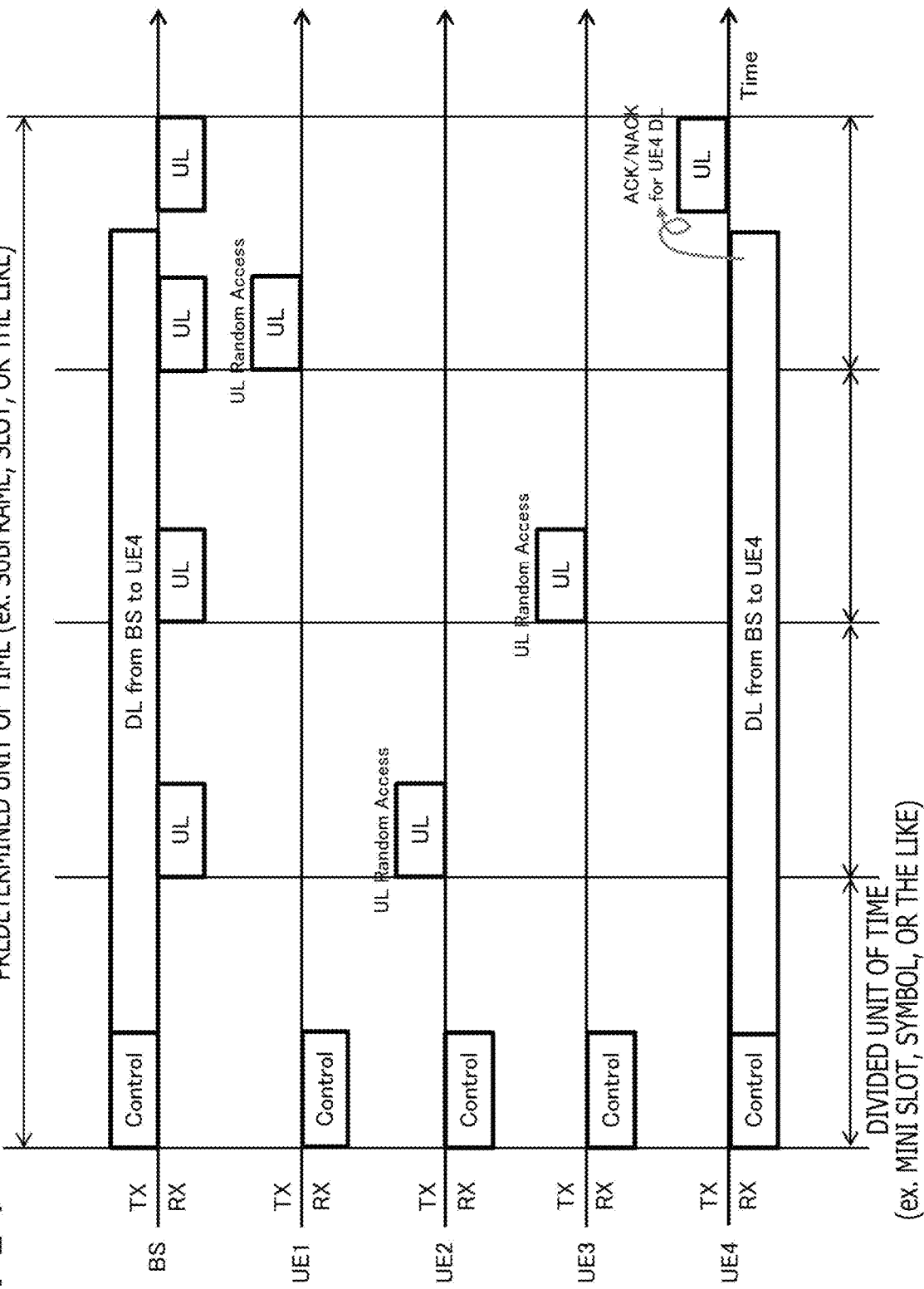
FIG. 17 is a diagram illustrating another communication sequence example in the case of using the physical channels of different types or attributes to carry out the FD.

FIG. 17 illustrates another communication sequence example in the case where the physical channels of different types or attributes are used to carry out the FD. In FIG. 17, it is also assumed that the communication system includes one base station (BS) and four terminals UE1, UE2, UE3, and UE4 connected to the base station. In addition, the horizontal axis in FIG. 17 is a time axis. The upper side of the time axis of each communication apparatus denotes a transmission process, and the lower side denotes a reception process. Furthermore, the predetermined unit of time (for example, subframe or slot) is divided into four divided units of time (for example, mini slots or symbols). The communication sequence illustrated in FIG. 17 is different from the communication sequence example illustrated in FIG. 16 in that the timing of the random access of the uplink signal from each of the terminals UE1, UE2, UE3, and UE4 is limited to a predetermined range.

The BS uses the control channel (Control) at the top of the radio resource to notify each of the terminals UE1, UE2, UE3, and UE4 of the control information (Control Information) and the like including the scheduling information of each radio resource and the like. In the illustrated example, the BS notifies each of the terminals UE1, UE2, UE3, and UE4 of the allocation of the radio resource to the physical random access channel PRACH and notifies the terminal UE4 of the allocation of the same radio resource to the physical downlink shared channel PDSCH.

In the radio resource, the downlink signal is transmitted from the BS to the UE4, and at the same time, each of the terminals UE1, UE2, UE3, and UE4 uses the same radio resource for the random access of the uplink.

The BS transmits the downlink signal to the terminal UE4, and at the same time, the BS receives the random access of the uplink signal from each of the terminals UE1, UE2, UE3, and UE4. It is assumed that the downlink signal and the uplink signal use the same or overlapping frequency resources and the same or overlapping time resources. Therefore, the transmission and the reception of the FD occur in the BS. On the other hand, the transmission and the reception may not occur at the same time on the terminal side.

Here, the timing of the random access of each of the terminals UE1, UE2, UE3, and UE4 is limited to a predetermined range. In the example illustrated in FIG. 17, the timing of the random access is limited to near the boundary of mini slots obtained by dividing the predetermined unit of time (such as a subframe and a slot). Therefore, the operation period of the self-interference canceller can be reduced near the boundary of the mini slots in the communication apparatus, such as the BS, that carries out the FD. This is effective in terms of the load or the power consumption of the receiver. On the other hand, in the case where the timing of the random access is not limited, the BS needs to always operate the self-interference canceller to wait for the random access in the period of the target radio resource (subframe or slot).

Figure 18:
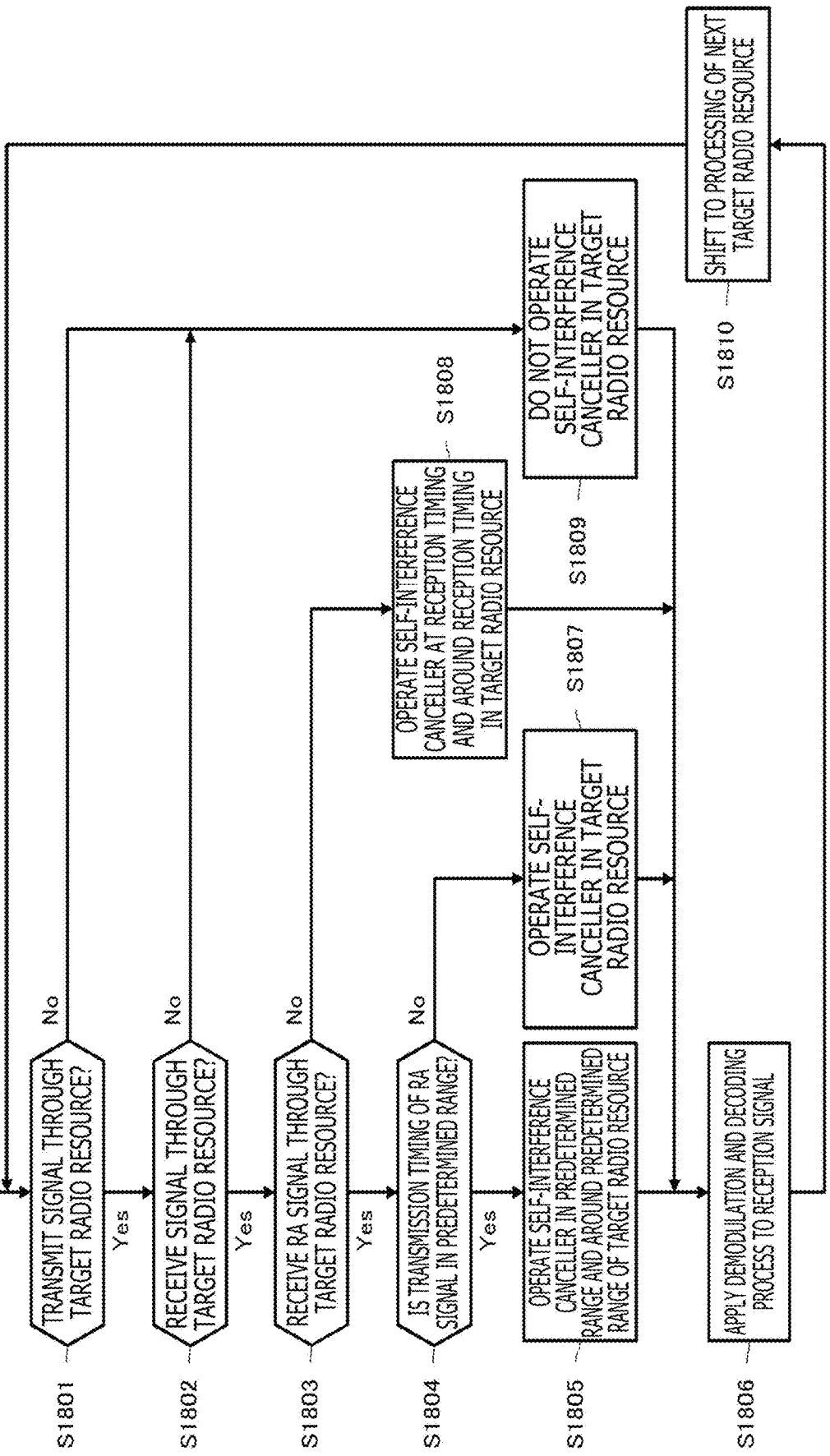
FIG. 18 is a flow chart illustrating a procedure for controlling the operation of the self-interference canceller associated with the switch in a case where random access is also taken into account.

FIG. 18 illustrates, in a format of a flow chart, a procedure executed by the communication apparatus to control the operation of the self-interference canceller associated with the FD switch in the case where the random access is also taken into account.

In a case where the communication apparatus transmits a signal in the target radio resource (Yes in step S1801) and receives a signal in the target radio resource (Yes in step S1802), the communication apparatus further checks whether to receive a random access (RA) signal in the target radio resource (step S1803) and whether the transmission timing of the random access signal is limited to a predetermined range (step S1804).

In a case where all of the determination results of steps S1801 to S1804 are affirmative, that is, in a case where the communication apparatus performs the transmission and the reception at the same time in the target radio resource and waits for the random access signal in the predetermined range (Yes in S1804), the communication apparatus causes the self-interference canceller to operate in the range with the limited transmission timing of the random access signal and at timing around the range in the target radio resource (step S1805).

Furthermore, in a case where the communication apparatus performs the transmission and the reception at the same time in the target radio resource and receives the random access signal without the limitation of the transmission timing (No in step S1804), the communication apparatus causes the self-interference canceller to operate through the entire target radio resource (step S1807).

Furthermore, in a case where the communication apparatus performs the transmission and the reception at the same time in the target radio resource, but does not receive the random access signal (No in step S1803), the communication apparatus causes the self-interference canceller to operate at timing particularly allocated for the reception and at time around the timing in the target radio resource (step S1808).

Furthermore, in a case where the communication apparatus does not transmit a signal in the target radio resource (No in step S1801) or in a case where the communication apparatus transmits a signal in the target radio resource (Yes in step S1801), but does receive a signal (No in step S1802), in other words, in a case where the communication apparatus does not carry out the FD in the target radio resource, the communication apparatus does not cause the self-interference canceller to operate (step S1809).

Furthermore, the communication apparatus applies a demodulation and decoding process to the reception signal while causing the self-interference canceller to operate or without causing the self-interference canceller to operate (step S1806) and then shifts to processing of the next target radio resource (step S1810).

The FD of the physical downlink shared channel (PDSCH) and the physical random access channel (PRACH) has been described as an example of the FD using the physical channels of different types or attributes. In this case, the signal transmitted by the base station on the uplink in carrying out the FD is the random access signal as also illustrated in FIGS. 16, 17, and 18.

Another example of the FD using the physical channels of different types or attributes includes FD of a physical downlink shared channel (PDSCH) and a Grant-free (or Grant-less) uplink channel.

Here, the Grant-free (or Grant-less) uplink channel denotes a channel in which the terminal can transmit an uplink signal without allocation or designation of a specific radio resource (such as a resource block on the frequency axis and a subframe, a slot, or a mini slot on the time axis) from the base station to the terminal (the uplink shared channel requires allocation of a radio resource from the base station).

It is desirable that the data transmitted through the Grant-free (or Grant-less) uplink channel be upper layer user data. The low latency communication of the uplink can be performed by enabling to also carry out the FD for transmitting the signal of the user data on the uplink.

The operation of the Grant-free (or Grant-less) is similar to the random access. Therefore, the FD of the physical downlink shared channel (PDSCH) and the Grant-free (or Grant-less) uplink channel can be carried out according to a communication sequence similar to the one illustrated in FIG. 16 or FIG. 17. In addition, the communication apparatus, such as a base station, that carries out the FD can control the operation of the self-interference canceller associated with the FD switch according to a procedure similar to the one illustrated in FIG. 18.

In the case where the downlink shared channel and the random access channel or the Grant-less (Grant-free) channel are used to carry out the FD, a restriction can be put on the terminal that can perform the transmission through the random access channel or the Grant-less (Grant-free) channel, and stable FD can be realized. As already described, the pair of terminals that can carry out the FD may be suitable or unsuitable in terms of link quality characteristics. Therefore, it is also desirable to select which terminal is to be permitted in the case where the random access or the Grant-less or Grant-free access is carried out in the FD. Therefore, a group of terminals permitted to perform the random access or the Grant-less or Grant-free in the FD is set in the present example.

Figure 19:
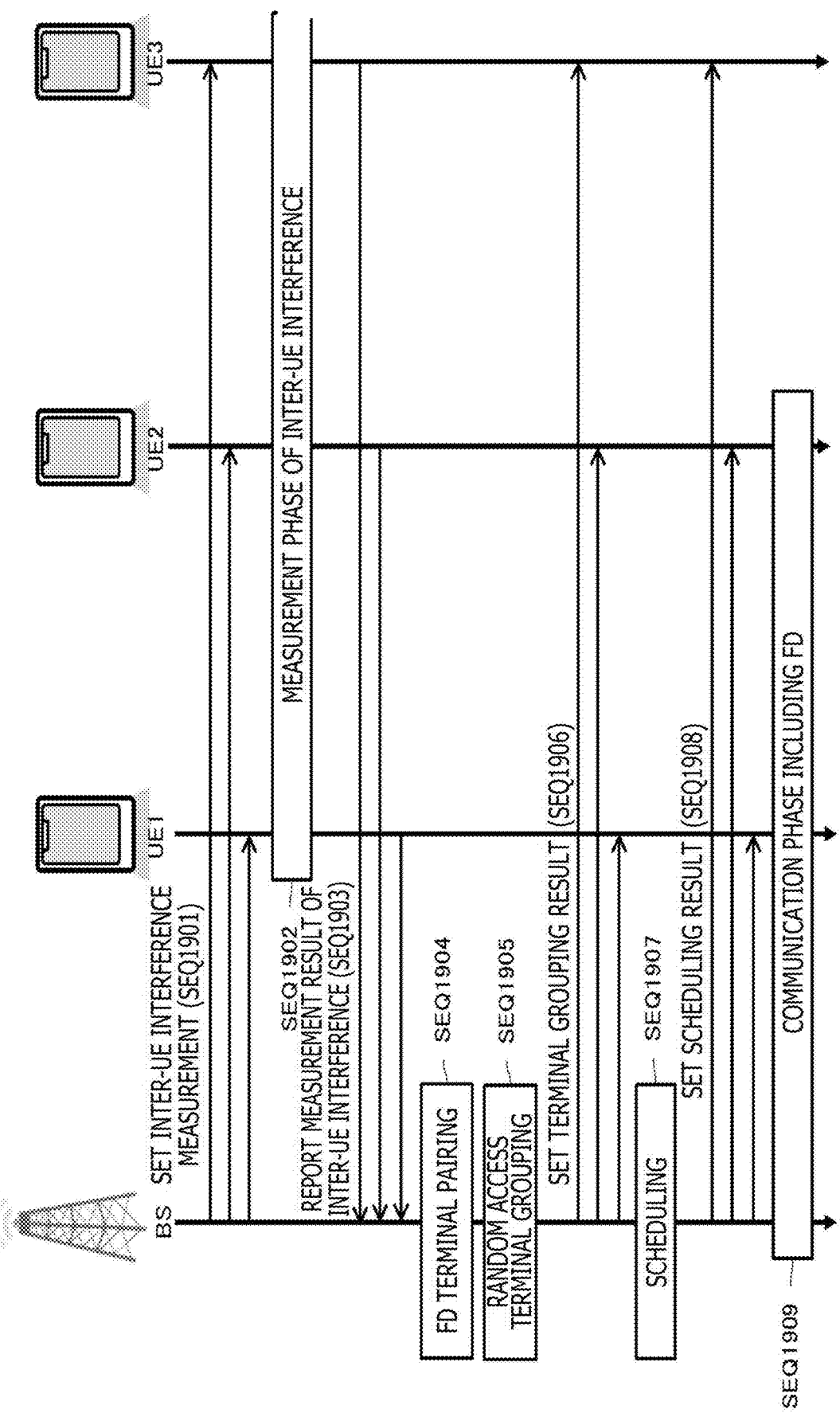
FIG. 19 is a diagram illustrating a communication sequence example between a base station and terminals, including group setting of the terminals for the FD.

FIG. 19 illustrates a communication sequence example between the base station and the terminals, including the group setting of the terminals for the FD. It is desirable that the base station play a role of determining the terminal grouping.

First, the base station notifies each of the terminals UE1, UE2, and UE3 connected to the base station of the settings and the instruction for the measurement of the inter-UE interference state expected in the terminal (SEQ1901).

Each of the terminals UE1, UE2, and UE3 carries out the inter-UE interference measurement according to the instruction from the base station (SEQ1902). In the inter-UE interference measurement phase, the terminals transmit the test signals and the reference signals to each other, and each terminal measures the inter-UE interference based on the test signals and the reference signals received from the other terminals. Furthermore, each of the terminals UE1, UE2, and UE3 reports the measurement result of the inter-UE interference to the base station (SEQ1903).

The base station checks whether or not to carry out the FD based on the feedback from each of the terminals UE1, UE2, and UE3 and the measurement result of the base station and determines the terminal pair that carries out the FD (SEQ1904). The base station sets the group of terminals permitted to perform the random access or the Grant-less or Grant-free in the FD (SEQ1905). Furthermore, the base station sets, in each of the terminals UE1, UE2, and UE3, the results of the terminal pairing of the FD and the terminal grouping permitted to perform the random access (SEQ1906).

Subsequently, the base station makes a schedule including the frequency resources, the time resources, the modulation scheme, the error correction coding rate, and the MIMO parameters to be used in the FD and the random access (SEQ1907). Furthermore, the base station uses the control information of the physical layer signal processing to notify each of the terminals UE1, UE2, and UE3 of the scheduling information in each allocation of radio resource or uses the system information or the RRC signaling to semi-statically notify each of the terminals UE1, UE2, and UE3 of the scheduling information (SEQ1908).

Furthermore, communication including the FD is carried out in the communication system according to the scheduling result of the base station (SEQ1909).

In the present example (or the communication sequence illustrated in FIG. 19), "a group of terminals that can perform the uplink random access or the Grant-less or Grant-free access at the same time as the reception of a downlink signal by a terminal" can be determined in the terminal grouping. For example, an appropriate terminal pair that carries out the FD can be expanded as a group. The following Table 5 illustrates a configuration example of the terminal group.

TABLE 5

| Terminal Receiving Downlink Signal | Terminal Belonging to Random Access, Grant-free, or Grant-less Terminal Group with Respect to Terminal Receiving Downlink Signal | | | |
|---|---|---|---|---|
| | UE1 | UE2 | UE3 | ... |
| UE1 | ✓ | ✓ | | ... |
| UE2 | ✓ | | | ... |
| UE3 | ✓ | ✓ | ✓ | ... |
| ... | ... | ... | ... | ... |

In Table 5, the group that can perform the uplink random access, the Grant-less access, or the like when the UE1 receives the downlink signal includes UE1 and UE2. Similarly, the Group that can perform the uplink random access, the Grant-less access, or the like when the UE2 receives the downlink signal includes the UE1, and the group that can perform the uplink random access, the Grant-less access, or the like when the UE3 receives the downlink signal includes the UE1, the UE2, and the UE3.

Here, the group with respect to the UE1 may include the UE1. This means that in a case where the UE1 corresponds to the simultaneous transmission and reception of the FD, the UE1 can perform the random access, the Grant-less access, or the like at the same time as the reception of the downlink signal (corresponds to the situation similar to UE4 in FIG. 17).

According to Examples 1 to 3, in Full Duplex (In-band Full Duplex, Single Channel Full Duplex, full duplex communication, or FD) for performing the transmission and the reception at the same time in the same or partially overlapping time radio resources (such as radio resources, subframes, slots, mini slots, and symbols) in the same frequency channel (such as component carrier), the execution and the non-execution of the FD can be switched dynamically, and the flexibility and the opportunities for using the Full Duplex can be increased there. The frequency use efficiency from the viewpoint of the system and the performance of the low latency communication can be improved.

G. Radio Access Technology in Present Embodiment

In this section, the radio access technology applied to the embodiment disclosed in the present specification will be described.

In the present embodiment, each of a base station apparatus 1 and a terminal apparatus 2 supports one or more radio access technologies (RAT). For example, the RAT includes LTE (Long Term Evolution) and NR (New Radio). One RAT corresponds to one cell (component carrier). That is, in a case where plural RATs are supported, the RATs correspond to different cells, respectively. In the present embodiment, the cell is a combination of a downlink resource, an uplink resource, and/or a sidelink. Furthermore, in the following description, the cell corresponding to the LTE will be referred to as an LTE cell, and the cell corresponding to the NR will be referred to as an NR cell.

The downlink communication is communication from the base station apparatus 1 to the terminal apparatus 2. The uplink communication is communication from the terminal apparatus 2 to the base station apparatus 1. The sidelink communication is communication from the terminal apparatus 2 to another terminal apparatus 2.

The sidelink communication is defined for direct proximity detection and direct proximity communication between terminal apparatuses. A frame configuration similar to the uplink and the downlink can be used for the sidelink communication. In addition, the sidelink communication may be limited to part (subset) of the uplink resources and/or the downlink resources.

The base station apparatus 1 and the terminal apparatus 2 can support communication using a set of one or more cells in the downlink, the uplink, and/or the sidelink. The set of a plurality of cells is also called carrier aggregation or dual connectivity. The details of the carrier aggregation and the dual connectivity will be described later. In addition, each cell uses a predetermined frequency bandwidth. The maximum value, the minimum value, and the values that can be set in the predetermined frequency bandwidth can be predefined.

G-1. Radio Frame Configuration in Present Embodiment

In the present embodiment, a radio frame (radio frame) of 10 ms (milliseconds) is defined. Each radio frame includes two half frames. The time interval of the half frame is 5 ms. Each half frame includes five subframes. The time interval of the subframe is 1 ms, and the subframe is defined by two consecutive slots. The time interval of the slot is 0.5 ms. An ith subframe in the radio frame includes a (2×i)th slot and a (2×i+1)th slot. That is, ten subframes are defined in each radio frame.

The subframes include downlink subframes, uplink subframes, special subframes, sidelink subframes, and the like.

The downlink subframe is a subframe reserved for downlink transmission. The uplink subframe is a subframe reserved for uplink transmission. The special subframe includes three fields. The three fields include DwPTS (Downlink Pilot Time Slot), GP (Guard Period), and UpPTS (Uplink Pilot Time Slot). The total length of the DwPTS, the GP, and the UpPTS is 1 ms. The DwPTS is a field reserved for downlink transmission. The UpPTS is a field reserved for uplink transmission. The GP is a field in which the downlink transmission and the uplink transmission are not performed. Note that the special subframe may include only the DwPTS and the GP or may include only the GP and the UpPTS. The special subframe is arranged between the downlink subframe and the uplink subframe in the TDD and is used to switch the downlink subframe to the uplink subframe. The sidelink subframe is a subframe reserved or set for sidelink communication. The sidelink is used for direct proximity communication and direct proximity detection between terminal apparatuses.

A single radio frame includes a downlink subframe, an uplink subframe, a special subframe, and/or a sidelink subframe. In addition, a single radio frame may include only a downlink subframe, an uplink subframe, a special subframe, or a sidelink subframe.

Plural radio frame configurations are supported. The radio frame configurations are defined by frame configuration types. A frame configuration type 1 can be applied to only the FDD. A frame configuration type 2 can be applied to only the TDD. A frame configuration type 3 can be applied to only the operation of an LAA (Licensed Assisted Access) secondary cell.

In the frame configuration type 2, plural uplink-downlink configurations are defined. In the uplink-downlink configurations, each of the ten subframes in one radio frame corresponds to any one of the downlink subframe, the uplink subframe, and the special subframe. A subframe 0, a subframe 5, and the DwPTS are always reserved for the downlink transmission. The UpPTS and the subframe just after the special subframe are always reserved for the uplink transmission.

In the frame configuration type 3, ten subframes in one radio frame are reserved for the downlink transmission. The terminal apparatus 2 can handle the PDSCH or a subframe without transmission of a discovery signal as an empty subframe. Unless a predetermined signal, a channel, and/or downlink transmission is detected in a subframe, the terminal apparatus 2 assumes that there is no signal and/or channel in the subframe. The downlink transmission is occupied by one or a plurality of consecutive subframes. The first subframe of the downlink transmission may be started from anywhere in the subframe. The last subframe of the downlink transmission may be completely occupied or may be occupied at a time interval defined by the DwPTS.

Note that in the frame configuration type 3, ten subframes in one radio frame may be reserved for the uplink transmission. In addition, each of the ten subframes in one radio frame may correspond to any one of the downlink subframe, the uplink subframe, the special subframe, and the sidelink subframe.

The base station apparatus 1 may transmit a physical downlink channel and a physical downlink signal in the DwPTS of the special subframe. The base station apparatus 1 can limit the transmission of the PBCH in the DwPTS of the special subframe. The terminal apparatus 2 may transmit a physical uplink channel and a physical uplink signal in the UpPTS of the special subframe. The terminal apparatus 2 can limit the transmission of part of the physical uplink channel and the physical uplink signal in the UpPTS of the special subframe.

G-2. Frame Configuration of LTE in Present Embodiment

Figure 22:
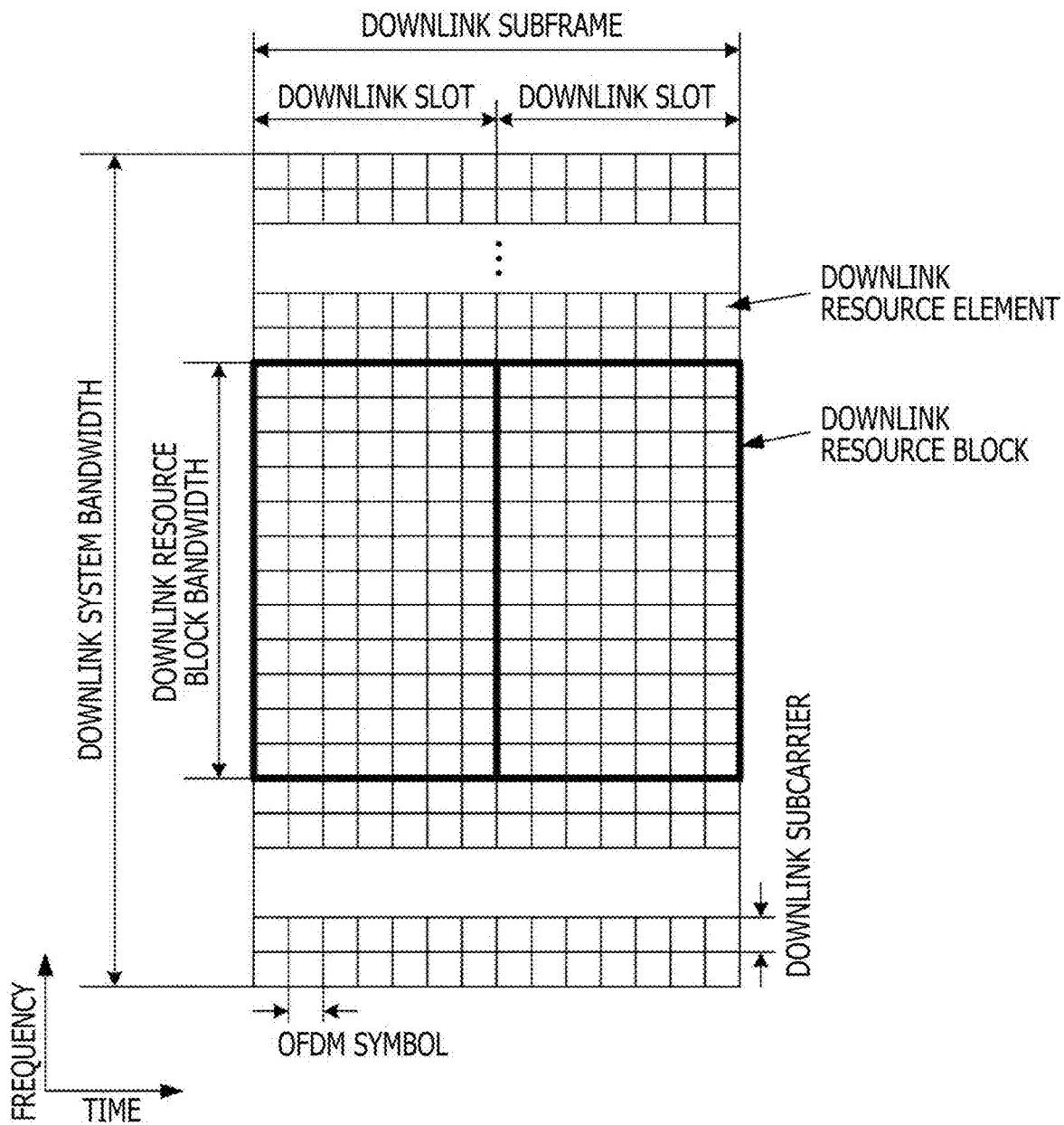
FIG. 22 is a diagram illustrating an example of a downlink subframe of LTE.

FIG. 22 illustrates an example of a downlink subframe of the LTE in the present embodiment. FIG. 22 is also called a downlink resource grid of the LTE. The base station apparatus 1 can transmit a physical downlink channel of the LTE and/or a physical downlink signal of the LTE in the downlink subframe to the terminal apparatus 2. The terminal apparatus 2 can receive a physical downlink channel of the LTE and/or a physical downlink signal of the LTE in the downlink subframe from the base station apparatus 1.

Figure 23:
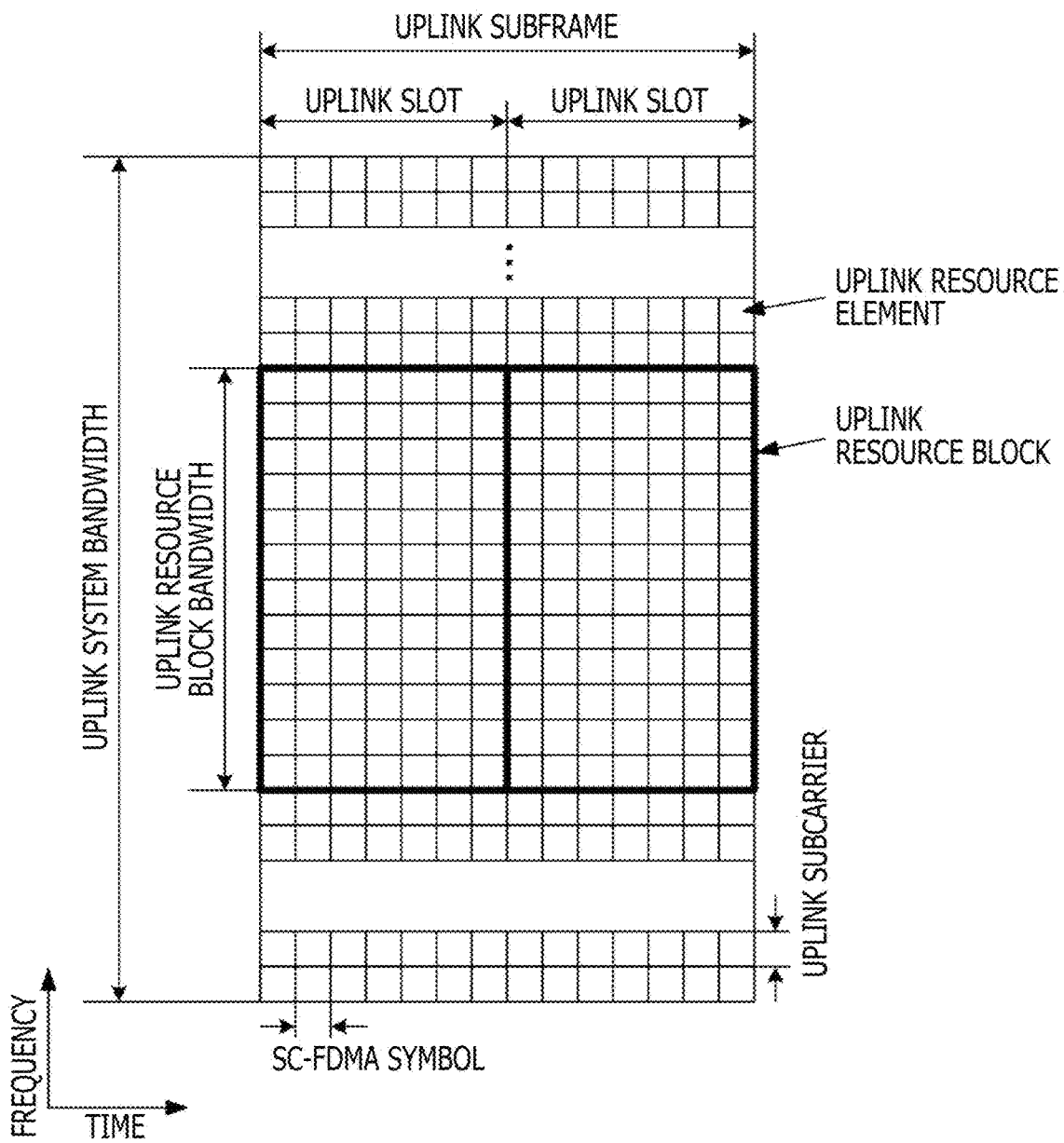
FIG. 23 is a diagram illustrating an example of an uplink subframe of the LTE.

In addition, FIG. 23 illustrates an example of an uplink subframe of the LTE in the present embodiment. FIG. 23 is also called an uplink resource grid of the LTE. The terminal apparatus 2 can transmit a physical uplink channel of the LTE and/or a physical uplink signal of the LTE in the uplink subframe to the base station apparatus 1. The base station apparatus 1 can receive a physical uplink channel of the LTE and/or a physical uplink signal of the LTE in the uplink subframe from the terminal apparatus 2.

In the present embodiment, the physical resource of the LTE can be defined as follows. One slot is defined by a plurality of symbols. The physical signal or the physical channel transmitted in each slot is expressed by a resource grid. In the downlink, the resource grid is defined by a plurality of subcarriers in the frequency direction and a plurality of OFDM symbols in the time direction. In the uplink, the resource grid is defined by a plurality of subcarriers in the frequency direction and a plurality of SC-FDMA symbols in the time direction. The number of subcarriers or resource blocks may be determined according to the bandwidth of the cell. The number of symbols in one slot is determined by the type of CP (Cyclic Prefix). The type of CP is a normal CP or an enhanced CP. In the normal CP, the number of OFDM symbols or SC-FDMA symbols included in one slot is seven. In the enhanced CP, the number of OFDM symbols or SC-FDMA symbols included in one slot is six. Each of the elements in the resource grid is called a resource element. The resource element is identified by using an index (number) of subcarrier and an index (number) of symbol. Note that in the description of the present embodiment, the OFDM symbol or the SC-FDMA symbol is also simply referred to as a symbol.

The resource block is used for mapping a physical channel (such as PDSCH and PUSCH) on the resource element. The resource blocks include virtual resource blocks and physical resource blocks. A physical channel is mapped on the virtual resource block. The virtual resource block is mapped on the physical resource block. One physical resource block is defined by a predetermined number of consecutive symbols in the time domain. One physical resource block is defined by a predetermined number of consecutive subcarriers in the frequency domain. The number of symbols and the number of carriers in one physical resource block are determined based on parameters or the like set according to the type of CP in the cell, the subcarrier interval, and/or the upper layer. For example, in a case where the type of CP is a normal CP, and the subcarrier interval is 15 kHz, the number of symbols in one physical resource block is seven, and the number of subcarriers is twelve. In this case, one physical resource block includes (7×12) resource elements. Numbers from 0 are provided to the physical resource block in the frequency domain. In addition, two resource blocks in one subframe corresponding to the same physical resource block number are defined as a physical resource block pair (PRB pair or RB pair).

In each of the LTE cells, one predetermined parameter is used in a subframe. For example, the predetermined parameter is a parameter (physical parameter) regarding the transmission signal. The parameter regarding the transmission signal includes the CP length, the subcarrier interval, the number of symbols in one subframe (predetermined time length), the number of subcarriers in one resource block (predetermined frequency band), the multiple access scheme, the signal waveform, and the like.

That is, in the LTE cell, each of the downlink signal and the uplink signal is generated by using one predetermined parameter in a predetermined time length (for example, subframe). In other words, the terminal apparatus 2 assumes that each of the downlink signal transmitted from the base station apparatus 1 and the uplink signal transmitted to the base station apparatus 1 is generated by one predetermined parameter in a predetermined time length. In addition, the base station apparatus 1 configures settings to use one predetermined parameter to generate each of the downlink signal transmitted to the terminal apparatus 2 and the uplink signal transmitted from the terminal apparatus 2 in a predetermined time length.

G-3. Frame Configuration of NR in Present Embodiment

In each of the NR cells, one or more predetermined parameters are used in a predetermined time length (for example, subframe). That is, in the NR cell, each of the downlink signal and the uplink signal are generated by using one or more predetermined parameters in the predetermined time length. In other words, the terminal apparatus 2 assumes that each of the downlink signal transmitted from the base station apparatus 1 and the uplink signal transmitted to the base station apparatus 1 is generated by one or more predetermined parameters in each predetermined time length. In addition, the base station apparatus 1 can configure settings to use one or more predetermined parameters to generate each of the downlink signal transmitted to the terminal apparatus 2 and the uplink signal transmitted from the terminal apparatus 2 in a predetermined time length. In the case where plural predetermined parameters are used, the signals generated by using the predetermined parameters are multiplexed by a predetermined method. Examples of the predetermined method include FDM (Frequency Division Multiplexing), TDM (Time DIVISION Multiplexing), CDM (Code Division Multiplexing), and/or SDM (Spatial Division Multiplexing).

Plural types of combinations of the predetermined parameters set in the NR cells can be predefined as parameter sets.

The following Table 6 illustrates an example of parameter sets regarding the transmission signal in the NR cell. In the example illustrated in Table 6, the parameters regarding the transmission signal included in the parameter sets include the subframe interval, the number of subcarriers per resource block in the NR cell, the number of symbols per subframe, and the CP length type. The CP length type is a type of CP length used in the NR cell. For example, a CP length type 1 corresponds to the normal CP in the LTE, and a CP length type 2 corresponds to the enhanced CP in the LTE.

TABLE 6

| | Subcarrier Interval | Maximum Bandwidth of Component Carrier | CP length | The Number of Symbols per Subframe | Subframe Length | Radio Frame Length | The Number of Subcarriers per Resource Block in NR Cell |
|---|---|---|---|---|---|---|---|
| parameter set 0 | 15 kHz | 20 MHz | Type 1 | 14 | 1 ms | 10 ms | 12 |
| parameter set 1 | 7.5 kHz | 1.4 MHz | Type 1 | 70 | 10 ms | 10 ms | 24 |
| parameter set 2 | 30 kHz | 80 MHz | Type 1 | 7 | 0.25 ms | 10 ms | 6 |
| parameter set 3 | 15 kHz | 20 MHz | Type 2 | 12 | 1 ms | 10 ms | 12 |
| I | I | I | I | I | I | I | I |

The parameter sets regarding the transmission signal in the NR cell can separately be defined for the downlink and the uplink. In addition, the parameter sets regarding the transmission signal in the NR cell can independently be set for the downlink and the uplink.

Figure 24:
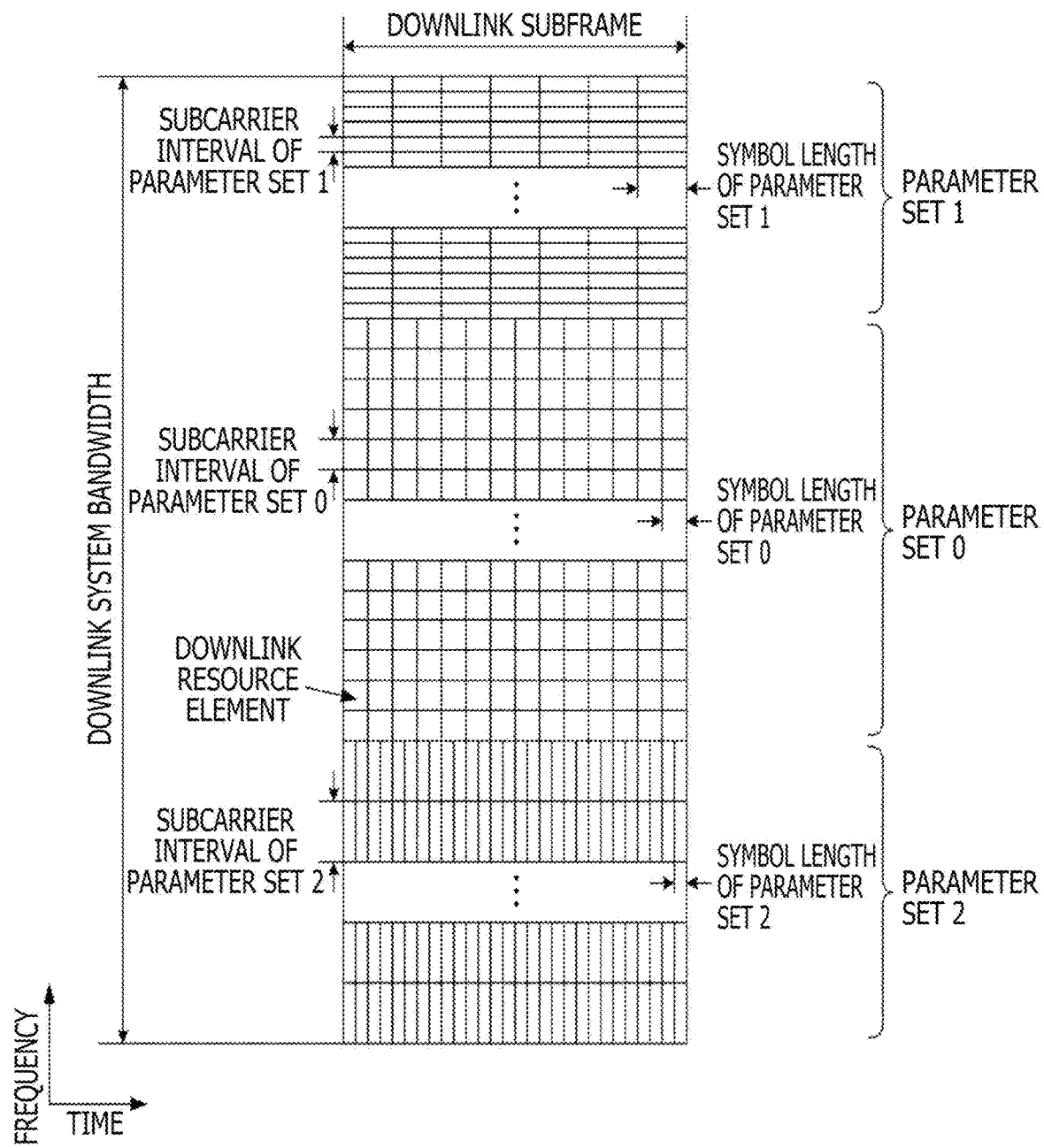
FIG. 24 is a diagram illustrating an example of a downlink subframe of NR.

FIG. 24 illustrates an example of a downlink subframe of the NR in the present embodiment. In the example illustrated in FIG. 24, signals generated by using a parameter set 1, a parameter set 0, and a parameter set 2 are multiplexed by the FDM in the cell (system bandwidth). FIG. 24 is also called a downlink resource grid of the NR. The base station apparatus 1 can transmit a physical downlink channel of the NR and/or a physical downlink signal of the NR in the downlink subframe to the terminal apparatus 2. The terminal apparatus 2 can receive a physical downlink channel of the NR and/or a physical downlink signal of the NR in the downlink subframe from the base station apparatus 1.

Figure 25:
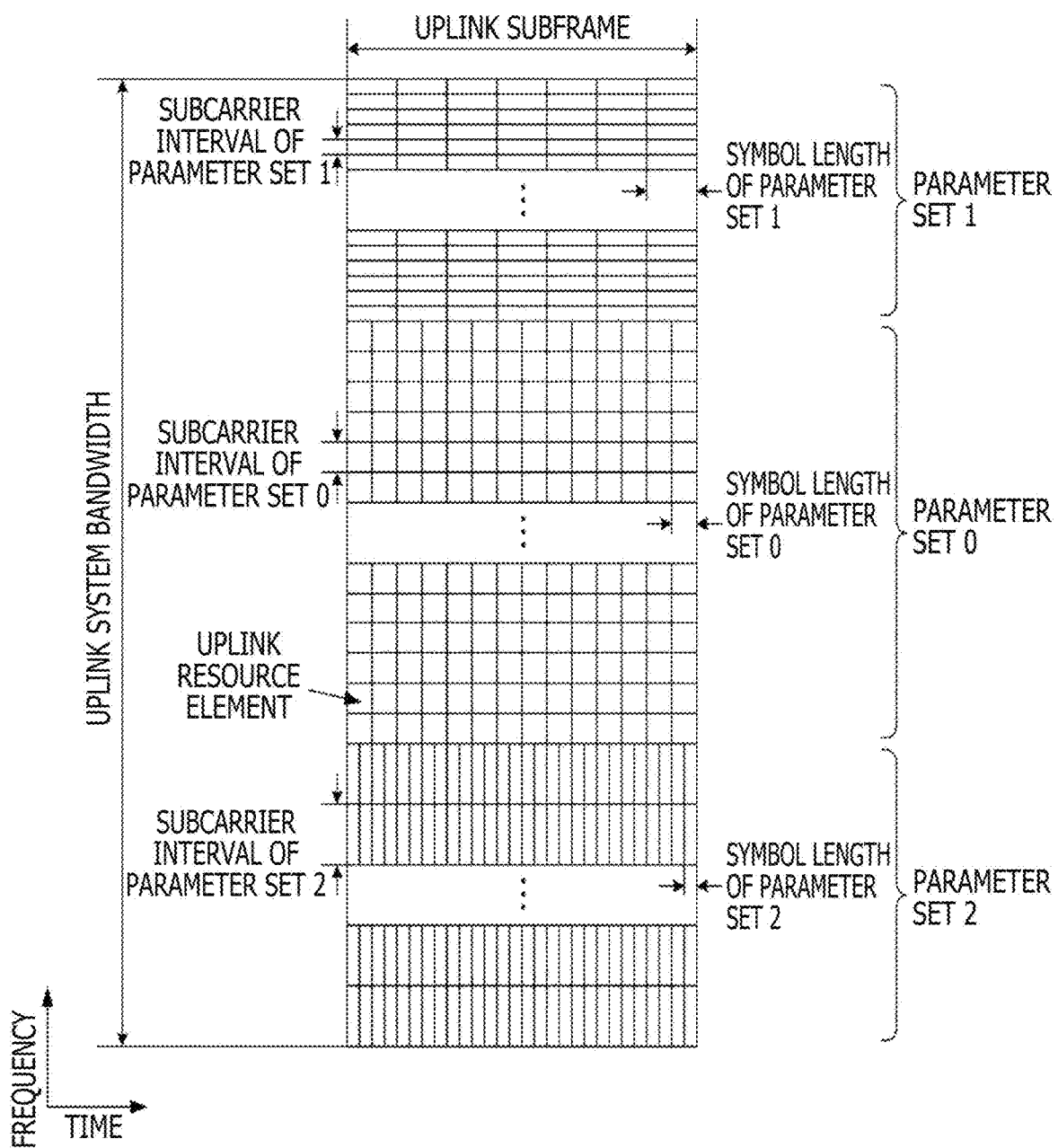
FIG. 25 is a diagram illustrating an example of an uplink subframe of the NR.

FIG. 25 illustrates an example of an uplink subframe of the NR in the present embodiment. In the example illustrated in FIG. 25, signals generated by using the parameter set 1, the parameter set 0, and the parameter set 2 are multiplexed by the FDM in the cell (system bandwidth). FIG. 25 is also called an uplink resource grid of the NR. The terminal apparatus 2 can transmit a physical uplink channel of the NR and/or a physical uplink signal of the NR in the uplink subframe to the base station apparatus 1. The base station apparatus 1 can receive a physical uplink channel of the NR and/or a physical uplink signal of the NR in the uplink subframe from the terminal apparatus 2.

G-4. Physical Channel and Physical Signal in Present Embodiment

Physical channels and physical signals are used in the present embodiment. The physical channels include a physical downlink channel, a physical uplink channel, and a physical sidelink channel. The physical signals include a physical downlink signal, a physical uplink signal, and a sidelink physical signal.

The physical channel and the physical signal in the LTE are also called an LTE physical channel and an LTE physical signal, respectively. The physical channel and the physical signal in the NR are also called an NR physical channel and an NR physical signal, respectively. The LTE physical channel and the NR physical channel can be defined as different physical channels. The LTE physical signal and the NR physical signal can be defined as different physical signals. In the description of the present embodiment, the LTE physical channel and the NR physical channel are also simply referred to as physical channels, and the LTE physical signal and the NR physical signal are also simply referred to as physical signals. That is, the description of the physical channel can be applied to either one of the LTE physical channel and the NR physical channel. The description of the physical signal can be applied to either one of the LTE physical signal and the NR physical signal.

The physical downlink channels include a physical broadcast channel (PBCH: Physical Broadcast Channel), a PCFICH (Physical Control Format Indicator Channel), a PHICH (Physical Hybrid automatic repeat request Indicator Channel), a physical downlink control channel (PDCCH: Physical Downlink Control Channel), an enhanced physical downlink control channel (EPDCCH: Enhanced PDCCH), an MTC (Machine Type Communication) physical downlink channel (MPDCCH: MTC PDCCH), a relay physical downlink control channel (R-PDCCH: Relay PDCCH), a physical downlink shared channel (PDSCH: Physical Downlink Shared Channel), a PMCH (Physical Multicast Channel), and the like.

The physical downlink signals include a synchronization signal (SS: Synchronization signal), a downlink reference signal (DL-RS: Downlink Reference Signal), a discovery signal (DS: Discovery signal), and the like.

The synchronization signals include a primary synchronization signal (PSS: Primary synchronization signal), a secondary synchronization signal (SSS: Secondary synchronization signal), and the like.

The reference signals in the downlink include a cell-specific reference signal (CRS: Cell-specific reference signal), a UE-specific reference signal associated with PDSCH (PDSCH-DMRS: UE-specific reference signal associated with PDSCH), a demodulation reference signal associated with EPDCCH (EPDCCH-DMRS: Demodulation reference signal associated with EPDCCH), a PRS (Positioning Reference Signal), a CSI reference signal (CSI-RS: Channel State Information-reference signal), and a tracking reference signal (TRS: Tracking reference signal), and the like. The PDSCH-DMRS is also called a URS related to PDSCH or simply a URS (UE-specific reference signal). The EPDCCH-DMRS is also called a DMRS related to EPDCCH or simply a DMRS. The PDSCH-DMRS and the EPDCCH-DMRS are also simply called a DL-DMRS or a downlink demodulation reference signal. The CSI-RS includes an NZP CSI-RS (Non-Zero Power CSI-RS). In addition, the resources of the downlink include a ZP CSI-RS (Zero Power CSI-RS), a CSI-IM (Channel State Information-Interference Measurement), and the like.

The physical uplink channels include a physical uplink shared channel (PUSCH), a physical uplink control channel (PUCCH: Physical Uplink Control Channel), a physical random access channel (PRACH), and the like.

The physical uplink signals include an uplink reference signal (UL-RS: Uplink Reference Signal).

The uplink reference signals include an uplink demodulation signal (UL-DMRS: Uplink demodulation signal), a sounding reference signal (SRS: Sounding reference signal), and the like. The UL-DMRS is associated with the transmission of the PUSCH or the PUCCH. The SRS is not associated with the transmission of the PUSCH or the PUCCH.

The physical sidelink channels include a physical sidelink broadcast channel (PSBCH: Physical Sidelink Broadcast Channel), a physical sidelink control channel (PSCCH: Physical Sidelink Control Channel), a physical sidelink discovery channel (PSDCH: Physical Sidelink Discovery Channel), a physical sidelink shared channel (PSSCH: Physical Sidelink Shared Channel), and the like.

The physical channel and the physical signal are also simply called a channel and a signal. That is, the physical downlink channel, the physical uplink channel, and the physical sidelink channel are also called a downlink channel, an uplink channel, and a sidelink channel, respectively. The physical downlink signal, the physical uplink signal, and the physical sidelink signal are also called a downlink signal, an uplink signal, and a sidelink signal, respectively.

A BCH, an MCH, a UL-SCH, a DL-SCH, an SL-DCH, an SL-BCH, and an SL-SCH are transport channels. The channel used in a medium access control (Medium Access Control: MAC) layer will be referred to as a transport channel. The unit of transport channels used in the MAC layer will also be referred to as a transport block (Transport Block: TB) or a MAC PDU (Protocol Data Unit). In the MAC layer, HARQ (Hybrid Automatic Repeat reQuest) is controlled for each transport block. The transport block is a unit of data transferred (delivered) by the MAC layer to the physical layer. In the physical layer, the transport blocks are mapped on code words, and a coding process is executed for each code word.

Note that the downlink reference signal and the uplink reference signal are also simply called reference signals (RS).

G-5. LTE Physical Channel and LTE Physical Signal in Present Embodiment

As already described, the description of the physical channel and the physical signal can also be applied to the LTE physical channel and the LTE physical signal, respectively. The LTE physical channel and the LTE physical signal are called as follows.

The LTE physical downlink channels include an LTE-PBCH, an LTE-PCFICH, an LTE-PHICH, an LTE-PDCCH, an LTE-EPDCCH, an LTE-MPDCCH, an LTE-R-PDCCH, an LTE-PDSCH, an LTE-PMCH, and the like.

The LTE physical downlink signals include an LTE-SS, an LTE-DL-RS, an LTE-DS, and the like. The LTE-SS includes an LTE-PSS, an LTE-SSS, and the like. The LTE-RS includes an LTE-CRS, LTE-PDSCH-DMRS, an LTE-EPDCCH-DMRS, an LTE-PRS, an LTE-CSI-RS, an LTE-TRS, and the like.

The LTE physical uplink channels include an LTE-PUSCH, an LTE-PUCCH, an LTE-PRACH, and the like.

The LTE physical uplink signals include an LTE-UL-RS. The LTE-UL-RS includes an LTE-UL-DMRS, an LTE-SRS, and the like.

The LTE physical sidelink channels include an LTE-PSBCH, an LTE-PSCCH, an LTE-PSDCH, an LTE-PSSCH, and the like.

The LTE physical sidelink signals include an LTE-SL-SS, an LTE-SL-DS, an LTE-SL-RS, and the like. The LTE-SL-SS includes an LTE-SL-PSS, an LTE-SL-SSS, and the like. The LTE-SL-RS includes an LTE-SL-DMRS, an LTE-SL-SRS, an LTE-SL-CSI-RS, and the like.

G-6. NR Physical Channel and NR Physical Signal in Present Embodiment

As already described, the description of the physical channel and the physical signal can also be applied to the NR physical channel and the NR physical signal, respectively. The NR physical channel and the NR physical signal are called as follows.

The NR physical downlink channels include an NR-PBCH, an NR-PCFICH, an NR-PHICH, an NR-PDCCH, an NR-EPDCCH, an NR-MPDCCH, an NR-R-PDCCH, an NR-PDSCH, an NR-PMCH, and the like. The NR physical downlink signals include an NR-SS, an NR-DL-RS, an NR-DS, and the like. The NR-SS includes an NR-PSS, an NR-SSS, and the like. The NR-RS includes an NR-CRS, an NR-PDSCH-DMRS, an NR-EPDCCH-DMRS, an NR-PRS, an NR-CSI-RS, an NR-TRS, and the like.

The NR physical uplink channels include an NR-PUSCH, an NR-PUCCH, an NR-PRACH, and the like.

The NR physical uplink signals include an NR-UL-RS. The NR-UL-RS includes an NR-UL-DMRS, an NR-SRS, and the like.

The NR physical sidelink channels include an NR-PSBCH, an NR-PSCCH, an NR-PSDCH, an NR-PSSCH, and the like.

The NR physical sidelink signals include an NR-SL-SS, an NR-SL-DS, an NR-SL-RS, and the like. The NR-SL-SS includes an NR-SL-PSS, an NR-SL-SSS, and the like. The NR-SL-RS includes an NR-SL-DMRS, an NR-SL-SRS, an NR-SL-CSI-RS, and the like.

G-7. Physical Downlink Channel in Present Embodiment

The PBCH is used to broadcast an MIB (Master Information Block) that is broadcast information specific to a serving cell of the base station apparatus 1. The PBCH is transmitted only in a subframe 0 in the radio frame. The MIB can be updated at a 40 ms interval. The PBCH is repeatedly transmitted at a 10 ms period. Specifically, initial transmission of the MIB is performed in the subframe 0 in the radio frame satisfying a condition that the remainder of dividing an SFN (System Frame Number) by 4 is 0, and retransmission (repetition) of the MIB is performed in the subframe 0 in all of the other radio frames. The SFN is a number (system frame number) of the radio frame. The MIB is system information. For example, the MIB includes information indicating the SFN.

The PCFICH is used for transmitting information regarding the number of OFDM symbols used to transmit the PDCCH. The region indicated by the PCFICH is also called a PDCCH region. The information transmitted through the PCFICH is also called a CFI (Control Format Indicator).

The PHICH is used for transmitting a HARQ-ACK (HARQ indicator, HARQ feedback, or response information) indicating an ACK (ACKnowledgement) or a NACK (Negative ACKnowledgement) for uplink data (Uplink Shared Channel: UL-SCH) received by the base station apparatus 1. For example, in a case where the terminal apparatus 2 receives the HARQ-ACK indicating the ACK, the terminal apparatus 2 does not retransmit the corresponding uplink data. For example, in a case where the terminal apparatus 2 receives the HARQ-ACK indicating the NACK, the terminal apparatus 2 retransmits the corresponding uplink data in a predetermined uplink subframe. A certain PHICH transmits the HARQ-ACK for certain uplink data. The base station apparatus 1 uses a plurality of PHICHs to transmit the HARQ-ACKs for a plurality of pieces of uplink data, respectively, included in the same PUSCH.

The PDCCH and the EPDCCH are used for transmitting downlink control information (DCI). Mapping of information bits of the downlink control information is defined as a DCI format. The downlink control information includes a downlink grant (downlink grant) and an uplink grant (uplink grant). The downlink grant is also called a downlink assignment (Downlink assignment) or a downlink allocation (downlink allocation).

The PDCCH is transmitted by a set of consecutive one or a plurality of CCEs (Control Channel Elements). The CCE includes nine REGs (Resource Element Groups). The REG includes four resource elements. In a case where the PDCCH includes n consecutive CCEs, the PDCCH is started from the CCE satisfying a condition that the remainder of dividing i, which is an index (number) of the CCE, by n is 0.

The EPDCCH is transmitted by a set of consecutive one or a plurality of ECCEs (Enhanced Control Channel Elements). The ECCE includes a plurality of EREGs (Enhanced Resource Element Groups).

The downlink grant is used for scheduling the PDSCH in a cell. The downlink grant is used for scheduling the PDSCH in the same subframe as the subframe in which the downlink grant is transmitted. The uplink grant is used for scheduling the PUSCH in a cell. The uplink grant is used for scheduling a single PUSCH in a subframe four or more subframes after the subframe in which the uplink grant is transmitted.

A CRC (Cyclic Redundancy Check) parity bit is added to the DCI. The CRC parity bit is scrambled by an RNTI (Radio Network Temporary Identifier). The RNTI is an identifier that can be defined or set according to a purpose or the like of the DCI. The RNTI is an identifier predefined in specifications, an identifier set as information specific to the cell, an identifier set as information specific to the terminal apparatus 2, or an identifier set as information specific to the group belonging to the terminal apparatus 2. For example, the terminal apparatus 2 uses a predetermined RNTI to descramble the CRC parity bit added to the DCI in monitoring the PDCCH or the EPDCCH and identifies whether the CRC is correct. In a case where the CRC is correct, it can be recognized that the DCI is a DCI for the terminal apparatus 2.

The PDSCH is used for transmitting downlink data (downlink Shared Channel: DL-SCH). In addition, the PDSCH is also used for transmitting the control information of the upper layer.

The PMCH is used for transmitting multicast data (Multicast Channel: MCH).

Frequency, time, and/or spatial multiplexing may be applied to a plurality of PDCCHs in the PDCCH region. Frequency, time, and/or spatial multiplexing may be applied to a plurality of EPDCCHs in the EPDCCH region. Frequency, time, and/or spatial multiplexing may be applied to a plurality of PDSCHs in the PDSCH region. Frequency, time, and/or spatial multiplexing may be applied to the PDCCH, the PDSCH, and/or the EPDCCH.

G-8. Physical Downlink Signal in Present Embodiment

The synchronization signals are used by the terminal apparatus 2 to synchronize the frequency domain and/or the time domain of the downlink. The synchronization signals include a PSS (Primary Synchronization Signal) and an SSS (Secondary Synchronization Signal). The synchronization signals are arranged in predetermined subframes in the radio frames. For example, in the TDD scheme, the synchronization signals are arranged in subframes 0, 1, 5, and 6 in the radio frames. In the FDD scheme, the synchronization signals are arranged in subframes 0 and 5 in the radio frames.

The PSS may be used for coarse frame/symbol timing synchronization (synchronization of time domain) or for identifying the cell group. The SSS may be used for more accurate frame timing synchronization or for identifying the cell. That is, the PSS and the SSS can be used to perform the frame timing synchronization and the cell identification.

The downlink reference signal is used by the terminal apparatus 2 to perform propagation path estimation of the physical downlink channel, propagation path correction, calculation of CSI (Channel State Information, channel state information) of the downlink, and/or measurement of positioning of the terminal apparatus 2.

The CRS is transmitted in the entire band of the subframe. The CRS is used to receive (demodulate) the PBCH, PDCCH, the PHICH, the PCFICH, and the PDSCH. The CRS may be used by the terminal apparatus 2 to calculate the channel state information of the downlink. The PBCH, the PDCCH, the PHICH, and the PCFICH are transmitted through antenna ports used for transmission of the CRS. The CRS supports configuration of one, two, or four antenna ports. The CRS is transmitted through one or a plurality of antenna ports 0 to 3.

The URS related to PDSCH is transmitted in a subframe and a band used to transmit the PDSCH regarding the URS. The URS is used for demodulating the PDSCH regarding the URS. The URS related to PDSCH is transmitted through one or a plurality of antenna ports 5 and 7 to 14.

The PDSCH is transmitted through an antenna port used to transmit the CRS or the URS based on the transmission mode and the DCI format. A DCI format 1A is used for scheduling the PDSCH transmitted through the antenna port used to transmit the CRS. A DCI format 2D is used for scheduling the PDSCH transmitted through the antenna port used to transmit the URS.

The DMRS related to EPDCCH is transmitted in a subframe and a band used to transmit the EPDCCH regarding the DMRS. The DMRS is used for demodulating the EPDCCH regarding the DMRS. The EPDCCH is transmitted through an antenna port used to transmit the DMRS. The DMRS related to EPDCCH is transmitted through one or a plurality of antenna ports 107 to 114.

The CSI-RS is transmitted in a set subframe. The resource in which the CSI-RS is transmitted is set by the base station apparatus 1. The CSI-RS is used by the terminal apparatus 2 to calculate the channel state information of the downlink. The terminal apparatus 2 uses the CSI-RS to perform signal measurement (channel measurement). The CSI-RS supports the settings of part or all of one, two, four, eight, twelve, sixteen, twenty-four, or thirty-two antenna ports. The CSI-RS is transmitted through one or a plurality of antenna ports 15 to 46. Note that the antennas to be supported may be decided based on the terminal apparatus capability of the terminal apparatus 2, the settings of the RRC parameters, and/or the set transmission mode.

The resource of the ZP CSI-RS is set by the upper layer. The resource of the ZP CSI-RS is transmitted by power of zero output. That is, the resource of the ZP CSI-RS does not transmit anything. The PDSCH and the EPDCCH are not transmitted in the resource in which the ZP CSI-RS is set. For example, the resource of the ZP CSI-RS is used by an adjacent cell to transmit the NZP CSI-RS. In addition, the resource of the ZP CSI-RS is used for, for example, measuring the CSI-IM. In addition, the resource of the ZP CSI-RS is a resource in which, for example, a predetermined channel, such as PDSCH, is not transmitted. In other words, the predetermined channel is mapped by excluding (by rate matching and puncturing) the resource of the ZP CSI-RS.

The resource of the CSI-IM is set by the base station apparatus 1. The resource of the CSI-IM is a resource used for measuring the interference in the CSI measurement. The resource of the CSI-IM can be set to extend over (overlap) part of the resource of the ZP CSI-RS. For example, in the case where the resource of the CSI-IM is set to overlap part of the resource of the ZP CSI-RS, the signal from the cell for performing the CSI measurement is not transmitted in the resource. In other words, the base station apparatus 1 does not transmit the PDSCH, the EPDCCH, or the like in the resource in which the CSI-IM is set. Therefore, the terminal apparatus 2 can efficiently perform the CSI measurement.

The MBSFN RS is transmitted in the entire band of the subframe used to transmit the PMCH. The MBSFN RS is used for demodulating the PMCH. The PMCH is transmitted through an antenna port used to transmit the MBSFN RS. The MBSFN RS is transmitted through an antenna port 4.

The PRS is used by the terminal apparatus 2 to measure the positioning of the terminal apparatus 2. The PRS is transmitted through an antenna port 6.

The TRS can be mapped only in predetermined subframes. For example, the TRS is mapped in subframes 0 and 5. In addition, a configuration similar to part or all of the CRS can be used for the TRS. For example, in each resource block, the position of the resource element in which the TRS is mapped can be the same as the position of the resource element in which the CRS of the antenna port 0 is mapped. In addition, the sequence (values) used for the TRS can be decided based on information set through the PBCH, the PDCCH, the EPDCCH, or the PDSCH (RRC signaling). The sequence (values) used for the TRS can be decided based on parameters, such as a cell ID (for example, physical layer cell identifier) and a slot number. The sequence (values) used for the TRS can be decided by a method (formula) different from the sequence (values) used for the CRS of the antenna port 0.

G-9. Physical Uplink Channel in Present Embodiment

The PUCCH is a physical channel used for transmitting uplink control information (Uplink Control Information: UCI). The uplink control information includes channel state information (CSI) of the downlink, a scheduling request (Scheduling Request: SR) indicating a request for a PUSCH resource, and a HARQ-ACK for downlink data (TB, DL-SCH). The HARQ-ACK is also called ACK/NACK, HARQ feedback, or response information. In addition, the HARQ-ACK for the downlink data indicates an ACK, a NACK, or a DTX.

The PUSCH is a physical cannel used for transmitting uplink data (UL-SCH). In addition, the PUSCH may be used for transmitting a HARQ-ACK and/or channel state information along with the uplink data. In addition, the PUSCH may be used for transmitting only the channel state information or only the HARQ-ACK and the channel state information.

The PRACH is a physical channel used for transmitting a random access preamble. The PRACH can be used by the terminal apparatus 2 to synchronize with the base station apparatus 1 in the time domain. In addition, the PRACH is also used for indicating an initial connection establishment (initial connection establishment) procedure (process), a handover procedure, a connection re-establishment (connection re-establishment) procedure, synchronization of uplink transmission (timing adjustment), and/or a request for a PUSCH resource.

Frequency, time, spatial, and/or code multiplexing is applied to a plurality of PUCCHs in the PUCCH region. Frequency, time, spatial, and/or code multiplexing may be applied to a plurality of PUSCHs in the PUSCH region. Frequency, time, spatial, and/or code multiplexing may be applied to the PUCCH and the PUSCH. The PRACH may be arranged in a single subframe or across two subframes. Code multiplexing may be applied to a plurality of PRACHs.

G-10. Physical Uplink Signal in Present Embodiment

The uplink DMRS is related to the transmission of the PUSCH or the PUCCH. The DMRS is time-multiplexed with the PUSCH or the PUCCH. The base station apparatus 1 may use the DMRS for performing a propagation path correction of the PUSCH or the PUCCH. In the description of the present embodiment, the transmission of the PUSCH includes transmission after multiplexing the PUSCH and the DMRS. In the description of the present embodiment, transmission of the PUCCH includes transmission after multiplexing the PUCCH and the DMRS. Note that the uplink DMRS is also called a UL-DMRS. The SRS is not related to the transmission of the PUSCH or the PUCCH. The base station apparatus 1 may use the SRS to measure the channel state of the uplink.

The SRS is transmitted by using the last SC-FDMA symbol in the uplink subframe. That is, the SRS is arranged in the last SC-FDMA symbol in the uplink subframe. The terminal apparatus 2 can limit simultaneous transmission of the SRS with the PUCCH, the PUSCH, and/or the PRACH in an SC-FDMA symbol of a cell. The terminal apparatus 2 can use the SC-FDMA symbol other than the last SC-FDMA symbol in the uplink subframe in an uplink subframe of a cell to transmit the PUSCH and/or the PUCCH and can use the last SC-FDMA symbol in the uplink subframe to transmit the SRS. That is, the terminal apparatus 2 can transmit the SRS with the PUSCH and the PUCCH in an uplink frame of a cell.

In the SRS, a trigger type 0SRS and a trigger type 1SRS are defined as SRSs of different trigger types. The trigger type 0SRS is transmitted through upper layer signaling in a case where parameters regarding the trigger type 0SRS are set. The trigger type 1SRS is transmitted through upper layer signaling in a case where parameters regarding the trigger type 1SRS are set, and transmission is requested through an SRS request included in DCI format 0, 1A, 2B, 2C, 2D, or 4. Note that the SRS request is included in both the FDD and the TDD in the DCI format 0, 1A, or 4 and is included in only the TDD in the DCI format 2B, 2C, or 2D. In a case where the transmission of the trigger type 0SRS and the transmission of the trigger type 1SRS occur in the same subframe of the same serving cell, the transmission of the trigger type 1SRS is prioritized.

G-11. Physical Resource for Control Channel in Present Embodiment

The resource element group (REG: Resource Element Group) is used to define mapping of resource elements and control channels. For example, the REG is used for mapping the PDCCH, the PHICH, or the PCFICH. The REG includes four consecutive resource elements not used for the CRS, in the same OFDM symbol and in the same resource block. In addition, the REG includes first to fourth OFDM symbols of a first slot in a subframe.

The enhanced resource element group (EREG: Enhanced Resource Element Group) is used for defining mapping of resource elements and enhanced control channels. For example, the EREG is used for mapping the EPDCCH. One resource block pair includes sixteen EREGs. Numbers 0 to 15 are provided to the EREGs in each resource block pair. Each EREG includes nine resource elements excluding the resource elements used for the DM-RS associated with EPDCCH in one resource block pair.

Figure 26:
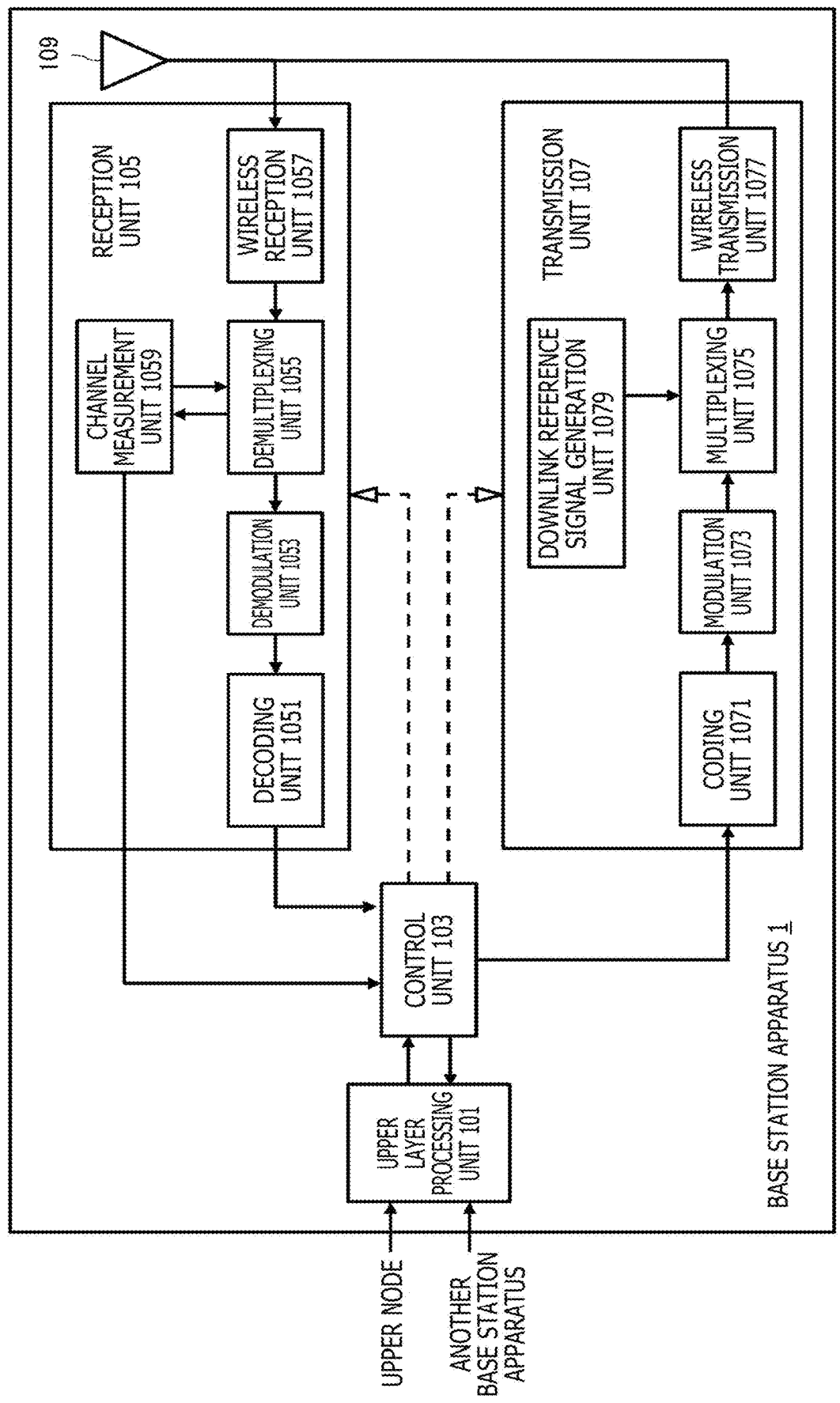
FIG. 26 is a block diagram schematically illustrating a configuration of a base station apparatus 1.

G-12. Configuration Example of Base Station Apparatus 1 in Present Embodiment FIG. 26 schematically illustrates a configuration of the base station apparatus 1 of the present embodiment. The illustrated base station apparatus 1 includes an upper layer processing unit 101, a control unit 103, a reception unit 105, a transmission unit 107, and a transmission and reception antenna 109. In addition, the reception unit 105 includes a decoding unit 1051, a demodulation unit 1053, a demultiplexing unit 1055, a wireless reception unit 1057, and a channel measurement unit 1059. In addition, the transmission unit 107 includes a coding unit 1071, a modulation unit 1073, a multiplexing unit 1075, a wireless transmission unit 1077, and a downlink reference signal generation unit 1079.

As already described, the base station apparatus 1 can support one or more RATs. Part or all of the components included in the base station apparatus 1 illustrated in FIG. 26 can separately be configured according to the RAT. For example, the reception unit 105 and the transmission unit 107 are separately configured in the LTE and the NR. Furthermore, in the NR cell, part or all of the components included in the base station apparatus 1 illustrated in FIG. 26 can separately be configured according to the parameter set regarding the transmission signal. For example, in an NR cell, the wireless reception unit 1057 and the wireless transmission unit 1077 can separately be configured according to the parameter set regarding the transmission signal.

The upper layer processing unit 101 executes processing of a medium access control (MAC) layer, a packet data convergence protocol (Packet Data Convergence Protocol: PDCP) layer, a radio link control (Radio Link Control: RLC) layer, and a radio resource control (RRC) layer. In addition, the upper layer processing unit 101 generates control information for controlling the reception unit 105 and the transmission unit 107 and outputs the control information to the control unit 103.

The control unit 103 controls the reception unit 105 and the transmission unit 107 based on the control information from the upper layer processing unit 101. The control unit 103 generates control information for the upper layer processing unit 101 and outputs the control information to the upper layer processing unit 101. The control unit 103 receives a decoded signal from the decoding unit 1051 and a channel estimation result from the channel measurement unit 1059. The control unit 103 outputs a signal to be coded to the coding unit 1071. In addition, the control unit 103 is used for controlling all or part of the base station apparatus 1.

The upper layer processing unit 101 executes processing and management related to the RAT control, the radio resource control, the subframe setting, the scheduling control, and/or the CSI report control. The processing and the management in the upper layer processing unit 101 are executed for each terminal apparatus or executed in common with the terminal apparatuses connected to the base station apparatus. The processing and the management in the upper layer processing unit 101 may be executed only by the upper layer processing unit 101 or may be acquired from an upper node or another base station apparatus. In addition, the processing and the management in the upper layer processing unit 101 may be separately executed according to the RAT. For example, the upper layer processing unit 101 separately executes the processing and the management in the LTE and the processing and the management in the NR.

In the RAT control of the upper layer processing unit 101, management related to the RAT is performed. For example, in the RAT control, management related to the LTE and/or management related to the NR is performed. The management related to the NR includes setting and processing of a parameter set related to the transmission signal in the NR cell.

In the radio resource control of the upper layer processing unit 101, generation and/or management of downlink data (transport block), system information, an RRC message (RRC parameter), and/or a MAC control element (CE: Control Element) is performed.

In the subframe setting of the upper layer processing unit 101, management of subframe setting, subframe pattern setting, uplink-downlink setting, uplink reference UL-DL setting, and/or downlink reference UL-DL setting is performed. Note that the subframe setting in the upper layer processing unit 101 is also called base station subframe setting. In addition, the subframe setting in the upper layer processing unit 101 can be decided based on the amount of traffic of the uplink and the amount of traffic of the downlink. In addition, the subframe setting in the upper layer processing unit 101 can be decided based on the scheduling result of the scheduling control in the upper layer processing unit 101.

In the scheduling control of the upper layer processing unit 101, the frequency and the subframe for allocating the physical channel, the coding rate and the modulation scheme of the physical channel, the transmission power, and the like are decided based on the received channel state information, the estimation value of the propagation path input from the channel measurement unit 1059, the quality of the channel, and the like. For example, the control unit 103 generates control information (DCI format) based on the scheduling result of the scheduling control in the upper layer processing unit 101.

In the CSI report control of the upper layer processing unit 101, a CSI report of the terminal apparatus 2 is controlled. For example, the settings related to a CSI reference resource for assuming calculation of the CSI in the terminal apparatus 2 are controlled.

The reception unit 105 receives the signal transmitted from the terminal apparatus 2 through the transmission and reception antenna 109 according to the control from the control unit 103, further executes a reception process, such as separation, demodulation, and decoding, and outputs the information subjected to the reception process to the control unit 103. Note that the reception process in the reception unit 105 is executed based on predefined settings or settings reported from the base station apparatus 1 to the terminal apparatus 2.

The wireless reception unit 1057 applies, to the uplink signal received through the transmission and reception antenna 109, conversion (down-conversion) into an intermediate frequency, removal of unnecessary frequency components, control of the amplification level to maintain an appropriate signal level, quadrature demodulation based on in-phase components and quadrature components of the received signal, conversion of an analog signal into a digital signal, removal of a guard interval (Guard Interval: GI), and/or extraction of a frequency domain signal through a fast Fourier transform (Fast Fourier Transform: FFT).

The demultiplexing unit 1055 separates an uplink channel, such as PUCCH and PUSCH, and/or an uplink reference signal from a signal input from the wireless reception unit 1057. The demultiplexing unit 1055 outputs the uplink reference signal to the channel measurement unit 1059. The demultiplexing unit 1055 compensates a propagation path for the uplink channel based on an estimation value of the propagation path input from the channel measurement unit 1059.

For a modulation symbol of the uplink channel, the demodulation unit 1053 uses a modulation scheme, such as BPSK (Binary Phase Shift Keying), QPSK (quadrature Phase shift Keying), 16 QAM (Quadrature Amplitude Modulation), 64 QAM, and 256 QAM, to demodulate the reception signal. The demodulation unit 1053 also separates and demodulates a MIMO-multiplexed uplink channel.

The decoding unit 1051 applies a decoding process to coded bits of the demodulated uplink channel. The decoded uplink data and/or the uplink control information is output to the control unit 103. For the PUSCH, the decoding unit 1051 executes the decoding process for each transport block.

The channel measurement unit 1059 measures the estimation value of the propagation path and/or the quality of the channel or the like from the uplink reference signal input from the demultiplexing unit 1055 and outputs it to the demultiplexing unit 1055 and/or the control unit 103. For example, for the UL-DMRS, the channel measurement unit 1059 measures the estimation value of the propagation path for performing the propagation path compensation of the PUCCH or the PUSCH, and for the SRS, the channel measurement unit 1059 measures the quality of the channel in the uplink.

The transmission unit 107 applies a transmission process, such as coding, modulation, and multiplexing, to the downlink control information and the downlink data input from the upper layer processing unit 101 according to the control from the control unit 103. For example, the transmission unit 107 generates and multiplexes the PHICH, the PDCCH, the EPDCCH, the PDSCH, and the downlink reference signal to generate a transmission signal. Note that the transmission process in the transmission unit 107 is executed based on predefined settings, settings reported from the base station apparatus 1 to the terminal apparatus 2, or settings notified through the PDCCH or the EPDCCH transmitted in the same subframe.

The coding unit 1071 uses a predetermined coding scheme, such as block coding, convolutional coding, and turbo coding, to encode the HARQ indicator (HARQ-ACK), the downlink control information, and the downlink data input from the control unit 103. The modulation unit 1073 uses a predetermined modulation scheme, such as BPSK, QPSK, 16 QAM, 64 QAM, and 256 QAM, to modulate the coded bits input from the coding unit 1071. The downlink reference signal generation unit 1079 generates a downlink reference signal based on a physical cell identifier (PCI: Physical cell identification), RRC parameters set in the terminal apparatus 2, and the like. The multiplexing unit 1075 multiplexes the modulation symbol of each channel and the downlink reference signal and arranges them in a predetermined resource element.

The wireless transmission unit 1077 applies, to the signal from the multiplexing unit 1075, a process, such as conversion into a signal in the time domain based on the inverse fast Fourier transform (Inverse Fast Fourier Transform: IFFT), addition of a guard interval, generation of a baseband digital signal, conversion into an analog signal, quadrature modulation, conversion (up-conversion) of an intermediate-frequency signal into a high-frequency signal, removal of extra frequency components, and amplification of power, to generate a transmission signal. The transmission signal output by the wireless transmission unit 1077 is transmitted from the transmission and reception antenna 109.

G-13. Configuration Example of Terminal Apparatus 2 in Present Embodiment

Figure 27:
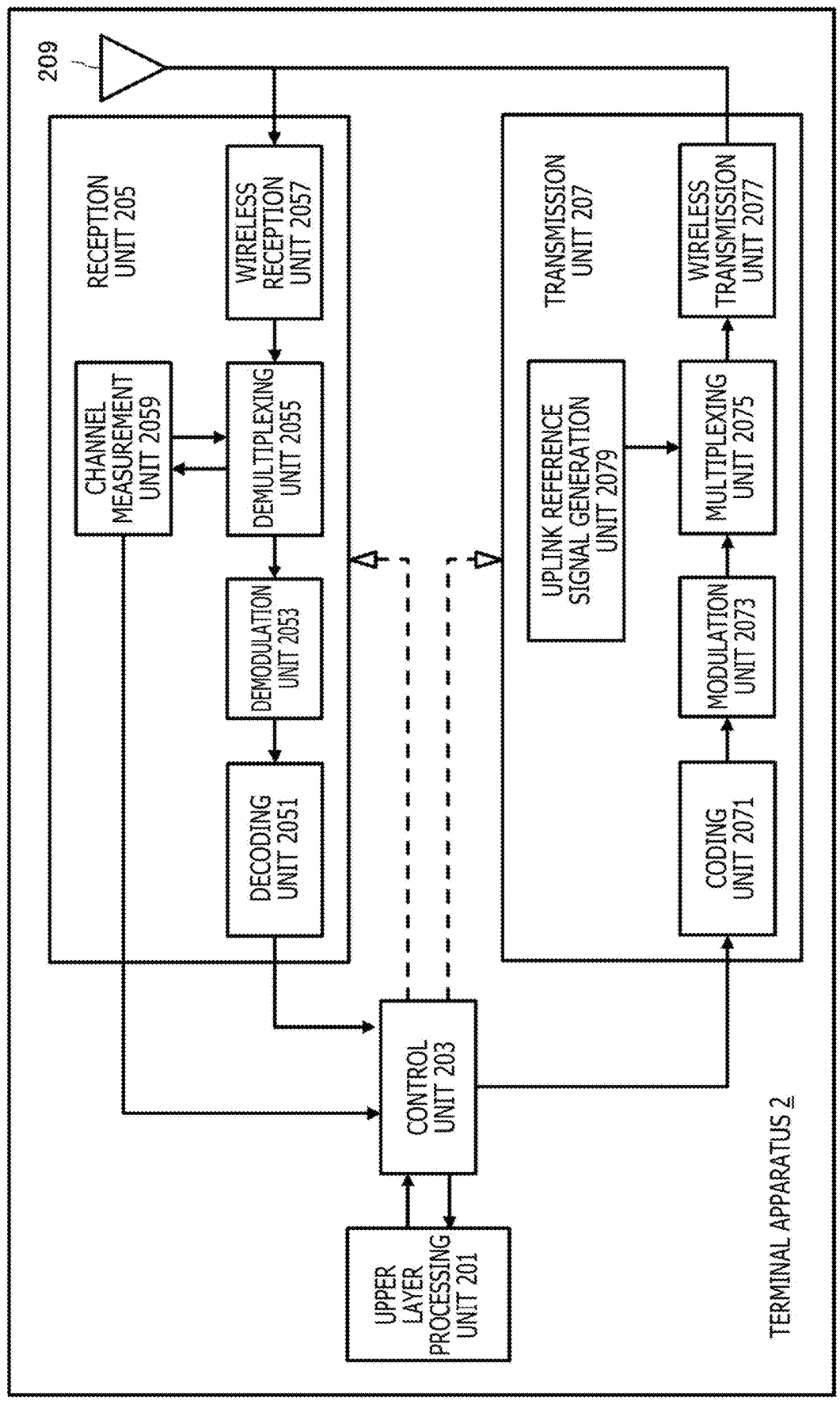
FIG. 27 is a block diagram schematically illustrating a configuration of a terminal apparatus 2.

FIG. 27 schematically illustrates a configuration of the terminal apparatus 2 of the present embodiment. The illustrated terminal apparatus 2 includes an upper layer processing unit 201, a control unit 203, a reception unit 205, a transmission unit 207, and a transmission and reception antenna 209. In addition, the reception unit 205 includes a decoding unit 2051, a demodulation unit 2053, a demultiplexing unit 2055, a wireless reception unit 2057, and a channel measurement unit 2059. In addition, the transmission unit 207 includes a coding unit 2071, a modulation unit 2073, a multiplexing unit 2075, a wireless transmission unit 2077, and an uplink reference signal generation unit 2079.

As already described, the terminal apparatus 2 can support one or more RATs. Part or all of the components included in the terminal apparatus 2 illustrated in FIG. 27 can separately be configured according to the RAT. For example, the reception unit 205 and the transmission unit 207 can separately be configured in the LTE and the NR. Furthermore, in the NR cell, part or all of the components included in the terminal apparatus 2 illustrated in FIG. 27 can separately be configured according to the parameter set regarding the transmission signal. For example, in an NR cell, the wireless reception unit 2057 and the wireless transmission unit 2077 can separately be configured according to the parameter set regarding the transmission signal.

The upper layer processing unit 201 outputs uplink data (transport block) to the control unit 203. The upper layer processing unit 201 executes processing of a medium access control (MAC) layer, a packet data convergence protocol (PDCP) layer, a radio link control (RLC) layer, and a radio resource control (RRC) layer. In addition, the upper layer processing unit 201 generates control information for controlling the reception unit 205 and the transmission unit 207 and outputs the control information to the control unit 203.

The control unit 203 controls the reception unit 205 and the transmission unit 207 based on the control information from the upper layer processing unit 201. The control unit 203 generates control information for the upper layer processing unit 201 and outputs the control information to the upper layer processing unit 201. The control unit 203 receives a decoded signal from the decoding unit 2051 and a channel estimation result from the channel measurement unit 2059. The control unit 203 outputs a signal to be coded to the coding unit 2071. In addition, the control unit 203 may also be used to control all or part of the terminal apparatus 2.

The upper layer processing unit 201 executes processing and management related to the RAT control, the radio resource control, the subframe setting, the scheduling control, and/or the CSI report control. The processing and the management in the upper layer processing unit 201 are performed based on predefined settings and/or settings based on control information set or notified from the base station apparatus 1. For example, the control information from the base station apparatus 1 includes the RRC parameters, the MAC control elements, or the DCI. In addition, the processing and the management in the upper layer processing unit 201 may be separately performed according to the RAT. For example, the upper layer processing unit 201 separately executes the processing and the management in the LTE and the processing and the management in the NR.

In the RAT control of the upper layer processing unit 201, management related to the RAT is performed. For example, management related to the LTE and/or management related to the NR are performed in the RAT control. The management related to the NR includes setting and processing of a parameter set related to the transmission signal in the NR cell.

In the radio resource control of the upper layer processing unit 201, management of the setting information in the apparatus is performed. In the radio resource control of the upper layer processing unit 201, uplink data (transport block), system information, an RRC message (RRC parameter), and/or a MAC control element (CE) are generated and/or managed.

In the subframe setting of the upper layer processing unit 201, subframe setting in the base station apparatus 1 and/or a base station apparatus different from the base station apparatus 1 is managed. The subframe setting includes setting of the uplink or the downlink for the subframe, subframe pattern setting, uplink-downlink setting, uplink reference UL-DL setting, and/or downlink reference UL-DL setting. Note that the subframe setting in the upper layer processing unit 201 is also called terminal subframe setting.

In the scheduling control of the upper layer processing unit 201, control information for performing control related to the scheduling of the reception unit 205 and the transmission unit 207 is generated based on the DCI (scheduling information) from the base station apparatus 1.

In the CSI report control of the upper layer processing unit 201, control related to a report of CSI to the base station apparatus 1 is performed. For example, in the CSI report control, the settings related to a CSI reference resource for assuming calculation of the CSI in the channel measurement unit 2059 are controlled. In the CSI report control, a resource (timing) used for reporting the CSI is controlled based on the DCI and/or the RRC parameters.

The reception unit 205 receives a signal transmitted from the base station apparatus 1 through the transmission and reception antenna 209 according to the control from the control unit 203, further executes a reception process, such as separation, demodulation, and decoding, and outputs the information subjected to the reception process to the control unit 203. Note that the reception process in the reception unit 205 is executed based on predefined settings or based on notification or settings from the base station apparatus 1.

The wireless reception unit 2057 applies, to the uplink signal received through the transmission and reception antenna 209, conversion (down-conversion) into an intermediate frequency, removal of unnecessary frequency components, control of the amplification level to maintain an appropriate signal level, quadrature demodulation based on in-phase components and quadrature components of the received signal, conversion of an analog signal into a digital signal, removal of a guard interval (GI), and/or extraction of a signal in the frequency domain through a fast Fourier transform (FFT).

The demultiplexing unit 2055 separates a downlink channel, such as PHICH, PDCCH, EPDCCH, and PDSCH, a downlink synchronization signal, and/or a downlink reference signal from a signal input from the wireless reception unit 2057. The demultiplexing unit 2055 outputs the downlink reference signal to the channel measurement unit 2059. The demultiplexing unit 2055 compensates a propagation path for the downlink channel based on an estimation value of the propagation path input from the channel measurement unit 2059.

For a modulation symbol of the downlink channel, the demodulation unit 2053 uses a modulation scheme, such as BPSK, QPSK, 16 QAM, 64 QAM, and 256 QAM, to demodulate the reception signal. The demodulation unit 2053 also separates and demodulates a MIMO-multiplexed downlink channel.

The decoding unit 2051 applies a decoding process to coded bits of the demodulated downlink channel. The decoded downlink data and/or the downlink control information is output to the control unit 203. For the PDSCH, the decoding unit 2051 executes the decoding process in each transport block.

The channel measurement unit 2059 measures the estimation value of the propagation path and/or the quality of the channel or the like from the downlink reference signal input from the demultiplexing unit 2055 and outputs it to the demultiplexing unit 2055 and/or the control unit 203. The downlink reference signal used by the channel measurement unit 2059 in the measurement may be decided based on at least the transmission mode set by the RRC parameters and/or other RRC parameters. For example, for the DL-DMRS, the channel measurement unit 2059 measures the estimation value of the propagation path for performing the propagation path compensation of the PDSCH or the EPDCCH. For the CRS, the channel measurement unit 2059 measures the estimation value of the propagation path for performing the propagation path compensation of the PDCCH or the PDSCH and/or the channel in the downlink for reporting the CSI. For the CSI-RS, the channel measurement unit 2059 measures the channel in the downlink for reporting the CSI. The channel measurement unit 2059 calculates the RSRP and/or the RSRQ based on the CRS, the CSI-RS, or the discovery signal and outputs the RSRP and/or the RSRQ to the upper layer processing unit 201.

The transmission unit 207 applies a transmission process, such as coding, modulation, and multiplexing, to the uplink control information and the uplink data input from the upper layer processing unit 201 according to the control from the control unit 203. For example, the transmission unit 207 generates and multiplexes an uplink channel, such as PUSCH and PUCCH, and/or an uplink reference signal to generate a transmission signal. Note that the transmission process in the transmission unit 207 is executed based on predefined settings or based on settings or notification from the base station apparatus 1.

The coding unit 2071 uses a predetermined coding scheme, such as block coding, convolutional coding, and turbo coding, to encode the HARQ indicator (HARQ-ACK), the uplink control information, and the uplink data input from the control unit 203. The modulation unit 2073 uses a predetermined modulation scheme, such as BPSK, QPSK, 16 QAM, 64 QAM, and 256 QAM, to modulate the coded bits input from the coding unit 2071. The uplink reference signal generation unit 2079 generates an uplink reference signal based on the RRC parameters set in the terminal apparatus 2 or the like. The multiplexing unit 2075 multiplexes the modulation symbol of each channel and the uplink reference signal and arranges them in a predetermined resource element.

The wireless transmission unit 2077 applies, to the signal from the multiplexing unit 2075, a process, such as conversion into a signal in the time domain based on the inverse fast Fourier transform (IFFT), addition of a guard interval, generation of a baseband digital signal, conversion into an analog signal, quadrature modulation, conversion (up-conversion) of an intermediate-frequency signal into a high-frequency signal, removal of extra frequency components, and amplification of power, to generate a transmission signal. The transmission signal output by the wireless transmission unit 2077 is transmitted from the transmission and reception antenna 209.

G-14. Signaling of Control Information in Present Embodiment

The base station apparatus 1 and the terminal apparatus 2 can use various methods for signaling (notification, broadcasting, or setting) of control information. The signaling of the control information can be performed in various layers (layers). The signaling of control information includes physical layer signaling that is signaling through the physical layer, RRC signaling that is signaling through the RRC layer, MAC signaling that is signaling through the MAC layer, and the like. The RRC signaling is dedicated RRC signaling (Dedicated RRC signaling) for notifying the terminal apparatus 2 of specific control information or common RRC signaling (Common RRC signaling) for notifying the base station apparatus 1 of specific control information. The signaling, such as RRC signaling and MAC signaling, used by an upper layer as viewed from the physical layer is also called upper layer signaling.

The RRC signaling is realized by signaling the RRC parameters. The MAC signaling is realized by signaling the MAC control elements. The physical layer signaling is realized by signaling the downlink control information (DCI) or the uplink link control information (UCI). The RRC parameters and the MAC control elements are transmitted by using the PDSCH or the PUSCH. The DCI is transmitted by using the PDCCH or the EPDCCH. The UCI is transmitted by using the PUCCH or the PUSCH. The RRC signaling and the MAC signaling are used for signaling semi-static control information and are also called semi-static signaling. The physical layer signaling is used for signaling dynamic (dynamic) control information and is also called dynamic signaling. The DCI is used for scheduling the PDSCH, scheduling the PUSCH, or the like. The UCI is used for a CSI report, a HARQ-ACK report, and/or a scheduling request (SR).

G-15. Details of Downlink Control Information in Present Embodiment

The DCI is notified by using a DCI format including a predefined field. Predetermined information bits are mapped in the field defined in the DCI format. The DCI notifies downlink scheduling information, uplink scheduling information, sidelink scheduling information, a request for an aperiodic CSI report, or an uplink transmission power command.

The DCI format monitored by the terminal apparatus 2 is determined by the transmission mode set in each serving cell. That is, part of the DCI format monitored by the terminal apparatus 2 may vary according to the transmission mode. For example, the terminal apparatus 2 in which a downlink transmission mode 1 is set monitors a DCI format 1A and a DCI format 1. For example, the terminal apparatus 2 in which a downlink transmission mode 4 is set monitors the DCI format 1A and a DCI format 2. For example, the terminal apparatus 2 in which an uplink transmission mode 1 is set monitors a DCI format 0. For example, the terminal apparatus 2 in which an uplink transmission mode 2 is set monitors the DCI format 0 and a DCI format 4.

A control region provided with the PDCCH for notifying the terminal apparatus 2 of the DCI is not notified, and the terminal apparatus 2 uses blind decoding (blind detection) to detect the DCI for the terminal apparatus 2. Specifically, the terminal apparatus 2 monitors a set of PDCCH candidates in the serving cell. The monitoring denotes attempting to decode each PDCCH in the set using all of the DCI formats to be monitored. For example, the terminal apparatus 2 attempts to decode all of the aggregation levels, the PDCCH candidates, and the DCI formats that may be transmitted to the terminal apparatus 2. The terminal apparatus 2 recognizes the successfully decoded (detected) DCI (PDCCH) as the DCI (PDCCH) for the terminal apparatus 2.

A cyclic redundancy check (CRC) is applied to the DCI. The CRC is used for error detection of the DCI and blind detection of the DCI. The CRC (CRC parity bits) is scrambled by an RNTI. The terminal apparatus 2 detects whether the DCI is for the terminal apparatus 2 based on the RNTI. Specifically, the terminal apparatus 2 uses a predetermined RNTI to descramble the bits corresponding to the CRC and extracts the CRC to detect whether the corresponding DCI is correct.

The RNTI is defined or set according to the purpose or the usage of the DCI. The RNTI includes a C-RNTI (Cell-RNTI), an SPS C-RNTI (Semi Persistent Scheduling C-RNTI), an SI-RNTI (System Information-RNTI), a P-RNTI (Paging-RNTI), an RA-RNTI (Random Access-RNTI), a TPC-PUCCH-RNTI (Transmit Power Control-PUCCH-RNTI), a TPC-PUSCH-RNTI (Transmit Power Control-PUSCH-RNTI), a temporary C-RNTI, an M-RNTI (MBMS (Multimedia Broadcast Multicast Services)-RNTI), and an eIMTA-RNTI.

The C-RNTI and the SPS C-RNTI are RNTIs specific to the terminal apparatus 2 in the base station apparatus 1 (cell) and are identifiers for identifying the terminal apparatus 2. The C-RNTI is used for scheduling the PDSCH or the PUSCH in a subframe. The SPS C-RNTI is used for activating or releasing periodical scheduling of the resources for the PDSCH or the PUSCH. The control channel including the CRC scrambled by the SI-RNTI is used for scheduling the SIB (System Information Block). The control channel including the CRC scrambled by the P-RNTI is used for controlling paging. The control channel including the CRC scrambled by the RA-RNTI is used for scheduling the response to the RACH. The control channel including the CRC scrambled by the TPC-PUCCH-RNTI is used for controlling the power of the PUCCH. The control channel including the CRC scrambled by the TPC-PUSCH-RNTI is used for controlling the power of the PUSCH. The control channel including the CRC scrambled by the Temporary C-RNTI is used by a mobile station apparatus in which the C-RNTI is not set or recognized. The control channel including the CRC scrambled by the M-RNTI is used for scheduling the MBMS. The control channel including the CRC scrambled by the eIMTA-RNTI is used for reporting the information regarding the TDD UL/DL setting of the TDD serving cell in the dynamic TDD (eIMTA). Note that the RNTIs are not limited to the RNTIs described above, and a new RNTI may be used to scramble the DCI format.

The scheduling information (downlink scheduling information, uplink scheduling information, or sidelink scheduling information) includes information for making a schedule on the basis of resource blocks or resource block groups in scheduling the frequency domain. The resource block group is a set of consecutive resource blocks and is a resource allocated to the terminal apparatus to be scheduled. The size of the resource block group is determined according to the system bandwidth.

G-16. Details of Downlink Control Channel in Present Embodiment

The DCI is transmitted by using a control channel, such as a PDCCH and an EPDCCH. The terminal apparatus 2 monitors a set of PDCCH candidates and/or a set of EPDCCH candidates of one or a plurality of activated serving cells set through the RRC signaling. Here, the monitoring denotes attempting to decode the PDCCHs and/or the EPDCCHs in the sets corresponding to all of the DCI format to be monitored.

The set of PDCCH candidates or the set of EPDCCH candidates is also called a search space. A common search space (CSS) and a UE-specific search space (USS) are defined in the search space. The CSS may be defined for only the search space related to the PDCCH.

The CSS (Common Search Space) is a search space set based on parameters specific to the base station apparatus 1 and/or predefined parameters. For example, the CSS is a search space used in common by a plurality of terminal apparatuses. Therefore, the base station apparatus 1 maps, on the CSS, a control channel common to a plurality of terminal apparatuses, and this reduces the resources for transmitting the control channels.

The USS (UE-specific Search Space) is a search space set by using parameters specific to at least the terminal apparatus 2. Therefore, the USS is a search space specific to the terminal apparatus 2, and the control channel specific to the terminal apparatus 2 can separately be transmitted. Therefore, the base station apparatus 1 can efficiently map the control channels specific to a plurality of terminal apparatuses.

The USS may be set to be used in common by a plurality of terminal apparatuses. The common USS is set for a plurality of terminal apparatuses, and therefore, the parameters specific to the terminal apparatus 2 are set to be the same values in the plurality of terminal apparatuses. Examples of the unit set to the same parameters in the plurality of terminal apparatuses include cells, transmission points, groups of predetermined terminal apparatuses, and the like.

The search space of each aggregation level is defined by a set of PDCCH candidates. Each of the PDCCHs is transmitted by using a set of one or more CCEs. The number of CCEs used for one PDCCH is also called an aggregation level. For example, the number of CCEs used for one PDCCH is one, two, four, or eight.

The search space of each aggregation level is defined by a set of EPDCCH candidates. Each of the EPDCCHs is transmitted by using a set of one or more ECCEs. The number of ECCEs used for one EPDCCH is also called an aggregation level. For example, the number of ECCEs used for one EPDCCH is one, two, four, eight, sixteen, or thirty-two.

The number of PDCCH candidates or the number of EPDCCH candidates is determined based on at least the search space and the aggregation level. For example, in the CSS, the numbers of PDCCH candidates in the aggregation levels 4 and 8 are four and two, respectively. For example, in the USS, the numbers of PDCCH candidates in the aggregations 1, 2, 4, and 8 are six, six, two, and two, respectively.

Each ECCE includes a plurality of EREGs. The EREGs are used for defining mapping of the EPDCCHs on the resource elements. Sixteen EREGs provided with numbers 0 to 15 are defined in each RB pair. That is, EREGs 0 to 15 are defined in each RB pair. In each RB pair, the EREGs 0 to 15 are periodically defined by prioritizing the frequency direction, in the resource elements other than the resource elements in which predetermined signals and/or channels are mapped. For example, the EREGs are not defined in the resource elements in which demodulation reference signals associated with the EPDCCHs transmitted through antenna ports 107 to 110 are mapped.

The number of ECCEs used for one EPDCCH depends on the EPDCCH format and is decided based on other parameters. The number of ECCEs used for one EPDCCH is also called an aggregation level. For example, the number of ECCEs used for one EPDCCH is decided based on the number of resource elements that can be used for the EPDCCH transmission in one RB pair, the transmission method of the EPDCCH, and the like. For example, the number of ECCEs used for one EPDCCH is one, two, four, eight, sixteen, or thirty-two. In addition, the number of EREGs used for one ECCE is decided based on the type of subframe and the type of cyclic prefix and is four or eight. Examples of supported transmission method of EPDCCH include distributed transmission (Distributed transmission) and localized transmission (Localized transmission).

The EPDCCH can use the distributed transmission or the localized transmission. The mapping of the ECCE with respect to the EREG and the RB pair varies between the distributed transmission and the localized transmission. For example, in the distributed transmission, one ECCE is provided by using EREGs of a plurality of RB pairs. In the localized transmission, one ECCE is provided by using EREGs of one RB pair.

The base station apparatus 1 configures settings regarding the EPDCCH in the terminal apparatus 2. The terminal apparatus 2 monitors a plurality of EPDCCHs based on the settings from the base station apparatus 1. A set of RB pairs in which the terminal apparatus 2 monitors the EPDCCH can be set. The set of RB pairs is also called an EPDCCH set or an EPDCCH-PRB set. One or more EPDCCH sets can be set for one terminal apparatus 2. Each EPDCCH set includes one or more RB pairs. In addition, the settings regarding the EPDCCH can separately be configured for each EPDCCH set.

The base station apparatus 1 can set a predetermined number of EPDCCH sets for the terminal apparatus 2. For example, up to two EPDCCH sets can be set as an EPDCCH set 0 and/or an EPDCCH set 1. Each of the EPDCCH sets can include a predetermined number of RB pairs. Each EPDCCH set includes one set of a plurality of ECCEs. The number of ECCEs included in one EPDCCH set is decided based on the number of RB pairs set as the EPDCCH set and the number of EREGs used in one ECCE. In a case where the number of ECCEs included in one EPDCCH set is N, each EPDCCH set includes ECCEs provided with numbers 0 to N−1. For example, in a case where the number of EREGs used in one ECCE is four, the EPDCCH set including four RB pairs includes sixteen ECCEs.

G-17. Details of Channel State Information in Present Embodiment

The terminal apparatus 2 announces (reports) the CSI to the base station apparatus 1. The time and frequency resources used for announcing the CSI are controlled by the base station apparatus 1. The base station apparatus 1 configures the settings regarding the CSI to the terminal apparatus 2 through RRC signaling. One or more CSI processes are set in the terminal apparatus 2 in a predetermined transmission mode. The CSI announced by the terminal apparatus 2 corresponds to the CSI process. For example, the CSI process is a unit of control or settings regarding the CSI. Each of the CSI processes can independently configure settings (for example, period and offset of announcement) regarding a CSI-RS resource, a CSI-IM resource, and a periodic CSI report and/or settings regarding an aperiodic CSI report.

The CSI includes a CQI, a PMI, a PTI (Precoding type indicator), an RI, and/or a CRI (CSI-RS resource indicator). The RI indicates the number of transmission layers (the number of ranks). The PMI is information indicating a predefined precoding matrix. In the PMI, one piece of information or two pieces of information indicate one precoding matrix. The PMI in the case of using two pieces of information is also called a first PMI and a second PMI. The CQI is information indicating a combination of predefined modulation scheme and coding rate. The CRI is information (single instance) indicating one CSI-RS resource selected from CSI-RS resources in a case where two or more CSI-RS resources are set in one CSI process. The terminal apparatus 2 reports a recommended CSI to the base station apparatus 1. The terminal apparatus 2 reports, for each transport block (code word), the CQI satisfying predetermined reception quality.

In the report of the CRI, one CSI-RS resource is selected from the set CSI-RS resources. In the case where the CRI is reported, the PMI, the CQI, and the RI to be reported are calculated (selected) based on the reported CRI. For example, in a case where each of the set CSI-RS resources is precoded, the terminal apparatus 2 reports the CRI to report the precoding (beam) suitable for the terminal apparatus 2.

Subframes (reporting instances) capable of periodic CSI report are decided by the period of report and the subframe offset that are set in the parameters of upper layer (CQIPMI index, RI index, or CRI index). Note that the parameters of upper layer can independently be set in the subframe sets that are set for measuring the CSI. In a case where only one piece of information is set for a plurality of subframe sets, the information can be common to the subframe sets. In each serving cell, one or more periodic CSI reports are set through signaling of upper layer.

The CSI report type supports a PUCCH CSI report mode. The CSI report type is also called a PUCCH report type. A type 1 report supports feedback of CQI to a terminal selection subband. A type 1a report supports feedbank of subband CQI and second PMI. Type 2, type 2b, and type 2c reports support feedback of wideband CQI and PMI. Type 2a report supports feedbank of wideband PMI. A type 3 report supports feedback of RI. A type 4 report supports feedback of wideband CQI. A type 5 report supports feedback of RI and wideband PMI. A type 6 report supports feedback of RI and PTI. A type 7 report supports feedback of CRI and RI. A type 8 report supports feedback of CRI, RI, and wideband PMI. A type 9 report supports feedback of CRI, RI, and PTI. A type 10 report supports feedback of CRI.

In the terminal apparatus 2, information regarding the CSI measurement and the CSI report is set from the base station apparatus 1. The CSI measurement is performed based on reference signals and/or reference resources (for example, CRS, CSI-RS, CSI-IM resources, and/or DRS). The reference signals to be used in the CSI measurement are determined based on the settings of the transmission mode and the like. The CSI measurement is performed based on channel measurement and interference measurement. For example, the power of a desirable cell is measured in the channel measurement. The power of a cell other than the desirable cell and the noise power are measured in the interference measurement.

For example, in the CSI measurement, the terminal apparatus 2 performs the channel measurement and the interference measurement based on the CRS. For example, in the CSI measurement, the terminal apparatus 2 performs the channel measurement based on the CSI-RS and performs the interference measurement based on the CRS. For example, in the CSI measurement, the terminal apparatus 2 performs the channel measurement based on the CSI-RS and performs the interference measurement based on the CSI-IM resource.

The CSI process is set as information specific to the terminal apparatus 2 through signaling of upper layer. One or more CSI processes are set in the terminal apparatus 2, and the terminal apparatus 2 performs the CSI measurement and the CSI report based on the settings of the CSI processes. For example, in a case where plural CSI processes are set, the terminal apparatus 2 independently reports a plurality of CSIs based on the CSI processes. Each CSI process includes settings for cell state information, an identifier of the CSI process, setting information regarding CSI-RS, setting information regarding CSI-IM, a subframe pattern set for CSI report, setting information regarding periodic CSI report, and/or setting information regarding aperiodic CSI report. Note that the settings for the cell state information may be common to a plurality of CSI processes.

The terminal apparatus 2 uses CSI reference resources for performing the CSI measurement. For example, the terminal apparatus 2 uses a group of downlink physical resource blocks indicated by the CSI reference resources to measure the CSI of the case where the PDSCH is transmitted. In a case where CSI subframe sets are set through the signaling of upper layer, each CSI reference resource belongs to any one of the CSI subframe sets and does not belong to both of the CSI subframe sets.

In the frequency direction, the CSI reference resources are defined by a group of downlink physical resource blocks corresponding to a band related to the value of the measured CQI.

In the layer direction (spatial direction), the CSI reference resources are defined by the RI and the PMI conditioned by the measured CQI. That is, in the layer direction (spatial direction), the CSI reference resources are defined by the RI and the PMI assumed or generated in measuring the CQI.

In the time direction, the CSI reference resources are defined by predetermined one or more downlink subframes. Specifically, the CSI reference resource is defined by an effective subframe predetermined subframes before the subframe for CSI report. The number of predetermined subframes defining the CSI reference resources is determined based on the transmission mode, the frame configuration type, the number of set CSI processes, and/or the CSI report mode. For example, in a case where a mode of one CSI process and periodic CSI report is set for the terminal apparatus 2, the number of predetermined subframes defining the CSI reference resources is a minimum value equal to or greater than four, among the effective downlink subframes.

The effective subframe is a subframe satisfying predetermined conditions. The downlink subframe in a serving cell is considered to be effective in a case where part or all of the following conditions are met.

(1) The effective downlink subframe is determined based on the RRC parameter regarding the ON state and the OFF state. In the terminal apparatus 2, the effective downlink subframe is a subframe in the ON state.

(2) The effective downlink subframe is set as a downlink subframe in the terminal apparatus 2.

(3) The effective downlink subframe is not an MBSFN (Multimedia Broadcast multicast service Single Frequency Network) subframe in a predetermined transmission mode.

(4) The effective downlink subframe is not included in a range of a measurement interval (measurement gap) set in the terminal apparatus 2.

(5) The effective downlink subframe includes elements or part of the elements of the CSI subframe set linked to the periodic CSI report in the case where the CSI subframe set is set in the terminal apparatus 2 in the periodic CSI report.

(6) The effective downlink subframe includes elements or part of the elements of the CSI subframe set linked to the downlink subframe associated with the corresponding CSI request in the DCI format of the uplink in the aperiodic CSI report for the CSI process. Under the condition, a predetermined transmission mode, a plurality of CSI processes, and CSI subframe sets for the CSI processes are set in the terminal apparatus 2.

G-18. Details of Multi-Carrier Transmission in Present Embodiment

Plural cells are set in the terminal apparatus 2, and the terminal apparatus 2 can perform multi-carrier transmission. The communication in which the terminal apparatus 2 uses a plurality of cells is called CA (carrier aggregation) or DC (dual connectivity). The content described in the present embodiment can be applied to each or part of a plurality of cells set in the terminal apparatus 2. The cells set in the terminal apparatus 2 will also be referred to as serving cells.

In the CA, the plural set serving cells include one primary cell (PCell: Primary Cell) and one or more secondary cells (SCell: Secondary Cell). One primary cell and one or more secondary cells can be set for the terminal apparatus 2 supporting the CA.

The primary cell is a serving cell in which an initial connection establishment (initial connection establishment) procedure is performed, a serving cell that has started a connection re-establishment (connection re-establishment) procedure, or a cell instructed to be the primary cell in a handover procedure. The primary cell operates at a primary frequency. The secondary cell can be set after establishment or re-establishment of connection. The secondary cell operates at a secondary frequency. Note that the connection is also called RRC connection.

The DC is an operation in which a predetermined terminal apparatus 2 consumes radio resources provided from at least two different network points. The network points include a master base station apparatus (MeNB: Master eNB) and a secondary base station apparatus (SeNB: Secondary eNB). The dual connectivity is an action in which the terminal apparatus 2 performs RRC connection in at least two network points. In the dual connectivity, the two network points may be connected through a non-ideal backhaul (non-ideal backhaul).

In the DC, the base station apparatus 1 that is connected to at least S1-MME (Mobility Management Entity) and that plays a role of a mobility anchor of a core network is called a master base station apparatus. In addition, the base station apparatus 1 that provides additional radio resources to the terminal apparatus 2 and that is not the master base station apparatus is called a secondary base station apparatus. A group of serving cells related to the master base station apparatus is also called a master cell group (MCG: Master Cell Group). A group of serving cells related to the secondary base station apparatus is also called a secondary cell group (SCG: Secondary Cell Group).

In the DC, the primary cell belongs to the MCG. Furthermore, in the SCG, the secondary cell corresponding to the primary cell is called a primary secondary cell (PSCell: Primary Secondary Cell). Functions (capability and performance) equivalent to the PCell (base station apparatus included in the PCell) may be supported in the PSCell (base station apparatus included in the PSCell). In addition, only part of the functions of the PCell may be supported in the PSCell. For example, a function of performing the PDCCH transmission by using a search space different from the CSS or the USS may be supported in the PSCell. In addition, the PSCell may be always in an active state. In addition, the PSCell is a cell that can receive the PUCCH.

In the DC, a radio bearer (data radio bearer (DRB: Date Radio Bearer) and/or a signaling radio bearer (SRB: Signaling Radio Bearer)) may be separately allocated for the MeNB and the SeNB. The duplex mode may be separately set for each of the MCG (PCell) and the SCG (PSCell). The MCG (PCell) and the SCG (PSCell) may not be synchronized with each other. A plurality of parameters for timing adjustment (TAG: Timing Advance Group) may be independently set for the MCG (PCell) and the SCG (PSCell). In the dual connectivity, the terminal apparatus 2 uses only the MeNB (PCell) to transmit the UCI corresponding to the cell in the MCG and uses only the SeNB (pSCell) to transmit the UCI corresponding to the cell in the SCG. In the transmission of each UCI, the transmission method using the PUCCH and/or PUSCH is applied to each cell group.

The PUCCH and the PBCH (MIB) are transmitted only in the PCell or the PSCell. In addition, the PRACH is transmitted only in the PCell or the PSCell unless plural TAGs are set between the cells in the CG.

In the PCell or the PSCell, SPS (Semi-Persistent Scheduling) or DRX (Discontinuous Transmission) may be performed. In the secondary cell, the same DRX as the PCell or the PSCell of the same cell group may be performed.

In the secondary cell, the information/parameters regarding the settings of the MAC are basically shared by the PCell or the PSCell of the same cell group. Part of the parameters may be set for each secondary cell. Part of the timers or the counters may be applied to only the PCell or the PSCell.

In the CA, the cell in which the TDD scheme is applied and the cell in which the FDD scheme is applied may be integrated. In the case where the cell in which the TDD is applied and the cell in which the FDD is applied are integrated, the technique disclosed in the present specification can be applied to any one of the cell in which the TDD is applied and the cell in which the FDD is applied.

The terminal apparatus 2 transmits, to the base station apparatus 1, information indicating combinations of bands in which the CA is supported by the terminal apparatus 2. For each combination of bands, the terminal apparatus 2 transmits, to the base station apparatus 1, information indicating whether simultaneous transmission and reception in the plurality of serving cells in a plurality of different bands is supported.

G-19. Details of Resource Allocation in Present Embodiment

The base station apparatus 1 can use a plurality of methods as a method of resource allocation of the PDSCH and/or the PUSCH to the terminal apparatus 2. The methods of resource allocation include dynamic scheduling, semi-persistent scheduling, multi-subframe scheduling, and cross-subframe scheduling.

In the dynamic scheduling, one DCI performs resource allocation in one subframe. Specifically, the PDCCH or the EPDCCH in a subframe makes a schedule for the PDSCH in the subframe. The PDCCH or the EPDCCH in a subframe makes a schedule for the PUSCH in a predetermined subframe after the subframe.

In the multi-subframe scheduling, one DCI performs resource allocation in one or more subframes. Specifically, the PDCCH or the EPDCCH in a subframe makes a schedule for the PDSCH in one or more subframes predetermined subframes after the subframe. The PDCCH or the EPDCCH in a subframe makes a schedule for the PUSCH in one or more subframes predetermined subframes after the subframe. The number of predetermined subframes can be an integer equal to or greater than zero. The predetermined number of subframes may be predefined or may be determined based on physical layer signaling and/or RRC signaling. In the multi-subframe scheduling, consecutive subframes may be scheduled, or subframes with a predetermined period may be scheduled. The number of subframes to be scheduled may be predefined or may be determined based on physical layer signaling and/or RRC signaling.

In the cross-subframe scheduling, one DCI performs resource allocation in one subframe. Specifically, the PDCCH or the EPDCCH in a subframe makes a schedule for the PDSCH in one subframe predetermined subframes after the subframe. The PDCCH or the EPDCCH makes a schedule for the PUSCH in one subframe predetermined subframes after the subframe. The predetermined number of subframes can be an integer equal to or greater than zero. The predetermined number of subframes may be predefined or may be determined based on physical layer signaling and/or RRC signaling. In the cross-subframe scheduling, consecutive subframes may be scheduled, or subframes with a predetermined period may be scheduled.

In the semi-persistent scheduling (SPS), one DCI performs resource allocation in one or more subframes. Information regarding the SPS is set in the terminal apparatus 2 through RRC signaling, and in a case where the terminal apparatus 2 detects the PDCCH or the EPDCCH for enabling the SPS, the terminal apparatus 2 enables the process regarding the SPS to receive a predetermined PDSCH and/or PUSCH based on the settings regarding the SPS. In a case where the terminal apparatus 2 detects the PDCCH or the EPDCCH for releasing the SPS when the SPS is enabled, the terminal apparatus 2 releases (disables) the SPS to stop receiving the predetermined PDSCH and/or PUSCH. The SPS may be released based on a case where a predetermined condition is satisfied. For example, the SPS is released in a case where a predetermined number of pieces of blank transmission data are received. The blank transmission of data for releasing the SPS corresponds to the MAC PDU including a zero MAC SDU (Service Data Unit).

The information regarding the SPS through RRC signaling includes an SPS C-RNTI that is an RNTI of the SPS, information regarding the period (interval) of scheduling the PDSCH, information regarding the period (interval) of scheduling the PUSCH, information regarding the settings for releasing the SPS, and/or a number of the HARQ process in the SPS. The SPS is supported only for the primary cell and/or the primary secondary cell.

G-20. HARQ in Present Embodiment

In the present embodiment, the HARQ has various features. The HARQ transmits and retransmits the transport blocks. A predetermined number of processes (HARQ processes) are used (set) in the HARQ, and each process independently operates in a stop and wait scheme.

In the downlink, the HARQ is asynchronous, and the HARQ adaptively operates. That is, in the downlink, the retransmission is always scheduled through the PDCCH. An uplink HARQ-ACK (response information) corresponding to the downlink transmission is transmitted through the PUCCH or the PUSCH. In the downlink, the PDCCH transmits a HARQ process number indicating the HARQ process and information indicating whether the transmission is first transmission or retransmission.

In the uplink, the HARQ operates synchronously or asynchronously. A downlink HARQ-ACK (response information) corresponding to the uplink transmission is transmitted through the PHICH. In the uplink HARQ, the operation of the terminal apparatus is determined based on the HARQ feedback received by the terminal apparatus and/or the PDCCH received by the terminal apparatus. For example, in a case where the PDCCH is not received, and the HARQ feedback is an ACK, the terminal apparatus does not perform the transmission (retransmission) and holds the data in the HARQ buffer. In this case, the PDCCH may be transmitted to resume the retransmission. In addition, in a case where, for example, the PDCCH is not received, and the HARQ feedback is a NACK, the terminal apparatus non-adaptively performs the retransmission in a predetermined uplink subframe. Furthermore, in a case where, for example, the PDCCH is received, the terminal apparatus performs the transmission or the retransmission based on the content notified through the PDCCH regardless of the content of the HARQ feedback.

Note that in a case where a predetermined condition (setting) is satisfied in the uplink, the HARQ may operate only asynchronously. That is, the downlink HARQ-ACK may not be transmitted, and the retransmission in the uplink may be always scheduled through the PDCCH.

In the HARQ-ACK report, the HARQ-ACK indicates an ACK, a NACK, or a DTX. In the case where the HARQ-ACK is an ACK, the HARQ-ACK indicates that the transport block (code word or channel) corresponding to the HARQ-ACK is correctly received (decoded). In the case where the HARQ-ACK is a NACK, the HARQ-ACK indicates that the transport block (code word or channel) corresponding to the HARQ-ACK is not correctly received (decoded). In the case where the HARQ-ACK is a DTX, the HARQ-ACK indicates that the transport block (code word or channel) corresponding to the HARQ-ACK does not exist (is not transmitted).

In each of the downlink and the uplink, a predetermined number of HARQ processes are set (defined). For example, in the FDD, up to eight HARQ processes are used in each serving cell. In addition, for example, the maximum number of HARQ processes in the TDD is decided by the uplink/downlink settings. The maximum number of HARQ processes may be decided based on RTT (Round Trip Time). For example, in a case where the RTT is 8TTI (Transmission Time Interval), the maximum number of HARQ processes can be eight.

In the present embodiment, the HARQ information includes at least an NDI (New Data Indicator) and a TBS (transport block size). The NDI is information indicating whether the transport block corresponding to the HARQ information is transmitted for the first time or is retransmitted. The TBS is the size of the transport block. The transport block is a block of data in the transport channel (transport layer), and the transport block can be the unit of performing the HARQ. In the DL-SCH transmission, the HARQ information further includes a HARQ process ID (HARQ process number). In the UL-SCH transmission, the HARQ information further includes an RV (Redundancy Version) that is information for designating the information bit and the parity bit after the transport block is encoded. In the case of the spatial multiplexing in the DL-SCH, the HARQ information includes a set of NDI and TBS for each transport block.

H. Conclusion

According to the technique disclosed in the present specification, fine-grained flexible switching of FD can be realized in the communication system including both of execution and non-execution of FD. In addition, appropriate FD can be carried out in various situations, and this improves the frequency use efficiency and the performance of low latency communication (delay reduction effect) of the entire communication system.

More specifically, the communication apparatus can immediately transmit and receive the ACK/NACK with a small number of radio resources and can reduce the delay caused by the execution of the FD. In addition, the allocated radio resources can be divided in association with TB, CB, CBG, and the like. As a result, the communication apparatus can easily transmit and receive the ACK/NACK in carrying out the FD and can also flexibly control the operation of the self-interference canceller at the time of the FD reception.

In addition, according to the technique disclosed in the present specification, different types of channels, such as a shared channel and a random access channel, can also be used to carry out the FD, and the use efficiency of radio resources in the systems perspective can be improved compared to the conventional technique.

INDUSTRIAL APPLICABILITY

The technique disclosed in the present specification has been described in detail with reference to a specific embodiment. However, it is apparent that those skilled in the art can modify or substitute the embodiment without departing from the scope of the technique disclosed in the present specification.

Although the embodiment in which the technique disclosed in the present specification is mainly applied to the cellular system has been mostly described in the present specification, the scope of the technique disclosed in the present specification is not limited to this. The technique disclosed in the present specification can similarly be applied to various other wireless communication systems that carry out full duplex communication.

In short, the technique disclosed in the present specification has been described in a form of an example, and the content described in the present specification should not be restrictively interpreted. The claims should be taken into account to determine the scope of the technique disclosed in the present specification.

Note that the technique disclosed in the present specification can also be configured as follows.

(1)

A communication apparatus including:

a resource allocation unit that allocates, to another communication apparatus, reception radio resources in a predetermined frequency channel and allocates transmission radio resources at least partially overlapping the reception radio resources on a time axis; and a notification unit that notifies the other communication apparatus of information regarding the reception radio resources and the transmission radio resources.

(1-1)

The communication apparatus according to (1), in which the communication apparatus operates as a base station, and the notification unit dynamically notifies the other communication apparatus as a terminal connected to the base station of the information in each allocation of the radio resources or semi-statically notifies the other communication apparatus of the information through system information (System Information) or RRC (Radio Resource Control) signaling.

(2)

The communication apparatus according to (1), in which the resource allocation unit further allocates transmission radio resources at least partially overlapping the reception radio resources on a frequency axis.

(3)

The communication apparatus according to (1) or (2), in which the resource allocation unit allocates the reception radio resources used for transmitting data from the communication apparatus to the other communication apparatus and allocates the transmission radio resources used for transmitting a response to the data from the other communication apparatus to the communication apparatus.

(3-1)

The communication apparatus according to (3), in which the data from the communication apparatus to the other communication apparatus is a Transport Block, a Code Block, or a Code block Group, and the response to the data is an ACK or a NACK.

(4)

The communication apparatus according to (1) or (2), in which the resource allocation unit sets the number of the reception radio resources and the number of the transmission radio resources equal to each other.

(5)

The communication apparatus according to (1) or (2), in which the resource allocation unit allocates the reception radio resources and the transmission radio resources in a plurality of units of time divided from a predetermined unit of time for allocating the radio resources.

(6)

The communication apparatus according to (5), in which the resource allocation unit switches, once or twice or more, the other communication apparatus to be provided with the reception radio resources and the transmission radio resources in the divided units of time.

(7)

The communication apparatus according to (5), in which the resource allocation unit allocates, in a first half of the divided units of time, the transmission radio resources for transmitting the data to the communication apparatus such that the transmission radio resources overlap, on the time axis, the reception radio resources for transmitting the data from the communication apparatus and allocates, in a second half of the divided units of time, at least one of the reception radio resources or the transmission radio resources for transmitting the response to the data.

(7-1)

The communication apparatus according to (7), in which the resource allocation unit allocates, in the divided units of time, the reception radio resources and the transmission radio resources with the same temporal length.

(8)

The communication apparatus according to claim 7, in which the resource allocation unit switches, at least once, the communication apparatus that allocates the transmission radio resources for transmitting the data to the communication apparatus, the transmission radio resources overlapping the reception radio resources for transmitting the data from the communication apparatus.

(9)

The communication apparatus according to (1) or (2), in which the resource allocation unit sets the number of pieces of data of the transmission radio resources and the number of pieces of data of the reception radio resources equal to each other in a case where the resource allocation unit allocates two or more transmission radio resources overlapping the reception radio resources on the time axis.

(10)

The communication apparatus according to (8), in which transmission parameters for transmitting the data from the communication apparatus through the reception radio resources are switched according to the switch of the communication apparatus that allocates the transmission radio resources.

(10-1)

The communication apparatus according to (10), in which the transmission parameters are switched at boundaries of the Transport Block, the Code block, or the Code Block Group of the data transmitted from the communication apparatus through the reception radio resources.

(11)

The communication apparatus according to (1) or (2), in which the notification unit uses different channels to notify the other communication apparatus of the allocation of the reception radio resources and notify the other communication apparatus of the allocation of the transmission radio resources.

(12)

The communication apparatus according to (1) or (2), in which the resource allocation unit allocates, once or a plurality of times, the transmission radio resources for transmitting the response to the data to the communication apparatus while allocating the reception radio resources for transmitting the data from the communication apparatus to the other communication apparatus.

(13)

The communication apparatus according to (12), in which in a case where there are two or more reception radio resources, the resource allocation unit allocates the transmission radio resource paired with the temporally last reception radio resource such that the transmission radio resource does not overlap the reception radio resource.

(14)

The communication apparatus according to (12) or (13), in which the resource allocation unit allocates, once or a plurality of times while allocating the reception radio resources, the transmission radio resources for transmitting the response to a Transport Block, a Code Block, or a Code Block Group of the data transmitted by the communication apparatus through the reception radio resources.

(15)

The communication apparatus according to (14), in which the resource allocation unit associates the plurality of units of time divided from the predetermined unit of time for allocating the radio resources with boundaries of the Transport Block, the Code Block, or the Code Block Group of the data transmitted through the reception radio resources.

(16)

The communication apparatus according to (15), in which the resource allocation unit allocates, to other divided units of time after the divided units of time, the transmission radio resources for transmitting the response to the data transmitted from the communication apparatus to the other communication apparatus in the divided units of time.

(16-1)

The communication apparatus according to (16), in which the resource allocation unit allocates the transmission radio resources for transmitting the response to the data, to the other divided units of time in the reception radio resources allocated to the other communication apparatus.

(16-2)

The communication apparatus according to (16), in which the resource allocation unit allocates the transmission radio resources for transmitting the response to the data, to the other divided units of time in the reception radio resources allocated to a communication apparatus other than the other communication apparatus.

(17)

The communication apparatus according to (1) or (2), in which the resource allocation unit permits the other communication apparatus to transmit a predetermined signal without allocation of the transmission radio resources, in radio resources at least partially overlapping the reception radio resources.

(18)

The communication apparatus according to (17), in which the predetermined signal is a signal of at least one of random access, Grant-free access, or Grant-less access.

(18-1)

The communication apparatus according to (17), in which the resource allocation unit permits to transmit the predetermined signal only near the boundaries of the plurality of units of time divided from the predetermined unit of time for allocating the radio resources.

(19)

The communication apparatus according to any one of (1) to (18), in which the resource allocation unit allocates the reception radio resources to a first communication apparatus and allocates the transmission radio resources to a second communication apparatus in a case where the resource allocation unit receives a signal from the second communication apparatus and in a case where link communication quality or a data rate is not affected much even if the resource allocation unit receives the signal, when the resource allocation unit transmits a signal to the first communication apparatus.

(20)

A communication method including:

a resource allocation step of allocating, to another communication apparatus, reception radio resources in a predetermined frequency channel and allocating transmission radio resources at least partially overlapping the reception radio resources on a time axis; and a notification step of notifying the other communication apparatus of information regarding the reception radio resources and the transmission radio resources.

(21)

A communication apparatus including:

a reception unit that receives, from another communication apparatus, a notification of information regarding reception radio resources allocated in a predetermined frequency channel and transmission radio resources allocated to at least partially overlap the reception radio resources on a time axis; and a communication unit that executes a reception process of a radio signal in the reception radio resources and that executes a transmission process of a radio signal in the transmission radio resources.

(22)

The communication apparatus according to (21), in which the communication unit executes a reception process of data transmitted from the other communication apparatus in the reception radio resources and executes a transmission process of a response to the data by using the transmission radio resources.

(23)

The communication apparatus according to (21) or (22), in which the communication unit uses the reception radio resources and the transmission radio resources allocated in a plurality of units of time divided from a predetermined unit of time for allocating the radio resources to execute a reception process of a signal transmitted from the other communication apparatus and a transmission process of a signal to the other communication apparatus.

(24)

The communication apparatus according to (23), in which the communication unit executes the reception process of the data transmitted from the other communication apparatus in the reception radio resources allocated in a first half of the divided units of time and executes the transmission process of the response to the data by using the transmission radio resources allocated in a second half of the divided units of time.

(24)

The communication apparatus according to (24), in which the communication unit executes the reception process of the data transmitted from the other communication apparatus in the reception radio resources and executes the transmission process of the data to the other communication apparatus by using the transmission radio resources overlapping the reception radio resources.

(26)

The communication apparatus according to (21), in which the reception unit receives the notification of the allocation of the reception radio resources and the notification of the allocation of the transmission radio resources through different channels.

(27)

The communication apparatus according to (21), in which the communication unit executes the reception process of the data transmitted from the other communication apparatus in the reception radio resources and executes the transmission process of the response to the data to the other communication apparatus in the transmission radio resources allocated once or a plurality of times during the allocation of the reception radio resources.

(28)

The communication apparatus according to (27), in which the communication unit uses the radio transmission resources allocated once or a plurality of times according to a Transport Block, a Code Block, or a Code Block Group of the data received in the reception radio resources to execute the transmission process of the response to the Transport Block, the Code Block, or the Code Block Group.

(29)

The communication apparatus according to (28), in which the communication unit executes, in the reception radio resources, the reception process of the data in which boundaries of the Transport Block, the Code Block, or the Code Block Group are associated with the plurality of units of time divided from the predetermined unit of time for allocating the radio resources and executes the transmission process of the response to the reception data by using the transmission radio resources allocated in other divided units of time after the reception.

(30)

The communication apparatus according to (29), in which the communication unit uses the transmission radio resources allocated to the other divided units of time in the reception radio resources allocated to the communication apparatus to execute the transmission process of the response to the reception data.

(31)

The communication apparatus according to (29), in which the communication unit uses the transmission radio resources allocated to the other divided units of time in the reception radio resources allocated to a communication apparatus other than the communication apparatus to execute the transmission process of the response to the reception data.

(32)

The communication apparatus according to (21), in which the reception unit uses the radio resources at least partially overlapping the reception radio resources allocated to the communication apparatus or the other communication apparatus to receive a notification indicating permission of transmission of a predetermined signal without allocation of the transmission radio resources.

(33)

The communication apparatus according to (32), in which the predetermined signal is a signal of at least one of random access, Grant-free access, or Grant-less access.

(34)

A communication method including:

a reception step of receiving, from another communication apparatus, a notification of information regarding reception radio resources allocated in a predetermined frequency channel and transmission radio resources allocated to at least partially overlap the reception radio resources on a time axis; and a communication step of executing a reception process of a radio signal in the reception radio resources and executing a transmission process of a radio signal in the transmission radio resources.

REFERENCE SIGNS LIST

600 . . . Communication apparatus, 601 . . . CRC coding unit, 602 . . . FEC coding unit
603 . . . Coding rate adjustment unit, 604 . . . Scrambler/interleaver
605 . . . Modulation unit, 606 . . . Serial-to-parallel conversion unit, 607 . . . Spatial signal processing unit
608 . . . Waveform shaping unit, 609 . . . Analog RF transmission processing unit
611 . . . Physical layer transmission control unit
621 . . . Analog RF reception processing unit, 622 . . . Waveform demodulation unit
623 . . . Equalization unit, 624 . . . Parallel-to-serial conversion unit, 625 . . . Demodulation unit
626 . . . Descrambler/deinterleaver, 627 . . . Decoding rate adjustment unit
628 . . . FEC decoding unit, 629 . . . CRC decoding unit
631 . . . Physical layer reception control unit
1 . . . Base station apparatus, 101 . . . Upper layer processing unit, 103 . . . Control unit
105 . . . Reception unit, 1051 . . . Decoding unit, 1053 . . . Demodulation unit 1055 ... Demultiplexing unit, 1057 ... Wireless reception unit
1059 ... Channel measurement unit
107 ... Transmission unit, 1071 ... Coding unit, 1073 ... Modulation unit
1075 ... Multiplexing unit, 1077 ... Wireless transmission unit
1079 ... Downlink reference signal generation unit, 109 ... Transmission and reception antenna
2 ... Terminal apparatus, 201 ... Upper layer processing unit, 203 ... Control unit
205 ... Reception unit, 2051 ... Decoding unit, 2053 ... Demodulation unit
2055 ... Demultiplexing unit, 2057 ... Wireless reception unit
2059 ... Channel measurement unit
207 ... Transmission unit, 2071 ... Coding unit, 2073 ... Modulation unit
2075 ... Multiplexing unit, 2077 ... Wireless transmission unit
2079 ... Uplink reference signal generation unit, 209 ... Transmission and reception antenna

The invention claimed is:

1. A first communication apparatus, comprising:
circuitry configured to:
allocate, to a second communication apparatus, reception radio resources in a specific frequency channel;
allocate transmission radio resources at least partially overlapping the reception radio resources on a time axis, wherein
transmission parameters for transmission of data on the reception radio resources are switched based on a switch of the transmission of the data on the transmission radio resources;
notify the second communication apparatus of information regarding the reception radio resources and the transmission radio resources; and
permit the second communication apparatus to transmit a signal of at least one of random access, Grant-free access, or Grant-less access in a limited range of the transmission radio resources at least partially overlapping the reception radio resources.

2. The first communication apparatus according to claim 1, wherein the circuitry is further configured to:
allocate the reception radio resources for the transmission of the data from the first communication apparatus to the second communication apparatus; and
allocate the transmission radio resources for transmission of a response to the data from the second communication apparatus to the first communication apparatus.

3. A communication method, comprising:
in a first communication apparatus:
allocating, to a second communication apparatus, reception radio resources in a specific frequency channel;
allocating transmission radio resources at least partially overlapping the reception radio resources on a time axis, wherein
transmission parameters for transmission of data on the reception radio resources are switched based on a switch of the transmission of the data on the transmission radio resources;
notifying the second communication apparatus of information regarding the reception radio resources and the transmission radio resources; and
permitting the second communication apparatus to transmit a signal of at least one of random access, Grant-free access, or Grant-less access in a limited range of the transmission radio resources at least partially overlapping the reception radio resources.

4. A first communication apparatus, comprising:
circuitry configured to:
receive, from a second communication apparatus, a notification of information regarding reception radio resources allocated in a specific frequency channel and transmission radio resources allocated to at least partially overlap the reception radio resources on a time axis, wherein
transmission parameters for transmission of data on the reception radio resources are switched based on a switch of the transmission of the data on the transmission radio resources;
receive a first radio signal in the reception radio resources;
transmit a second radio signal in the transmission radio resources; and
receive, using specific radio resources at least partially overlapping the reception radio resources allocated to the first communication apparatus or the second communication apparatus, a notification indicating permission of transmission of a signal of at least one of random access, Grant-free access, or Grant-less access in a limited range of the transmission radio resources.

5. The first communication apparatus according to claim 4, wherein the circuitry is further configured to:
receive the data from the second communication apparatus in the reception radio resources; and
transmit a response to the data to the second communication apparatus in the transmission radio resources allocated once or a plurality of times during the allocation of the reception radio resources.

6. A communication method, comprising:
in a first communication apparatus:
receiving, from a second communication apparatus, a notification of information regarding reception radio resources allocated in a specific frequency channel and transmission radio resources allocated to at least partially overlap the reception radio resources on a time axis, wherein
transmission parameters for transmission of data on the reception radio resources are switched based on a switch of the transmission of the data on the transmission radio resources;
receiving a first radio signal in the reception radio resources;
transmitting a second radio signal in the transmission radio resources; and
receiving, using specific radio resources at least partially overlapping the reception radio resources allocated to the first communication apparatus or the second communication apparatus, a notification indicating permission of transmission of a signal of at least one of random access, Grant-free access, or Grant-less access in a limited range of the transmission radio resources.

* * * * *